US012294232B2

(12) United States Patent
Swamy et al.

(10) Patent No.: US 12,294,232 B2
(45) Date of Patent: May 6, 2025

(54) PORTABLE POWER SUPPLY

(71) Applicant: MILWAUKEE ELECTRIC TOOL CORPORATION, Brookfield, WI (US)

(72) Inventors: Mahesh M. Swamy, Gurnee, IL (US); Omid H. Shirazi, Brookfield, WI (US); Matthew R. Polakowski, Greenfield, WI (US); Nathan J. Gustafson, Milwaukee, WI (US); Paul C. Chao, Menomonee Falls, WI (US); Samantha L. Billetdeaux, Mukwonago, WI (US); Michael R. Halverson, Greenfield, WI (US); Benjamin C. Tesch, Milwaukee, WI (US); Chun Jian Tang, Sussex, WI (US); Michael A. Matthews, Milwaukee, WI (US); James Dykstra, Milwaukee, WI (US); Brian M. Hockers, Nashotah, WI (US); Catherine Kelli Semon, Milwaukee, WI (US); Andrew S. Lentz, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/554,315

(22) Filed: Dec. 17, 2021

(65) Prior Publication Data
US 2022/0200303 A1 Jun. 23, 2022

Related U.S. Application Data

(60) Provisional application No. 63/232,354, filed on Aug. 12, 2021, provisional application No. 63/173,652, (Continued)

(51) Int. Cl.
*H02J 7/00* (2006.01)

(52) U.S. Cl.
CPC ........ *H02J 7/0063* (2013.01); *H02J 7/00034* (2020.01); *H02J 7/0013* (2013.01); (Continued)

(58) Field of Classification Search
CPC .... H02J 7/0063; H02J 7/00034; H02J 7/0013; H02J 7/0047; H02J 7/007182; H02J 2207/20
See application file for complete search history.

(56) References Cited

U.S. PATENT DOCUMENTS

| 4,161,682 A | 7/1979 | Corvette |
| 4,595,841 A | 6/1986 | Yaguchi |

(Continued)

FOREIGN PATENT DOCUMENTS

| EP | 3402036 A1 | 11/2018 |
| KR | 101620390 B1 | 5/2016 |
| WO | 2009146287 A1 | 12/2009 |

OTHER PUBLICATIONS

International Search Report and Written Opinion for Application No. PCT/US2021/064016 dated Apr. 13, 2022 (14 pages).
(Continued)

*Primary Examiner* — Lincoln D Donovan
*Assistant Examiner* — Alex W Lam
(74) *Attorney, Agent, or Firm* — Michael Best & Friedrich LLP

(57) ABSTRACT

A portable power supply including an internal power source, an AC output, a DC output, and an input unit configured to receive power from a first external source. The portable power supply further includes a first power conversion unit configured to convert the power received from the first external source to a first DC power used for charging the internal power source, an AC power conversion unit configured to convert power output by the internal power source
(Continued)

to an AC power used for powering a first peripheral device connected to the AC output, and a DC power conversion unit configured to convert power output by the internal power source to a second DC power used for powering a second peripheral device connected to the DC output.

17 Claims, 49 Drawing Sheets

Related U.S. Application Data filed on Apr. 12, 2021, provisional application No. 63/157,234, filed on Mar. 5, 2021, provisional application No. 63/131,055, filed on Dec. 28, 2020, provisional application No. 63/127,427, filed on Dec. 18, 2020.

(52) U.S. Cl.
CPC ...... *H02J 7/0047* (2013.01); *H02J 7/007182* (2020.01); *H02J 2207/20* (2020.01)

(56) References Cited

U.S. PATENT DOCUMENTS

| | | | |
|---|---|---|---|
| 4,902,955 A | 2/1990 | Manis et al. | |
| 5,077,513 A | 12/1991 | Dea et al. | |
| 5,083,076 A | 1/1992 | Scott | |
| 5,549,984 A | 8/1996 | Dougherty | |
| 6,127,798 A | 10/2000 | Lansang et al. | |
| 6,305,185 B1* | 10/2001 | Sloan | A45C 15/00 62/235.1 |
| 6,799,993 B2 | 10/2004 | Krieger et al. | |
| 7,145,314 B2 | 12/2006 | Aradachi et al. | |
| 7,188,491 B2 | 3/2007 | Donald, II et al. | |
| 7,270,910 B2 | 9/2007 | Yahnker et al. | |
| 7,309,928 B2 | 12/2007 | Grant et al. | |
| 7,508,171 B2 | 3/2009 | Carrier et al. | |
| 7,573,229 B2 | 8/2009 | Arakelian | |
| 7,602,146 B2 | 10/2009 | Carrier et al. | |
| 7,719,234 B2 | 5/2010 | Carrier et al. | |
| 8,076,900 B1 | 12/2011 | Brown | |
| 8,305,042 B2 | 11/2012 | Wirnitzer et al. | |
| 8,415,924 B2 | 4/2013 | Matthias et al. | |
| 8,436,585 B2 | 5/2013 | Yano | |
| 8,446,120 B2 | 5/2013 | Forster et al. | |
| 8,604,752 B2 | 12/2013 | Cole, Jr. et al. | |
| 8,653,787 B2 | 2/2014 | Cunanan et al. | |
| 8,796,995 B2 | 8/2014 | Cunanan et al. | |
| 8,988,015 B2 | 3/2015 | Forster et al. | |
| 9,000,882 B2 | 4/2015 | Velderman et al. | |
| 9,041,355 B2 | 5/2015 | Ishibashi et al. | |
| 9,071,069 B2 | 6/2015 | Brotto et al. | |
| 9,093,843 B2 | 7/2015 | Wirnitzer et al. | |
| 9,153,978 B2 | 10/2015 | Reade et al. | |
| 9,203,249 B2 | 12/2015 | Noda et al. | |
| 9,209,642 B2 | 12/2015 | Cunanan et al. | |
| 9,225,275 B2 | 12/2015 | Sterling et al. | |
| 9,341,403 B2 | 5/2016 | Conrad et al. | |
| 9,401,250 B2 | 7/2016 | Velderman et al. | |
| 9,406,457 B2 | 8/2016 | Velderman et al. | |
| 9,413,088 B2 | 8/2016 | Brotto et al. | |
| 9,444,269 B2 | 9/2016 | Wohltmann et al. | |
| 9,461,379 B2 | 10/2016 | Cunanan et al. | |
| 9,508,498 B2 | 11/2016 | Forster et al. | |
| 9,570,822 B2 | 2/2017 | Cunanan et al. | |
| 9,692,157 B2 | 6/2017 | Brotto et al. | |
| 9,722,334 B2 | 8/2017 | Sterling et al. | |
| 9,780,583 B2 | 10/2017 | Furui et al. | |
| 9,853,476 B2 | 12/2017 | Lee et al. | |
| 9,960,509 B2 | 5/2018 | Sterling et al. | |
| 9,966,774 B2 | 5/2018 | Wohltmann et al. | |
| 10,027,140 B2 | 7/2018 | Cunanan et al. | |
| 10,044,197 B2 | 8/2018 | Fry et al. | |
| 10,236,708 B2 | 3/2019 | Schennum et al. | |
| 10,256,697 B2 | 4/2019 | Velderman et al. | |
| 10,359,828 B2 | 7/2019 | Enomoto et al. | |
| 10,412,994 B2 | 9/2019 | Schennum et al. | |
| 10,651,706 B2 | 5/2020 | Forster et al. | |
| 10,666,068 B2 | 5/2020 | Cunanan et al. | |
| 10,686,319 B2 | 6/2020 | Wohltmann et al. | |
| 10,770,913 B2 | 9/2020 | Schennum et al. | |
| 10,811,885 B2 | 10/2020 | Fry et al. | |
| 2001/0043052 A1 | 11/2001 | Griffey et al. | |
| 2003/0090234 A1 | 5/2003 | Glasgow et al. | |
| 2004/0263118 A1 | 12/2004 | Breen et al. | |
| 2005/0073282 A1 | 4/2005 | Carrier et al. | |
| 2005/0225288 A1 | 10/2005 | Cole, Jr. et al. | |
| 2006/0071634 A1 | 4/2006 | Meyer et al. | |
| 2007/0019453 A1* | 1/2007 | Pierce | H01M 10/46 363/107 |
| 2007/0024236 A1 | 2/2007 | Arakelian | |
| 2007/0273325 A1 | 11/2007 | Krieger et al. | |
| 2007/0285049 A1 | 12/2007 | Krieger et al. | |
| 2008/0003491 A1 | 1/2008 | Yahnker et al. | |
| 2008/0238358 A1 | 10/2008 | Koide et al. | |
| 2008/0265678 A1 | 10/2008 | Brotto et al. | |
| 2009/0091957 A1* | 4/2009 | Orr | H02M 3/3376 363/79 |
| 2009/0146614 A1 | 6/2009 | Carrier et al. | |
| 2009/0289603 A1 | 11/2009 | Mahowald | |
| 2009/0295169 A1 | 12/2009 | Usselman et al. | |
| 2010/0102772 A1 | 4/2010 | Smith | |
| 2011/0090726 A1 | 4/2011 | Brotto et al. | |
| 2011/0101794 A1* | 5/2011 | Schroeder | H01M 50/209 320/101 |
| 2012/0094152 A1 | 4/2012 | Wu et al. | |
| 2012/0104991 A1 | 5/2012 | Suzuki et al. | |
| 2013/0221916 A1 | 8/2013 | Kelty et al. | |
| 2013/0241488 A1 | 9/2013 | Dao | |
| 2013/0249488 A1 | 9/2013 | Ju et al. | |
| 2014/0232326 A1 | 8/2014 | Wohltmann et al. | |
| 2015/0145476 A1* | 5/2015 | Toya | H01M 10/441 320/109 |
| 2015/0171632 A1 | 6/2015 | Fry et al. | |
| 2015/0191162 A1 | 7/2015 | Dao et al. | |
| 2016/0009232 A1 | 1/2016 | Budny | |
| 2016/0020682 A1* | 1/2016 | Shastry | H02K 7/1876 310/30 |
| 2016/0099575 A1 | 4/2016 | Velderman et al. | |
| 2018/0175458 A1 | 6/2018 | Radovich et al. | |
| 2020/0000142 A1 | 1/2020 | Schennum et al. | |
| 2020/0235638 A1 | 7/2020 | Velderman et al. | |
| 2020/0287398 A1 | 9/2020 | Delose et al. | |
| 2020/0295579 A1 | 9/2020 | Wohltmann et al. | |
| 2020/0350783 A1 | 11/2020 | Schennum et al. | |
| 2020/0403425 A1 | 12/2020 | Fry et al. | |

OTHER PUBLICATIONS

Chinese Patent Office Action for Application No. 202190000999.3 dated Jan. 30, 2024 (2 pages including statement of relevance).
Partial Supplementary European Search Report for Application No. 21907888.8 dated Dec. 13, 2024 (18 pages).
Extended European Search Report for Application No. 21907888.8 dated Mar. 6, 2025 (14 pages).

\* cited by examiner

Interleaved PFC

Totem-Pole Bridgeless PFC

Non-Interleaved PFC

Dual Boost PFC

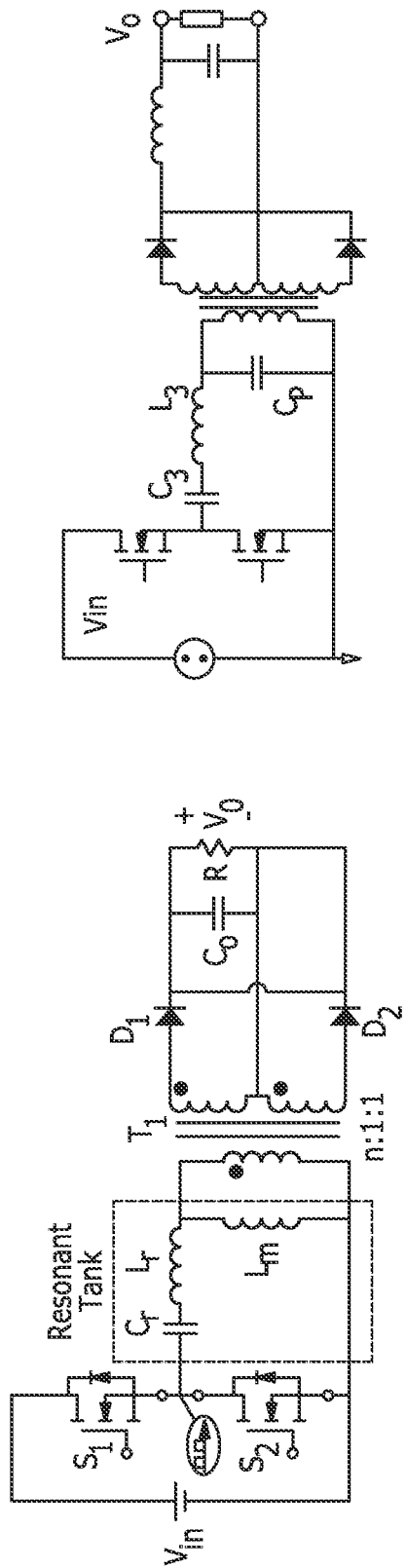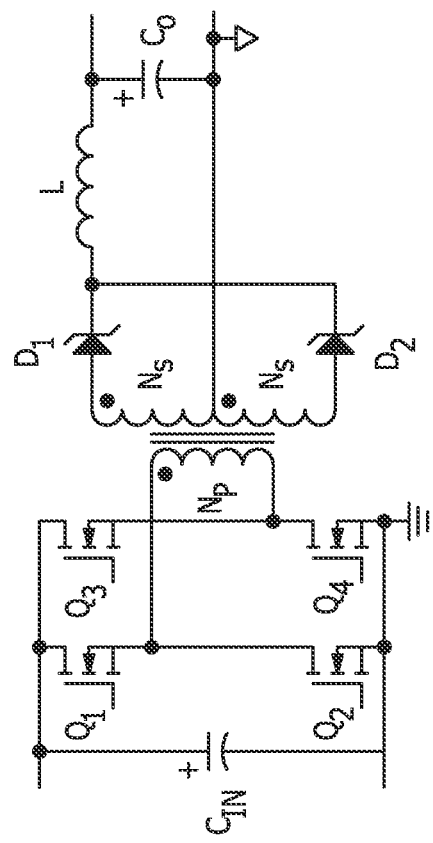
FIG. 7A LLC DC-DC
FIG. 7B LCC DC-DC
FIG. 7C Full Bridge DC-DC

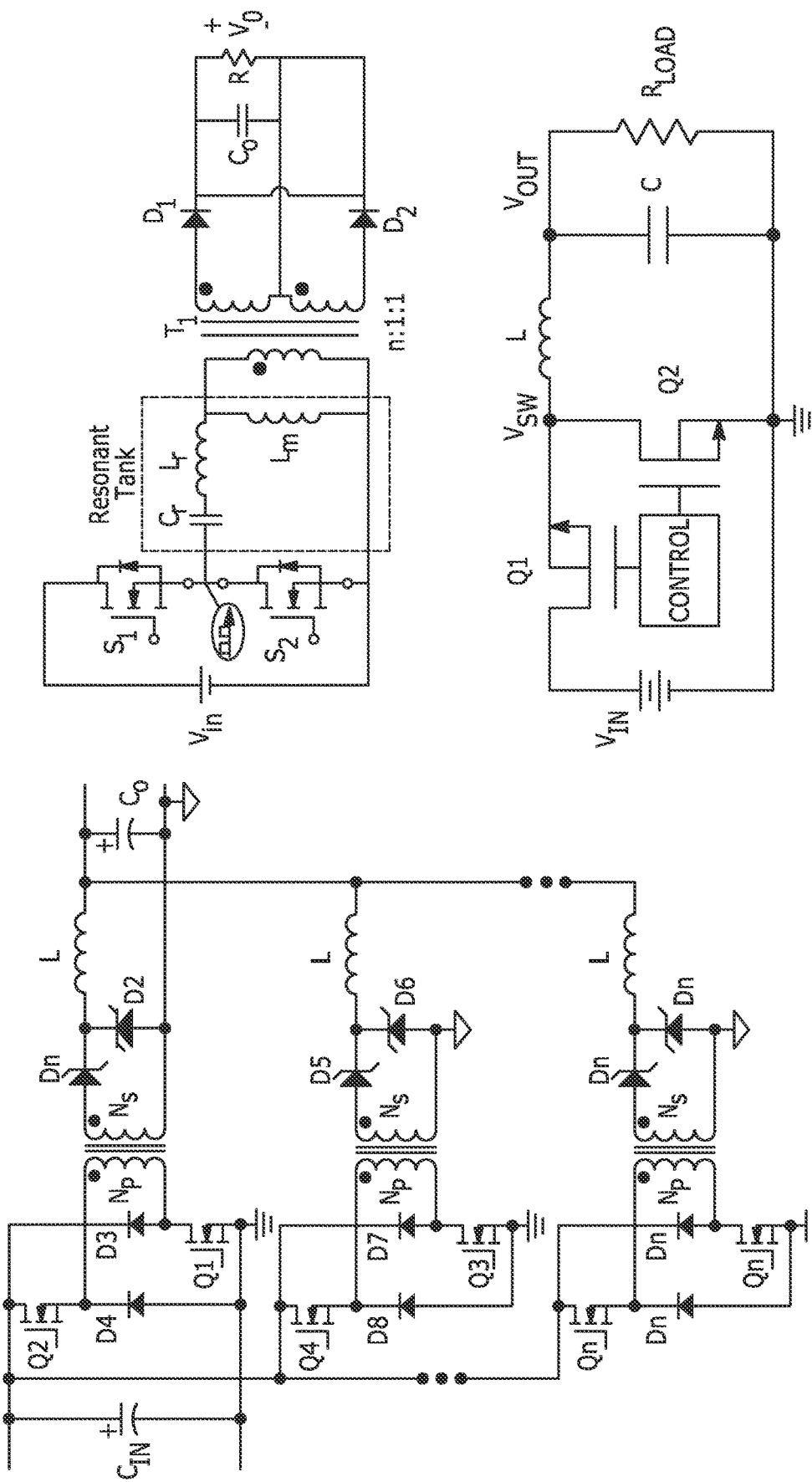
FIG. 7E  LLC+Sync Buck DC-DC
FIG. 7D  ITTF DC-DC

Synchronous Boost DC-DC

Bidirectional CUK DC-DC

Basic Boost DC-DC

Bidirectional Buck-Boost DC

Bidirectional Switch Capacitor DC-DC

Dual Full-Bridge Bidirectional DC

Bidirectional SEPIC-ZETA DC_DC

Dual Half-Bridge Bidirectional DC

Full Bridge Inverter

Cascaded H-Bridge Multilevel Inverter

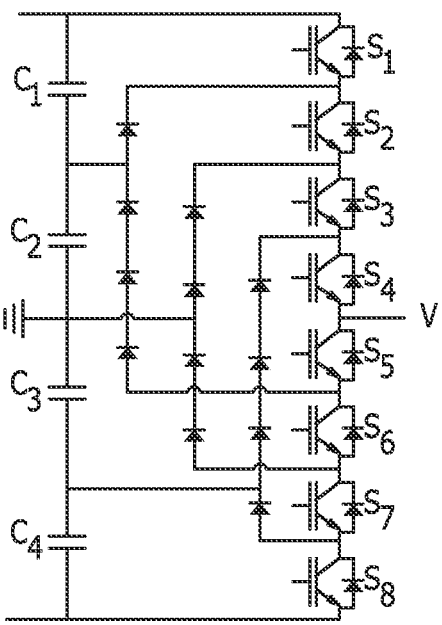
Neutral Point Clamped Multilevel Inverter
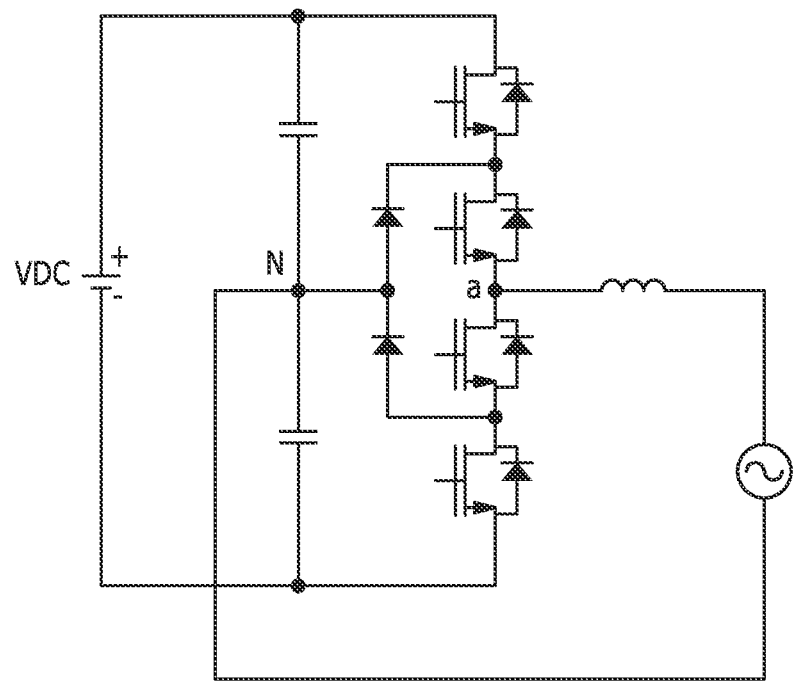
FIG. 9C

Flying Capacitors Multilevel Inverter

PORTABLE POWER SUPPLY

RELATED APPLICATIONS

This application claims the benefit of U.S. Provisional Patent Application No. 63/127,427, filed Dec. 18, 2020, U.S. Provisional Patent Application No. 63/131,055, filed Dec. 28, 2020, U.S. Provisional Patent Application No. 63/157,234, filed Mar. 5, 2021, U.S. Provisional Patent Application No. 63/173,652, filed Apr. 12, 2021, and U.S. Provisional Patent Application No. 63/232,354, filed Aug. 12, 2021, the entire contents of which are hereby incorporated by reference.

FIELD

Embodiments described herein relate to portable power supplies.

SUMMARY

Portable power supplies described herein include an internal power source, an alternative current ("AC") outlet, a direct current ("DC") outlet, and an input unit configured to receive power from a first external source. The portable power supplies described herein further include a first power conversion unit configured to convert the power received from the first external source to a first DC power used for charging the internal power source, an AC power conversion unit configured to convert power output by the internal power source to an AC power used for powering a first peripheral device connected to the AC outlet, and a DC power conversion unit configured to convert power output by the internal power source to a second DC power used for powering a second peripheral device connected to the DC outlet.

Portable power supplies described herein include an internal power source including a first subcore module and a second subcore module, an alternating current (AC) power output, a direct current (DC) power output, an input unit configured to receive power from a first external source, and a power conversion unit configured to convert the power received from the first external source to a first DC power. The portable power supplies further include a subcore charging circuit configured to convert the first DC power output by the power conversion unit to a second DC power used for charging the first subcore module, a switched capacitor circuit configured to convert a third DC power output by the first and second subcore modules to a fourth DC power, an AC power conversion unit configured to convert the fourth DC power output by the switched capacitor circuit to an AC power used for powering a first peripheral device connected to the AC power output, and a DC power conversion unit configured to convert the fourth DC power output by the switched capacitor circuit to a fifth DC power used for powering a second peripheral device connected to the DC power output.

Portable power supplies described herein include a first internal power source including a first subcore module, a second subcore module, and a third subcore module, a second internal power source including a fourth subcore module and a fifth subcore module, and a switch configured to connect the first internal power source in parallel with the second internal power source. The portable power supplies further include an alternating current (AC) power output, a direct current (DC) power output, an input unit configured to receive power from a first external source, and a charging circuit configured to convert the power received from the first external source to a first DC power used for charging the first internal power source. Furthermore, the portable power supplies includes an AC power conversion unit configured to convert a second DC power output by the first internal power source to an AC power used for powering a first peripheral device connected to the AC power output and a DC power conversion unit configured to convert a third DC power output by the first internal power source to a fourth DC power used for powering a second peripheral device connected to the DC power output.

Before any embodiments are explained in detail, it is to be understood that the embodiments are not limited in their application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

Functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not explicitly listed.

Other aspects of the invention will become apparent by consideration of the detailed description and accompanying drawings.

BRIEF DESCRIPTION OF THE DRAWINGS

FIGS. 7A-7E illustrate embodiments of a DC-DC converter included in the portable power supply device of FIG. 1.

FIGS. 9A-9E illustrate embodiments of an inverter included the portable power supply device of FIG. 1.

DETAILED DESCRIPTION

Figure 1:
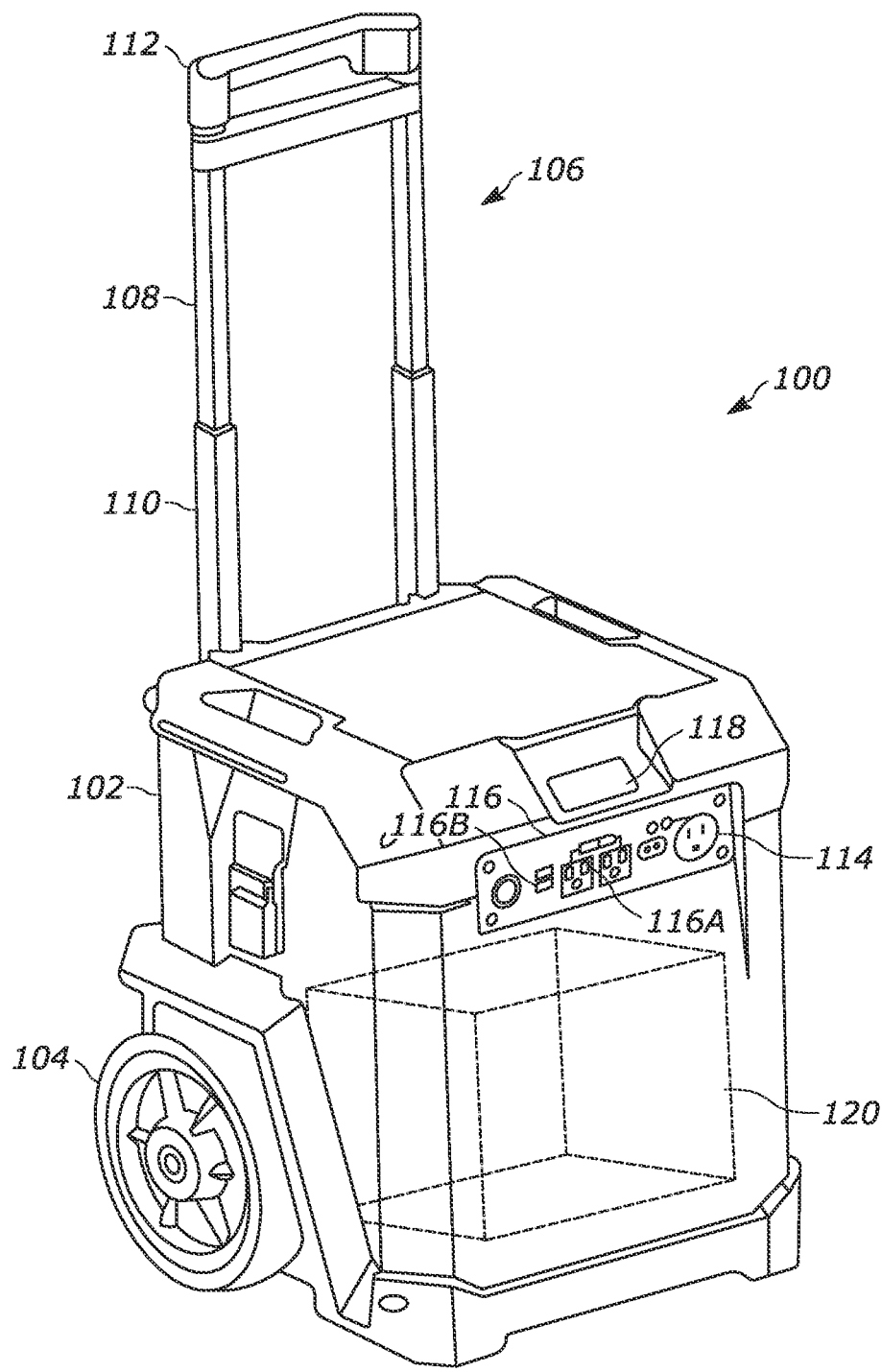
FIG. 1 illustrates a perspective view of a portable power supply device.

FIG. 1 illustrates a portable power supply device or power supply 100. The power supply 100 includes, among other things, a housing 102. In some embodiments, the housing 102 includes one or more wheels 104 and a handle assembly 106. In the illustrated embodiment, the handle assembly 106 is a telescoping handle movable between an extended position and a collapsed position. The handle assembly 106 includes an inner tube 108 and an outer tube 110. The inner tube 108 fits inside the outer tube 110 and is slidable relative to the outer tube 110. The inner tube 108 is coupled to a horizontal holding member 112. In some embodiments, the handle assembly 106 further includes a locking mechanism to prevent inner tube 108 from moving relative to the outer tube 110 by accident. The locking mechanism may include notches, sliding catch pins, or another suitable locking mechanism to inhibit the inner tube 108 from sliding relative to the outer tube 110 when the handle assembly 106 is in the extended position and/or in the collapsed position. In practice, a user holds the holding member 112 and pulls upward to extend the handle assembly 106. The inner tube 108 slides relative to the outer tube 110 until the handle assembly 106 locks in the extended position. The user may then pull and direct the power supply 100 by the handle assembly 106 to a desired location. The wheels 104 of the power supply 100 facilitate such movement.

The housing 102 of power supply 100 further includes a power input unit 114, a power output unit 116, and a display 118. In the illustrated embodiment, the power input unit 114 includes multiple electrical connection interfaces configured to receive power from an external power source. In some embodiments, the external power source is a DC power source. For example, the DC power source may be one or more photovoltaic cells (e.g., a solar panel), an electric vehicle (EV) charging station, or any other DC power source. In some embodiments, the external power source is an AC power source. For example, the AC power source may be a conventional wall outlet, such as a 120 V outlet or a 240 V outlet, found in North America. As another example, the AC power source may be a conventional wall outlet, such as a 220V outlet or 230V outlet, found outside of North America. In some embodiments, the power input unit 114 is replaced by or additionally includes a cable configured to plug into a conventional wall outlet. In some embodiments, the power input unit 114 further includes one or more devices, such as antennas or induction coils, configured to wirelessly receive power from an external power source. The power received by the power input unit 114 may be used to charge a core battery, or internal power source 120, disposed within the housing 102 of power supply 100.

The power received by the power input unit 114 may also be used to provide power to one or more devices connected to the power output unit 116. The power output unit 116 includes one more power outlets. In the illustrated embodiment, the power output unit 116 includes a plurality of AC power outlets 116A and DC power outlets 116B. It should be understood that number of power outlets included in the power output unit 116 is not limited to the power outlets illustrated in FIG. 1. For example, in some embodiments of the power supply 100, the power output unit 116 may include more or fewer power outlets than the power outlets included in the illustrated embodiment of power supply 100.

In some embodiments, the power output unit 116 is configured to provide power output by the internal power source 120 to one or more peripheral devices. In some embodiments, the power output unit 116 is configured to provide power provided by an external power source directly to one or more peripheral devices. The one or more peripheral devices may be a smartphone, a tablet computer, a laptop computer, a portable music player, a power tool, a power tool battery pack, a power tool battery pack charger, or the like. The peripheral devices may be configured to receive DC and/or AC power from the power output unit 116.

In some embodiments, the DC power outlets 116B include one or more receptacles for receiving and charging power tool battery packs. In such embodiments, power tool battery packs received by, or connected to, the battery pack receptacles 116B are charged with power output by the internal power source 120 and/or power received directly from the external power source. In some embodiments, power tool battery packs connected to the battery pack receptacles 116B are used to provide power to the internal power source 120 and/or one or more peripheral devices connected to outlets of the power output unit 116. In some embodiments, the power output unit 116 includes tool-specific power outlets. For example, the power output unit may include a DC power outlet used for powering a welding tool.

The display 118 is configured to indicate a state of the power supply 100 to a user, such as state of charge of the internal power source 120 and/or fault conditions. In some embodiments the display 118 includes one or more light-emitting diode ("LED") indicators configured to illuminate and display a current state of charge of internal power source 120. In some embodiments, the display 118 is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In other embodiments, the power supply 100 does not include a display.

Figure 2:
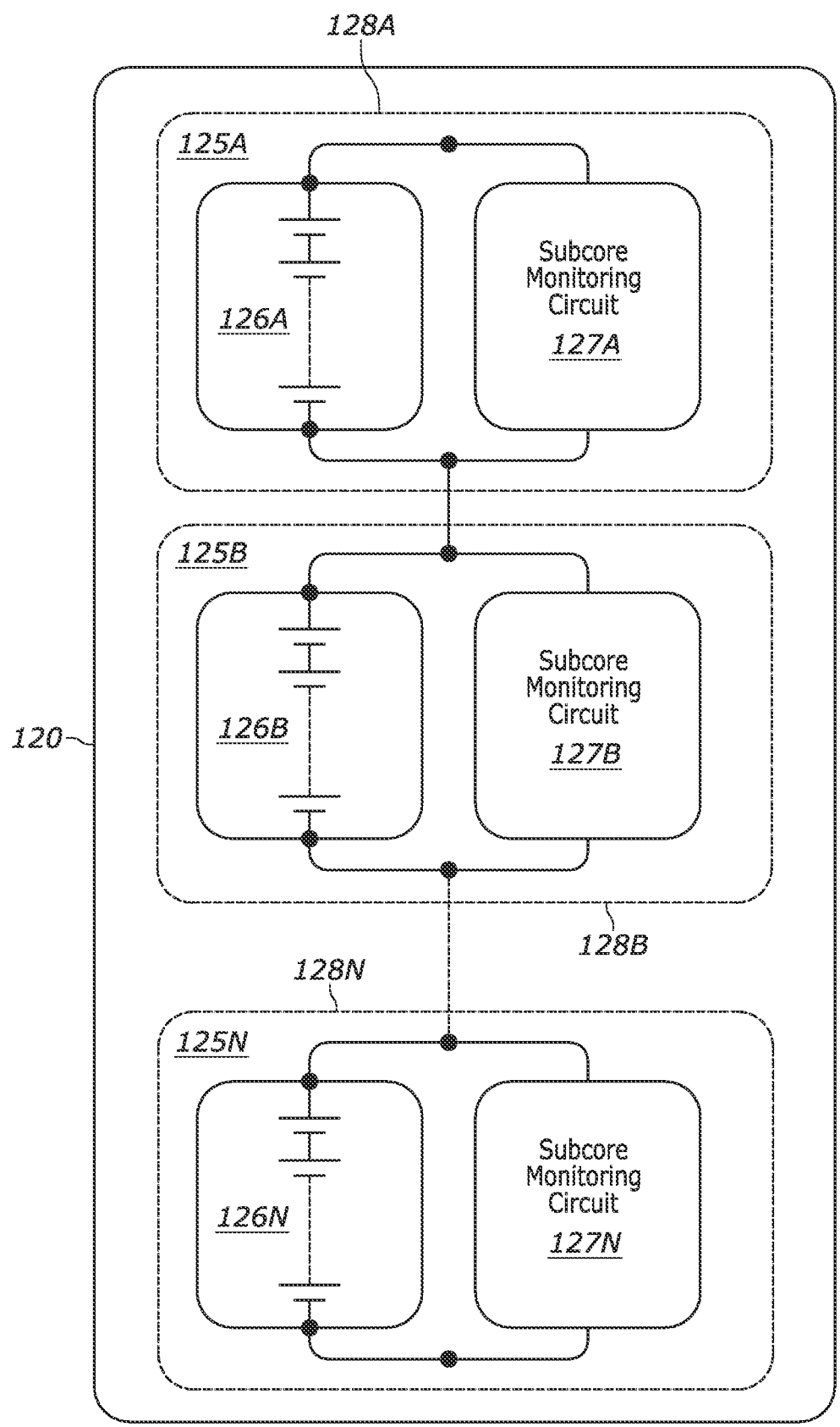
FIGS. 2-3 illustrate embodiments of an internal power source included in the portable power supply device of FIG. 1

FIG. 2 illustrates a block diagram of the internal power source 120 included in the power supply 100 according to some embodiments. As shown in FIG. 2, the internal power source 120 includes one or more subcore modules 125A-125N. At least one subcore module 125 is included in the internal power source 120. However, internal power source 120 may include any desired number, N, of subcore modules 125A-125N. Although illustrated as being connected in series, the subcore modules 125A-125N may be electrically connected in series, in parallel, and/or a combination thereof. In some embodiments, the subcore modules 125A-125N included in the internal power source 120 are implemented as rechargeable battery packs, such as power tool battery packs. As will be described later in more detail, the rechargeable battery packs included in the internal power source 120 may be relatively high voltage (e.g., 72V) battery packs used for powering large power tools.

Figure 3:
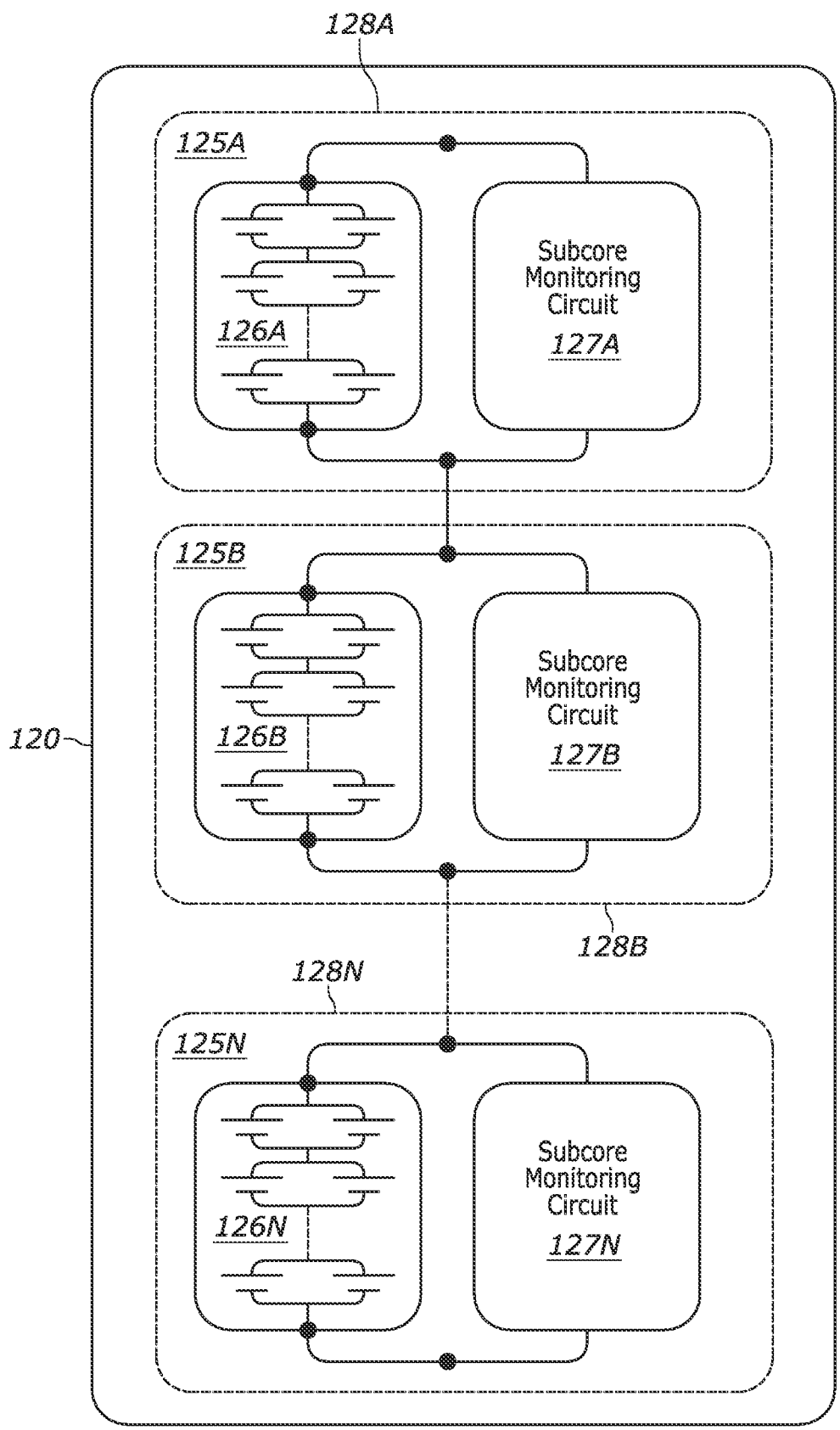

The following description of an individual subcore module 125 is written with respect to subcore module 125A. However, it should be understood that each individual subcore module 125 included in the internal power source 120 can include similar components and include corresponding reference numerals (e.g., 125B, 126B, 127B, 125N, 126N, 127N, etc.). Subcore module 125A includes a stack, or plurality, of battery cells 126A. The stack of battery cells 126A includes at least two battery cells electrically connected in series. However, the stack of battery cells 126A may include as many battery cells as desired. For example, the stack of battery cells 126A may include two, three, four, ten, twenty, twenty-three, twenty-eight, forty-six, seventy or more battery cells electrically connected in series. In some embodiments, the stack of battery cells 126A includes battery cells that are electrically connected in parallel. In some embodiments, the stack of battery cells 126A includes battery cells that are electrically connected in series and in parallel. For example, FIG. 3 illustrates an embodiment of subcore module 125A in which the stack of battery cells 126A are electrically connected in a series-parallel combination. In some embodiments, the subcore module 125A includes multiple stacks of battery cells 126A that are electrically connected in parallel with one another.

The battery cells included in the stack of battery cells 126A are rechargeable battery cells having a lithium ion chemistry, such as lithium phosphate or lithium manganese. In some embodiments, the battery cells included in the stack of battery cells 126A may have lead acid, nickel cadmium, nickel metal hydride, and/or other chemistries. Each battery cell in the stack of battery cells 126A has an individual nominal voltage. The nominal voltage of an individual battery cell included in the stack of battery cells 126A may be, for example, 4.2V, 4V, 3.9V, 3.6V, 2.4V, or some other voltage value. For exemplary purposes, it will be assumed that the nominal voltage of an individual battery cell included in the stack of battery cells 126A is equal to 4V. Accordingly, if the stack of battery cells 126A includes two battery cells connected in series, the nominal voltage of the stack of battery cells 126A, or the subcore module 125A, is equal to 8.0V. Similarly, if the stack of battery cells 126A includes twenty-three battery cells connected in series, the nominal voltage of the subcore module 125A is 92V. As shown in FIG. 3, the amp-hour capacity, or capacity, of subcore module 125A may be increased by adding battery cells connected in a parallel-series combination to the stack of battery cells 126A.

Subcore module 125A further includes a battery, or sub-core, monitoring circuit 127A and a subcore housing 128A. The subcore monitoring circuit 127A is electrically connected to the stack of battery cells 126A and a controller 200 (FIG. 4A) included in the power supply 100. The subcore monitoring circuit 127A receives power from the stack of battery cells 126A during operation of the power supply 100. The subcore monitoring circuit 127A is configured to sense the state-of-charge ("SOC") level, or voltage value, of the stack of battery cells 126A and transmit the voltage readings to the controller 200. The voltage level of subcore module 125A may be determined by measuring the total open circuit voltage of the stack of battery cells 126A or by summing the open circuit voltage measurement of each parallel string of battery cells in the stack of battery cells 126A. In some embodiments, the subcore monitoring circuit 127A is additionally configured to sense a discharge current of the stack of battery cells 126A (e.g., using a current sensor) and/or a temperature of the subcore module 125A (e.g., using a temperature sensor) and transmit the sensed current and/or temperature readings to the controller 200. The subcore monitoring circuit 127A is further configured to receive commands from the controller 200 during operation of the power supply 100.

In some embodiments, the stack of battery cells 126A and subcore monitoring circuit 127A are disposed within the subcore housing 128A of the subcore module 125A. In some embodiments, the stack of battery cells 126A is disposed within the subcore housing 128A and the subcore monitoring circuit 127A is included as a component of the controller 200. In some embodiments, the subcore module 125A does not include a subcore housing 128A.

As described above, the internal power source 120 of power supply 100 may include multiple subcore modules 125 electrically connected in series and/or parallel. For example, if the internal power source 120 includes a first subcore module 125A and a second subcore module 125B electrically connected in series, where each of the first subcore module 125A and the second subcore module 125B has a nominal voltage of 92V, the combined voltage of the first subcore module 125A and second subcore module 125B equals 184V. Accordingly, the voltage level at which the internal power source 120 outputs DC power is 184V. Likewise, if the internal power source 120 includes five series-connected subcore modules 125A-125E, where each of the subcore modules 125A-125E has a nominal voltage of 56V, the voltage level at which the internal power source 120 outputs DC power is 280V. Any number of subcore modules 125A-125N may be electrically connected in series and/or parallel to achieve a desired nominal voltage and/or capacity for internal power source 120.

Figure 4A:
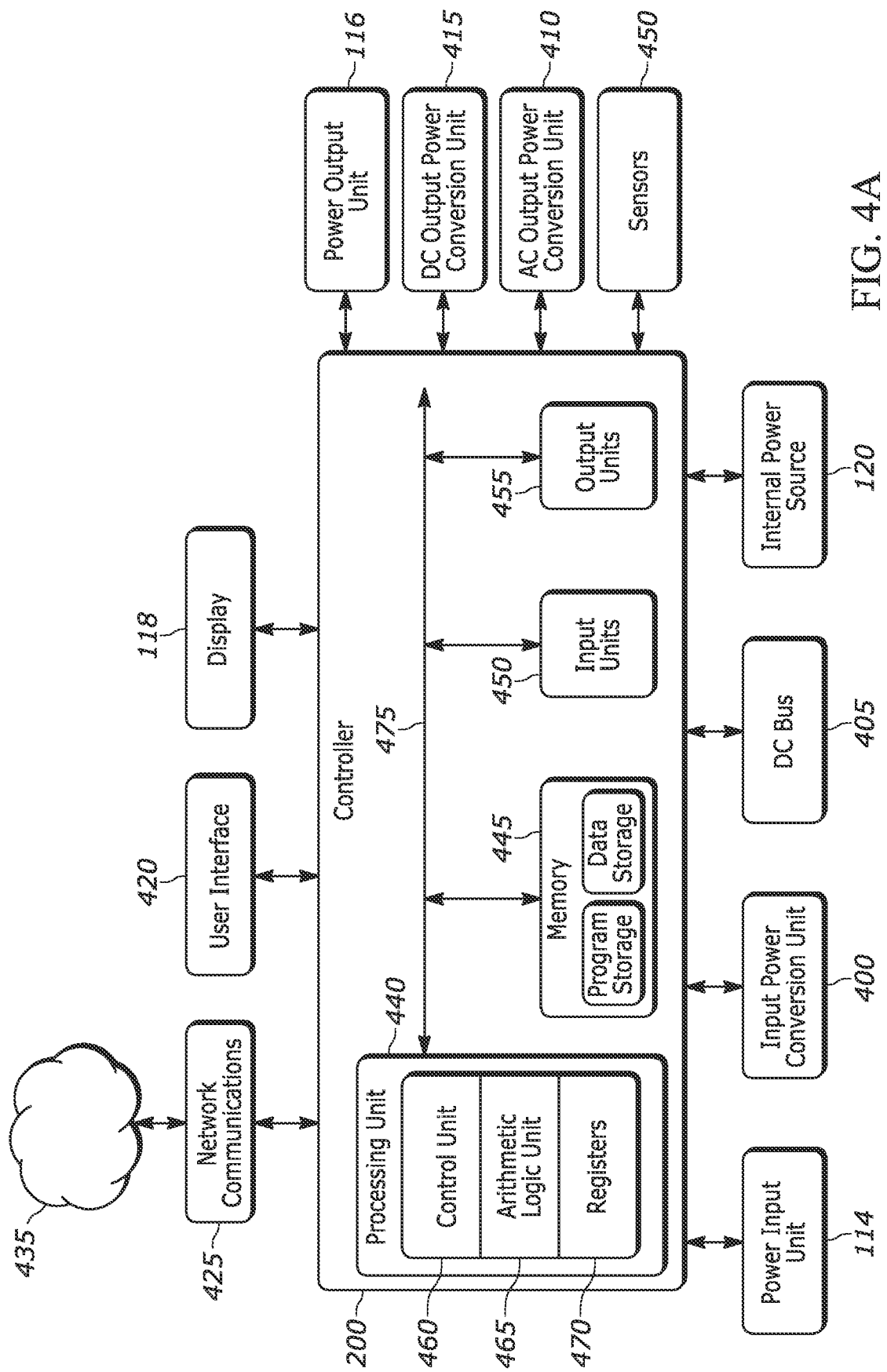
FIG. 4A illustrates a control system for the portable power supply device of FIG. 1.

FIG. 4A is a generalized schematic illustration of the controller 200 included in power supply 100. The controller 200 is electrically and/or communicatively connected to a variety of modules or components of the power supply 100. For example, the controller 200 may be connected to the power input unit 114, the power output unit 116, the display 118, and the internal power source 120. Persons skilled in the art will recognize that electrical and/or communicative connection between the controller 200 and the internal power source 120 includes electrical and/or communicative connection between the controller 200 and components included in the internal power source 120, such as, but not limited to the plurality of subcores 125A-125N and components included therein (e.g., battery cells 126A-16N and subcore monitoring circuits 127A-127B).

The controller 200 is additionally electrically and/or communicatively connected to a an input power conversion unit 400, a DC bus 405, an AC output power conversion unit 410, and a DC output power conversion unit 415, a user interface 420, a network communications module 425, and a plurality of sensors 430. The input power conversion unit 400, DC bus 405, AC output power conversion unit 410, and DC output power conversion unit 415 will be described in more detail below.

The network communications module 425 is connected to a network 435 to enable the controller 200 to communicate with peripheral devices in the network, such as a smartphone or a server. The sensors 430 include, for example, one or more voltage sensors, one or more current sensors, one or more temperature sensors, and/or one or more additional sensors used for measuring electrical and/or other characteristics of the power supply 100. Each of the sensors 430 generates one or more output signals that are provided to the controller 200 for processing and evaluation. The user interface 420 is included to provide user control of the power supply 100. The user interface 420 can include any combination of digital and analog input devices required to achieve a desired level of control for the power supply 100. For example, the user interface 420 may include a plurality of knobs, a plurality of dials, a plurality of switches, a plurality of buttons, or the like. In some embodiments, the user interface 420 is integrated with the display 118 (e.g., as a touchscreen display).

The controller 200 includes combinations of hardware and software that are operable to, among other things, control the operation of the power supply 100, communicate over the network 435, receive input from a user via the user interface 420, provide information to a user via the display 118, etc. For example, the controller 200 includes, among other things, a processing unit 440 (e.g., a microprocessor, a microcontroller, an electronic processor, an electronic controller, or another suitable programmable device), a memory 445, input units 450, and output units 455. The processing unit 440 includes, among other things, a control unit 460, an arithmetic logic unit ("ALU") 465, and a plurality of registers 470 (shown as a group of registers in FIG. 4A), and is implemented using a known computer architecture (e.g., a modified Harvard architecture, a von Neumann architecture, etc.). The processing unit 440, the memory 445, the input units 450, and the output units 455, as well as the various modules or circuits connected to the controller 200 are connected by one or more control and/or data buses (e.g., common bus 475). The control and/or data buses are shown generally in FIG. 4A for illustrative purposes. Although the controller 200 is illustrated in FIG. 4A as one controller, the controller 200 could also include multiple controllers configured to work together to achieve a desired level of control for the power supply 100. As such, any control functions and processes described herein with respect to the controller 200 could also be performed by two or more controllers functioning in a distributed manner.

The memory 445 is a non-transitory computer readable medium and includes, for example, a program storage area and a data storage area. The program storage area and the data storage area can include combinations of different types of memory, such as a read only memory ("ROM"), a random access memory ("RAM") (e.g., dynamic RAM ["DRAM"], synchronous DRAM ["SDRAM"], etc.), electrically-erasable programmable ROM ("EEPROM"), flash memory, a hard disk, an SD card, or other suitable magnetic, optical, physical, or electronic memory devices. The processing unit 440 is connected to the memory 445 and is configured to execute software instructions that are capable of being stored in a RAM of the memory 445 (e.g., during execution), a ROM of the memory 445 (e.g., on a generally permanent basis), or another non-transitory computer readable medium such as another memory or a disc. Software included in the implementation of the power supply 100 and controller 200 can be stored in the memory 445 of the controller 200. The software includes, for example, firmware, one or more applications, program data, filters, rules, one or more program modules, and other executable instructions. The controller 200 is configured to retrieve from the memory 445 and execute, among other things, instructions related to the control processes and methods described herein. In other embodiments, the controller 200 includes additional, fewer, or different components.

During operation of the power supply 100, the controller 200 is configured to monitor voltage, current, and/or other signals received from the various components described above. For example, the controller 200 is configured to monitor voltage signals received from the internal power source 120 when the internal power source 120 is charged by an external power source connected to the power input unit 114. As another example, the controller 200 is configured to monitor voltage signals received from the internal power source 120 when the internal power source 120 provides power to one or more peripheral devices connected to the power output unit 116. More generally, the controller 200 is configured to monitor and/or control power flow to and from the above-described components of power supply 100 that are electrically and communicatively coupled to the controller 200.

Figure 4B:
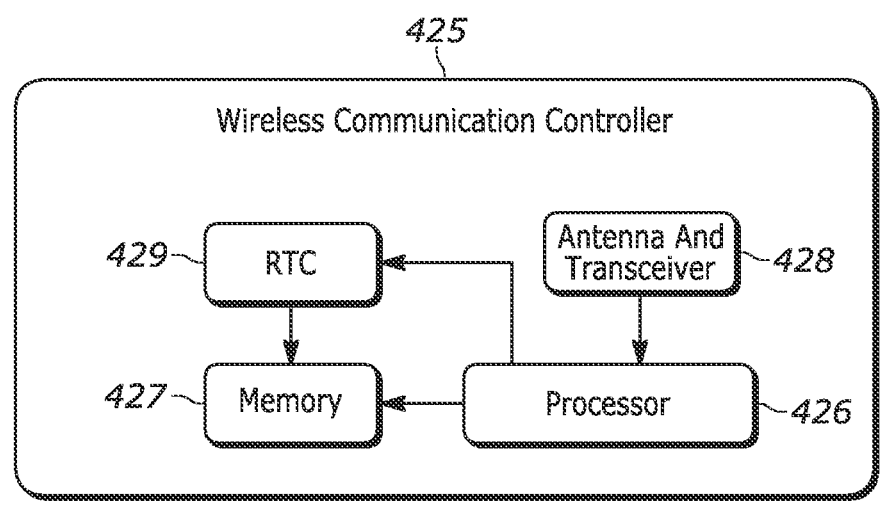
FIG. 4B is a block circuit diagram for network communications module of the portable power supply of FIG. 1.

As shown in FIG. 4B, network communications module or wireless communication controller 425 includes a processor 426, a memory 427, an antenna and transceiver 428, and a real-time clock (RTC) 429. The wireless communication controller 425 enables the power supply 100 to communicate with an external device 437 (see, e.g., FIG. 4C). The radio antenna and transceiver 428 operate together to send and receive wireless messages to and from the external device 437 and the processor 426. The memory 427 can store instructions to be implemented by the processor 426 and/or may store data related to communications between the power supply 100 and the external device 437 or the like.

The processor 426 for the wireless communication controller 425 controls wireless communications between the power supply 100 and the external device 437. For example, the processor 426 associated with the wireless communication controller 425 buffers incoming and/or outgoing data, communicates with the controller 200, and determines the communication protocol and/or settings to use in wireless communications. The communication via the wireless communication controller 425 can be encrypted to protect the data exchanged between the power supply 100 and the external device 437 from third parties.

In the illustrated embodiment, the wireless communication controller 425 is a Bluetooth® controller. The Bluetooth® controller communicates with the external device 437 employing the Bluetooth® protocol. Therefore, in the illustrated embodiment, the external device 437 and the power supply 100 are within a communication range (i.e., in proximity) of each other while they exchange data. In other embodiments, the wireless communication controller 425 communicates using other protocols (e.g., Wi-Fi, ZigBee, a proprietary protocol, etc.) over different types of wireless networks. For example, the wireless communication controller 425 may be configured to communicate via Wi-Fi through a wide area network such as the Internet or a local area network, or to communicate through a piconet (e.g., using infrared or NFC communications).

In some embodiments, the network is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, 5G New Radio, a Digital Enhanced Cordless Telecommunications ("DECT") network, a Digital AMPS ("IS-136/TDMA") network, or an Integrated Digital Enhanced Network ("iDEN") network, etc.

The wireless communication controller 425 is configured to receive data from the controller 200 and relay the information to the external device 437 via the antenna and transceiver 428. In a similar manner, the wireless communication controller 425 is configured to receive information (e.g., configuration and programming information) from the external device 437 via the antenna and transceiver 428 and relay the information to the controller 200.

The RTC 429 increments and keeps time independently of the other power supply components. The RTC 429 receives power from the internal power source 120. Having the RTC 429 as an independently powered clock enables time stamping of operational data (stored in memory 427 for later export) and a security feature whereby a lockout time or threshold is set by a user (e.g., via the external device 437) and the power supply 100 is locked-out, or disabled, when the time of the RTC 429 exceeds the set lockout time.

Figure 4C:
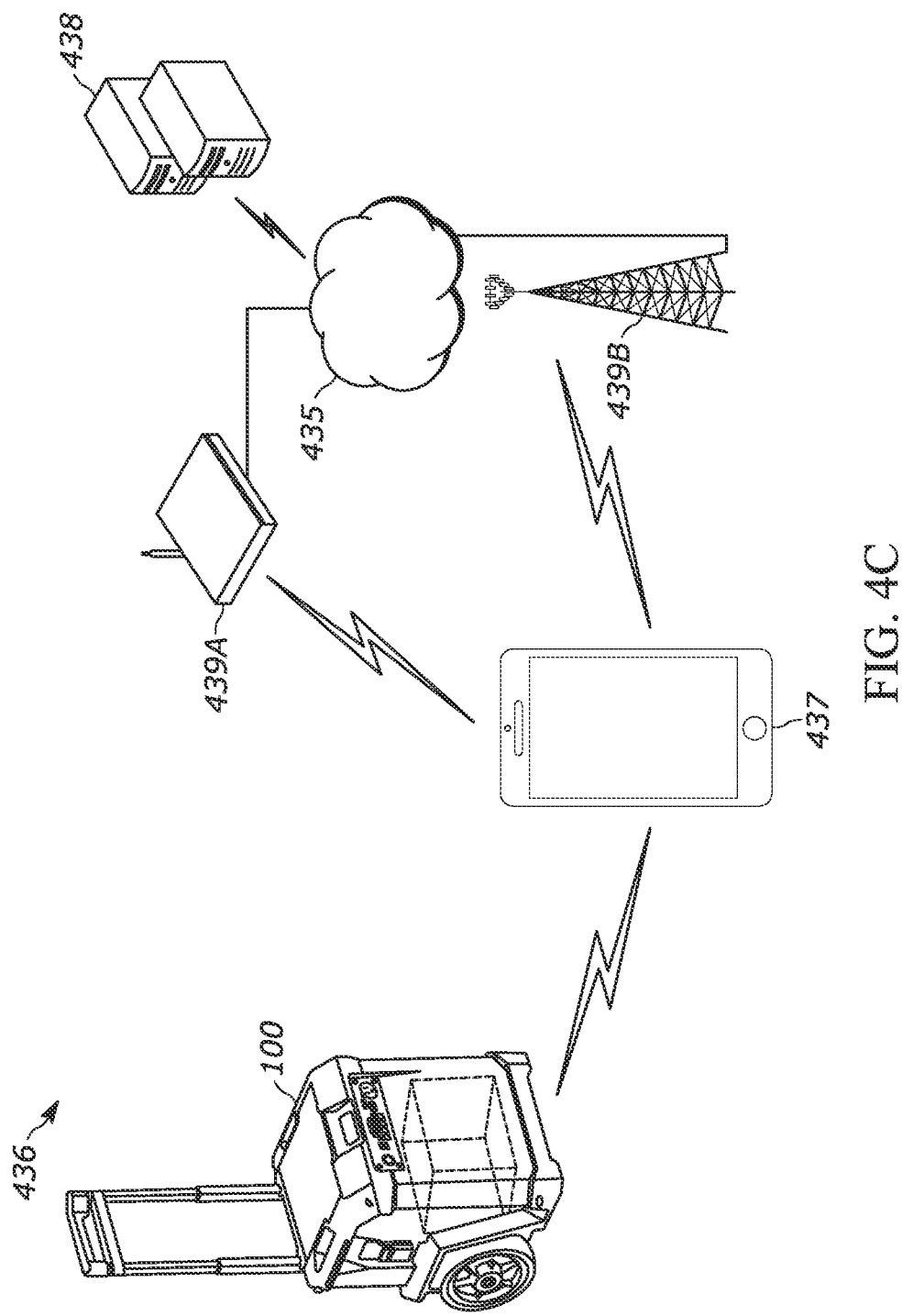
FIG. 4C is a communication system for the portable power supply device of FIG. 1 and an external device.

FIG. 4C illustrates a communication system 436. The communication system 436 includes at least one power supply 100 and an external device 437. Each power supply 100 and the external device 437 can communicate wirelessly while they are within a communication range of each other. Each power supply 100 may communicate power supply status, power supply operation statistics, power supply identification, power supply sensor data, stored power supply usage information, power supply maintenance data, and the like.

Using the external device 437, a user can access the parameters of the power supply 100. With the parameters (e.g., power supply operational data or settings), a user can determine how the power supply 100 has been used, whether maintenance is recommended or has been performed in the past, and identify malfunctioning components or other reasons for certain performance issues. The external device 437 can also transmit data to the power supply 100 for power supply configuration, firmware updates, or to send commands. The external device 437 also allows a user to set operational parameters, safety parameters, operating modes, and the like for the power supply 100.

The external device 437 is, for example, a smart phone (as illustrated), a laptop computer, a tablet computer, a personal digital assistant (PDA), or another electronic device capable of communicating wirelessly with the power supply 100 and providing a user interface. The external device 437 provides the user interface and allows a user to access and interact with the power supply 100. The external device 437 can receive user inputs to determine operational parameters, enable or disable features, and the like. The user interface of the external device 437 provides an easy-to-use interface for the user to control and customize operation of the power supply 100. The external device 437, therefore, grants the user access to the power supply operational data of the power supply 100, and provides a user interface such that the user can interact with the controller 200 of the power supply 100.

In addition, as shown in FIG. 4C, the external device 437 can also share the power supply operational data obtained from the power supply 100 with a remote server 438 connected through a network 435. The remote server 438 may be used to store the power supply operational data obtained from the external device 437, provide additional functionality and services to the user, or a combination thereof. In some embodiments, storing the information on the remote server 438 allows a user to access the information from a plurality of different locations. In some embodiments, the remote server 438 collects information from various users regarding their power supplies and provide statistics or statistical measures to the user based on information obtained from the different power supplies. For example, the remote server 438 may provide statistics regarding the experienced efficiency of the power supply 100, typical usage of the power supply 100, and other relevant characteristics and/or measures of the power supply 100. The network 435 may include various networking elements (routers 439A, hubs, switches, cellular towers 439B, wired connections, wireless connections, etc.) for connecting to, for example, the Internet, a cellular data network, a local network, or a combination thereof as previously described. In some embodiments, the power supply 100 is configured to communicate directly with the remote server 438 through an additional wireless interface or with the same wireless interface that the power supply 100 uses to communicate with the external device 437.

In some embodiments, the power supply 100 is configured to provide output power (e.g., from the internal power source 120) until the internal power source 120 reaches a low-voltage cutoff threshold. In embodiments where the power supply 100 received removable and rechargeable battery packs, the battery packs that are used to provide output power from the power supply 100 can be similarly discharged until reaching low-voltage cutoff thresholds. A user can also program the power supply 100 or select an operating mode of the power supply 100 such that the power supply 100 shuts off (e.g., stops outputting power to the power output unit 116) before the power supply 100 or a connected battery pack reaches a low-voltage cutoff threshold. For example, using the external device 437, the user can enable a power down timer of the controller 200. The user is able to enable the power down timer such that, if output power from the power supply 100 is below a threshold (e.g., a power threshold, a current threshold, etc.) for a selected interval of time (e.g., one hour, two hours, six hours, twelve hours, etc.), the output of the power supply 100 is disabled by controller 200. For example, the controller 200 may be configured to turn off one or more switches to stop the power supply 100 from outputting power when an amount of power output by the power supply 100 is below a threshold for the selected interval. The user can set the threshold value and the interval of time using the external device 437. As an example, a user can set a power threshold value of 80 Watts and a timer interval of one hour. If the power supply 100 is not outputting 80 Watts of power for one hour, the power supply 100 turns off. In some embodiments, the timer is used as an energy saving feature. Rather than powering relatively low-powered devices for an extended period of time, power is preserved for higher power application (e.g., corded power tools). When the power down timer is not enabled, the power supply 100 will not shut off until a low-voltage cutoff threshold is reached and lower powered devices can be powered until the low-voltage cutoff is reached.

Figure 4D:
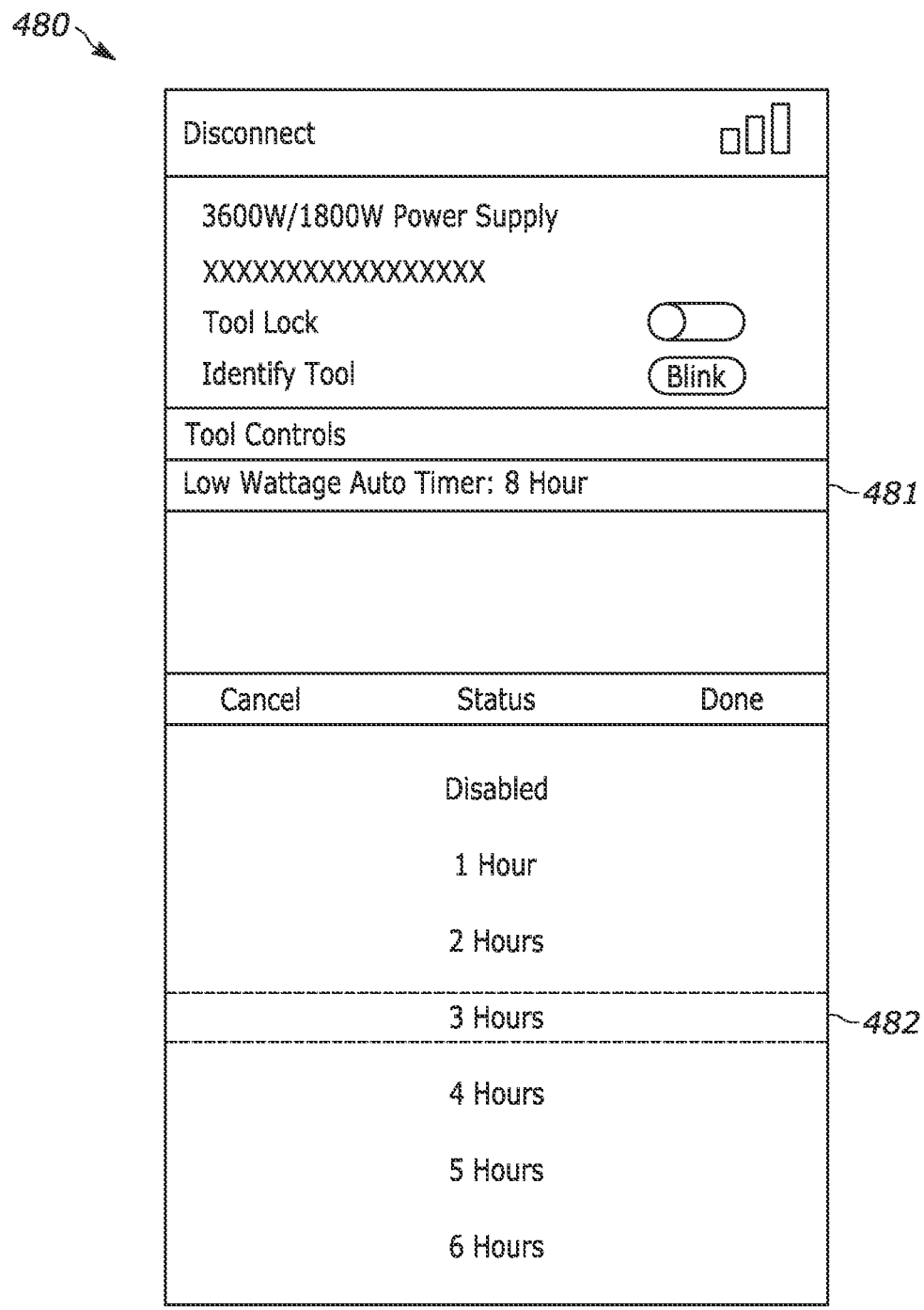
FIG. 4D is an interface of an external device for controlling the power supply device of FIG. 1.

FIG. 4D illustrates an embodiment of an interface 480 of the external device 437 for setting a power down timer. The interface 480 includes a low power or low wattage auto time input and status indicator 481. When the status indicator 481 is selected, a user is prompted in a time select interface 482 to select a value for the power down timer. The values for the timer are shown in one hour intervals, but other timer intervals can also be used. The time select interface 482 can also be used to disable the power down timer.

As described above, in some embodiments, the power supply 100 is configured to operate in accordance with definable cutoff thresholds for charging and/or discharging of the internal power source 120. In such embodiments, preventing charging of the internal power source 120 past a full charge cutoff threshold and/or preventing discharging of the internal power source 120 past a full discharge cutoff threshold helps to extend the lifetime of the internal power source 120.

For example, a user may define one or more full charge cutoff thresholds that correspond to charge levels at which the internal power source 120 is considered to be fully charged. That is, during charging of the power supply 100, the internal power source 120 is configured to receive charging power (e.g., from an external power source) until the charge capacity of internal power source 120 reaches one or more of the full charge cutoff thresholds. When the charge capacity of reaches on or more of the full charge cutoff thresholds, the controller 200 is configured to shut off, or disable, charging of the internal power source 120. For example, the controller 200 turns off one or more switches included in a charging unit of power supply 100 to disable charging of the internal power source 120 when the capacity of internal power source 120 exceeds one or more of the full charge cutoff thresholds. In some embodiments, the one or more full charge cutoff thresholds are defined as percentage values (e.g., 80%, 90%, 100%, etc.) of the nominal charge capacity of the internal power source 120. In such embodiments, the internal power source 120 is considered to be fully charged when the internal power source 120 is charged to 80%, 90%, 100%, or some other user-defined percentage value of the internal power source's 120 nominal capacity. In some embodiments, the one or more full charge cutoff thresholds are defined as voltage values (e.g., 90V, 180V etc.) that are less than or equal to the nominal voltage of internal power source 120. A user can define, or set, the one or more full charge cutoff threshold values using the external device 437.

Similarly, a user may define one or more full discharge cutoff thresholds that correspond to charge levels at which the internal power source 120 is considered to be fully discharged. That is, while the power supply 100 outputs power to one or more load devices, the internal power source 120 is configured to discharge power until the charge capacity of internal power source 120 decreases to one or more of the full discharge cutoff thresholds. When the charge capacity of reaches on or more of the full discharge cutoff thresholds, the controller 200 is configured to shut off, or disable, discharging of the internal power source 120. For example, the controller 200 turns off one or more switches of the power output unit 116 to disable discharging of the internal power source 120 when the capacity of internal power source 120 decreases below one or more of the full charge cutoff thresholds. In some embodiments, the one or more full charge cutoff thresholds are defined as percentage values (e.g., 10%, 20%, 30%, etc.) of the nominal charge capacity of the internal power source 120. In such embodiments, the internal power source 120 is considered to be fully discharged when the internal power source 120 is discharged to 10%, 20%, 30%, or some other user-defined percentage value of the internal power source's 120 nominal capacity. In some embodiments, the one or more full discharge cutoff thresholds are defined as voltage values (e.g., 89.9V, 179.9V etc.) that are less than the nominal voltage of internal power source 120. A user can define, or set, the one or more full discharge cutoff threshold values using the external device 437.

In some embodiments, the power supply 100 is further configured to operate in one or more definable operating modes associated with charging and/or discharging of the internal power source 120. Each operating mode is associated with a respective full charge cutoff threshold and/or a full discharge cutoff threshold defined by the user. That is, a first operating mode corresponds to a first full charge cutoff threshold defined by a user and/or a first full discharge cutoff threshold defined by a user. Likewise, a second operating mode corresponds to a second full charge cutoff threshold defined by the user and/or a second full discharge cutoff threshold defined by a user. Similar to the full charge and discharge cutoff thresholds, the one or more operating modes may be defined, or set, by a user of the external device 437.

Figure 4E:
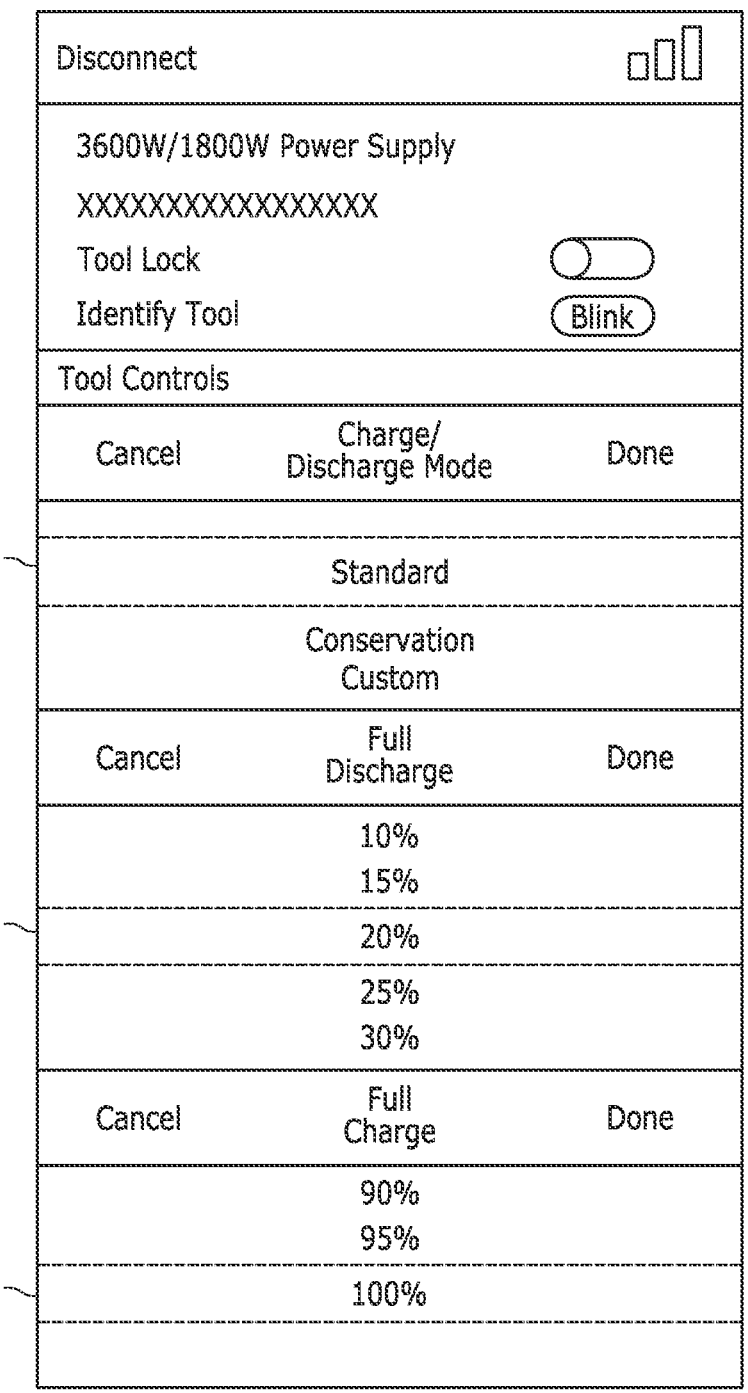
FIGS. 4E, 4F, and 4G illustrate embodiments of an interface of an external device for controlling the power supply device.
Figure 4F:
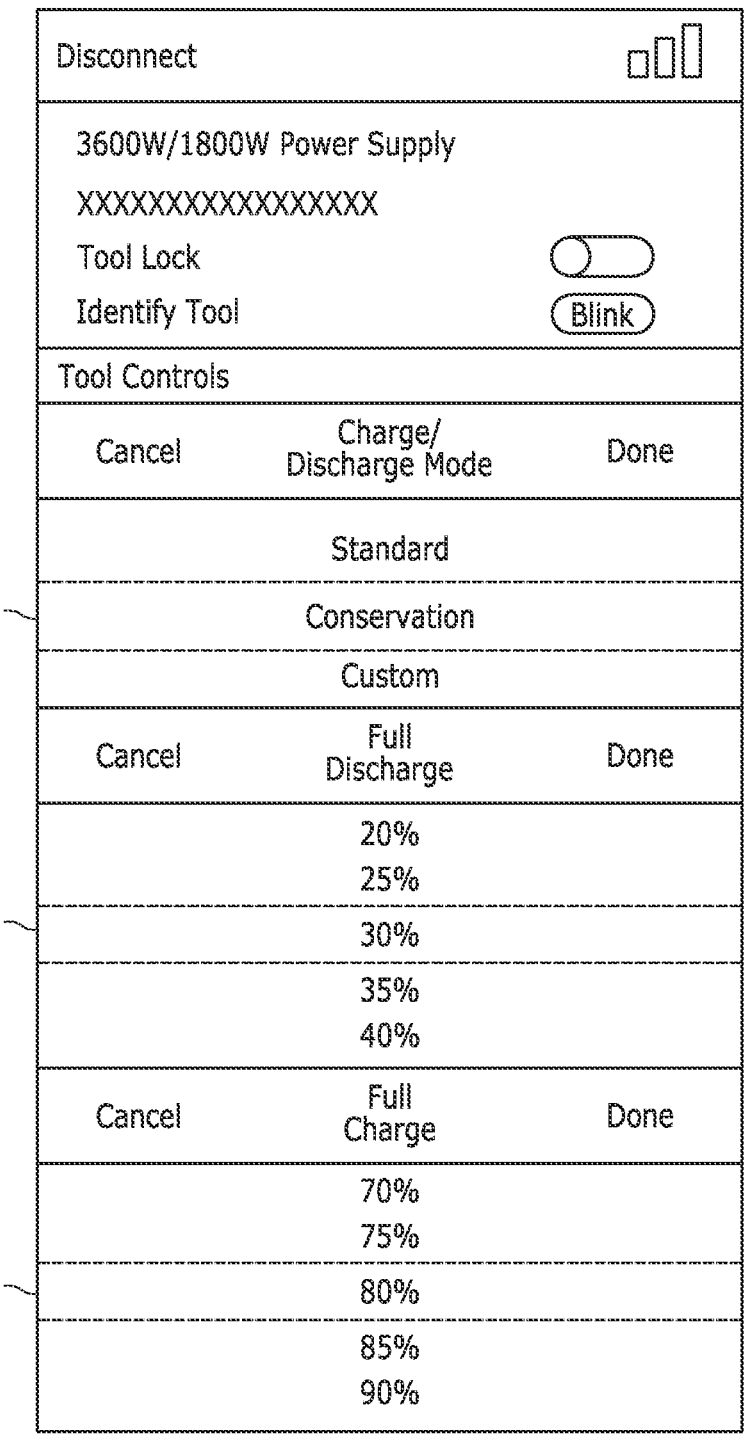
Figure 4G:
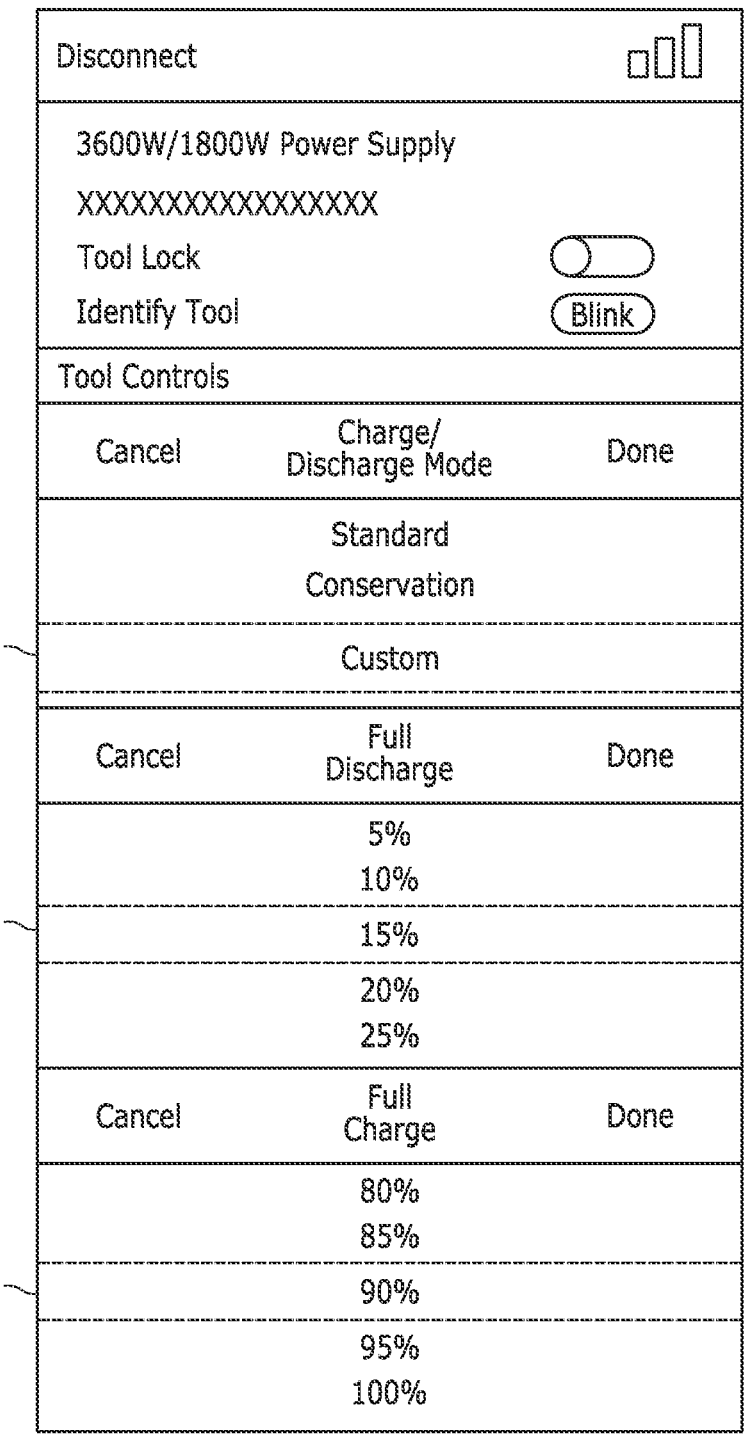

FIGS. 4E-4G illustrate embodiments of an interface 485 of the external device 437 used for setting a first operating mode associated with charging and/or discharging of the internal power source 120. The interface 485 includes an operating mode select interface 486 used for selecting a charge/discharge operating mode (e.g., standard, conservation, custom) of the power supply 100. The interface 485 further includes a full discharge cutoff threshold select interface 487 used for defining a respective value of the full discharge cutoff threshold associated with a selected operating mode. The interface 485 also includes a full charge cutoff threshold select interface 488 used for defining a respective value of the full charge cutoff threshold associated with a selected operating mode.

In the illustrated embodiment of FIG. 4E, the operating mode of power supply 100 is set to a default, or standard, operating mode. As shown, the full discharge cutoff threshold associated with the standard operating mode is defined as 20% of the internal power source 120's nominal capacity and the full charge cutoff threshold associated with the standard operating mode is defined as 100% of the internal power source's 120 nominal capacity. Thus, when a user selects, using select interface 486, the standard operating mode, the full charge and discharge cutoff thresholds may automatically be set to 100% and 20%, respectively. Persons skilled in the art will appreciate that the cutoff threshold values illustrated in FIG. 4E are merely provided as examples, as other full charge and/or full discharge cutoff threshold values may be associated with a standard operating mode of power supply 100. Moreover, it should be understood that the full charge and discharge cutoff thresholds associated with the standard operating mode may be redefined by a user at any time. For example, a user is operable to change, using the select interface 488, the full charge cutoff threshold associated with the standard operating mode from 100% to 98%.

In the illustrated embodiment of FIG. 4F, the operating mode of power supply 100 is set to a conservation operating mode. The conservation operating mode may be selected when a user wishes to extend the lifetime of the internal power source 120. As shown, the full discharge cutoff threshold associated with the conservation operating mode is defined as 30% of the internal power source's 120 nominal capacity and the full charge cutoff threshold associated with the standard operating mode is defined as 80% of the internal power source's 120 nominal capacity. Thus, when a user selects, using select interface 486, the conservation operating mode, the full charge and discharge cutoff thresholds may automatically be set to 80% and 30%, respectively. Persons skilled in the art will appreciate that the cutoff threshold values illustrated in FIG. 4F are merely provided as examples, as other full charge and/or full discharge cutoff threshold values may be associated with a conservation operating mode of power supply 100. Moreover, it should be understood that the full charge and discharge cutoff thresholds associated with the conservation operating mode may be redefined by a user at any time. For example, a user is operable to change, using the select interface 488, the full charge cutoff threshold associated with the standard operating mode from 80% to 78%.

In the illustrated embodiment of FIG. 4G, the operating mode of power supply 100 is set to a custom operating mode. The custom operating mode may be selected when a user does not wish to operate the power supply in accordance with one of the defined operating modes (e.g., standard, conservation, etc.). When the power supply 100 is set to a custom operating mode, a user is able to define, using select interface 487, the full discharge cutoff threshold as any desired value (e.g., 0-100%). Similarly, when the power supply 100 is set to a custom operating mode, a user is operable to define, using select interface 488, the full charge cutoff threshold as any desired value (e.g., 0-100%).

It should be understood that the standard, conservation, and custom operating modes described herein are provided as examples and do not in any way limit the number of defined operating modes of power supply 100. For example, a user may define fewer than or more than three operating modes for charging and/or discharging the power supply 100.

Figure 5:
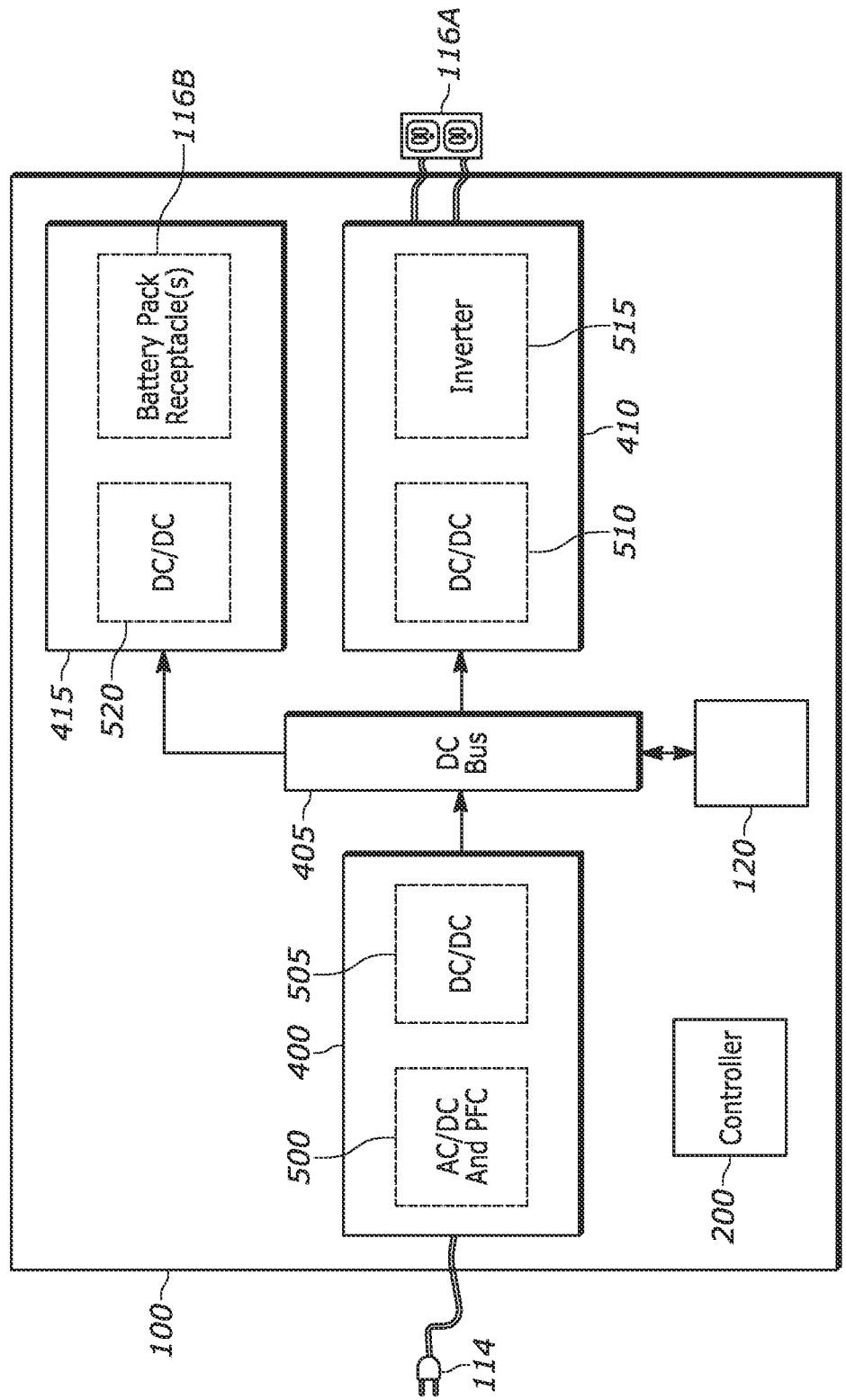
FIG. 5 illustrates a schematic diagram of the portable power supply device of FIG. 1.
Figure 6B:
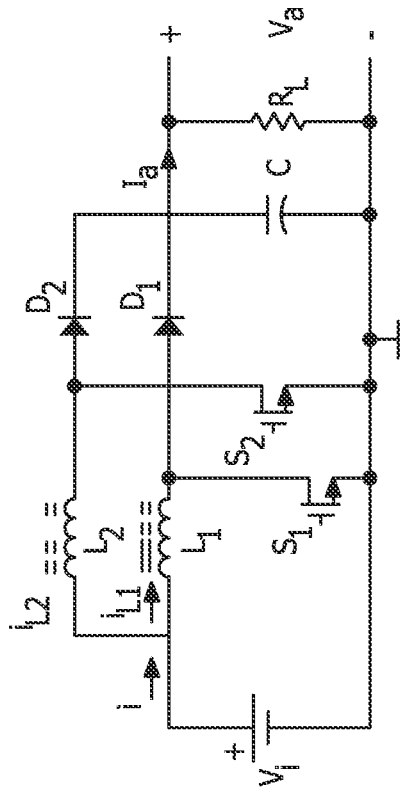
FIGS. 6A-6D illustrate embodiments of a power factor correction circuit included in the portable power supply device of FIG. 1.
Figure 6D:
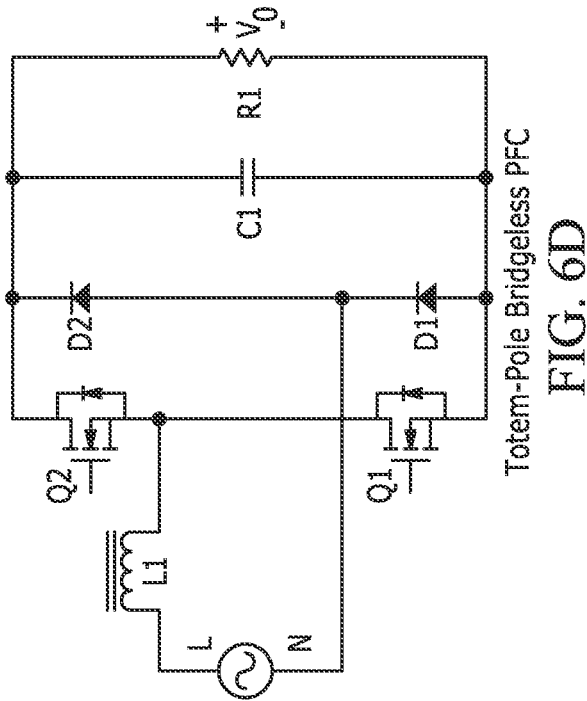
Figure 6A:
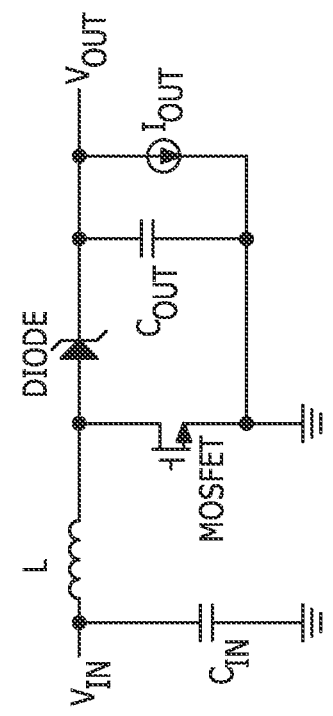
Figure 6C:
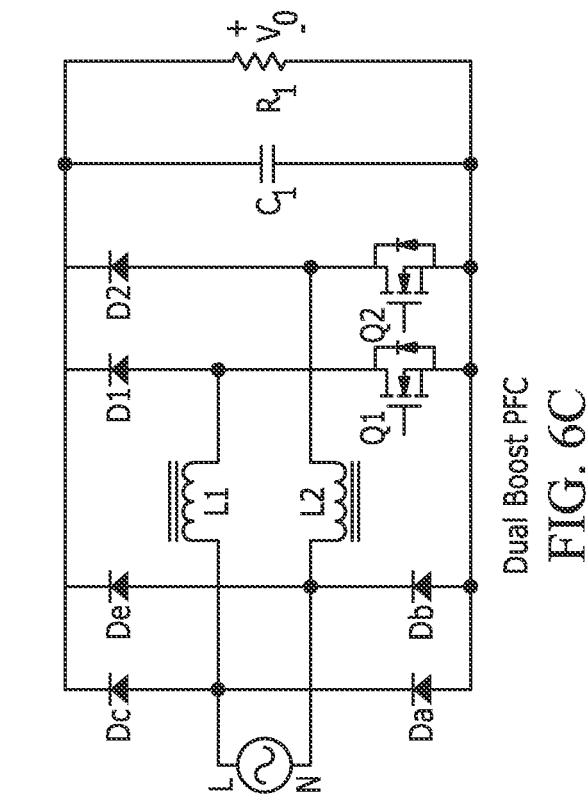

FIG. 5 illustrates a general schematic of the power supply 100 according to some embodiments. As shown in FIG. 5, the power input unit 114 is configured to receive power from an external source and provide the received power to the input power conversion unit 400. Although the power input unit 114 is illustrated as an electrical plug, the power input unit 114 may be implemented as any of the examples described above with respect to the power input unit 114.

The input power conversion unit 400 includes a power factor correction (PFC) circuit 500 and an input DC-DC converter 505. The PFC circuit 500 is configured to convert, or rectify, AC power received from an external source (e.g., a 120V wall outlet) to DC power. The PFC circuit 500 includes components that are configured to smooth, or improve the power factor, of the power rectified by PFC circuit 500. When compared to converter circuits that do not include any PFC components, the PFC circuit 500 operates at an improved efficiency by reducing the amount of current drawn from an external power source during operation of the power supply 100. For example, if power supply 100 demands 3.6 kilowatts (kW) during operation, the PFC circuit 500 would draw less current from the external power source to satisfy the 3.6 kW demand when compared to an amount of current that would be drawn by a converter circuit that does not include any PFC components. In addition, the PFC circuit 500 eases the electromagnetic interference (EMI) requirements of power supply 100 by absorbing the differential mode current that exists within the first input DC-DC converter 505. For example, the PFC circuit 505 may include a capacitor bank, which is connected at the output side of the PFC circuit 505, that supplies most of the differential mode transient current to circuitry downstream of the PFC circuit 505.

FIGS. 6A-6D illustrate various circuit configurations that may be used to implement the PFC circuit 500. In some embodiments, the PFC circuit 500 is implemented as a non-interleaved PFC circuit, such as the one shown in FIG. 6A. Non-interleaved PFC circuits are relatively inexpensive and simple to control when compared to circuits that include a larger number of components. In some embodiments, the PFC circuit 500 is implemented as an interleaved PFC circuit, such as the one shown in FIG. 6B. Interleaved PFC circuits provide improved EMI performance and better heat distribution when compared to other PFC circuit configurations. In addition, interleaved PFC circuits are configured to reduce ripple current at the input side of the of the interleaved PFC circuit while using smaller and less expensive inductors and capacitors than other PFC circuit topologies. In some embodiments, the PFC circuit 500 is implemented as a dual boost PFC circuit, such as the one shown in FIG. 6C. Dual boost PFC circuits require fewer diodes, which operate at high losses, than PFC circuits that include full diode bridges. Additionally, the inclusion of two inductors improves the thermal performance of the dual boost PFC circuit when compared to other PFC circuits. In some embodiments, the PFC circuit 500 is implemented as a totem-pole bridgeless PFC circuit, such as the one shown in FIG. 6D. Totem-pole bridgeless PFC circuits are more efficient than PFC circuits that include a typical diode bridge. The diodes included in a totem-pole bridgeless PFC may be implemented as slow recovery diodes or MOSFETs. In some embodiments, the PFC circuit 500 is implemented as a different PFC circuit.

As described above, the input power conversion unit 400 further includes an input DC-DC converter 505. The input DC-DC converter 505 is configured to convert DC power output at a first voltage level (e.g., 120V) by the PFC circuit 500 to a voltage level (e.g., 36 V, 72 V, 120V, 280V etc.) used to charge the internal power source 120. In some embodiments, the input DC-DC converter 505 is a buck converter configured to decrease the voltage level of DC power output by PFC circuit 500 to a voltage level used to charge the internal power source 120. In some embodiments, the input DC-DC converter 505 is a boost converter configured to increase the voltage level of DC power output by PFC circuit 500 to a voltage level used to charge the internal power source 120. In some embodiments, the input DC-DC converter 505 is a buck/boost converter. In some embodiments, the input DC-DC converter 505 is a single converter circuit. In some embodiments, the input DC-DC converter 505 is implemented as more than one converter circuit.

FIGS. 7A-7E illustrate various circuit configurations that may be used to implement the input DC-DC converter 505. In some embodiments, the input DC-DC converter 505 is implemented as an LLC converter, such as the one shown in FIG. 7A. LLC converters are efficient and have a relatively high power density when compared to other DC-DC converters. In some embodiments, the input DC-DC converter 505 is implemented as an LCC converter, such as the one shown in FIG. 7B. LCC converters are well suited for providing a wide range of output voltage levels. In some embodiments, the input DC-DC converter 505 is implemented as a full bridge converter, such as the one shown in FIG. 7C. By using a phase shift full bridge converter, zero voltage switching can be achieved. In some embodiments, the input DC-DC converter 505 is implemented as an ITTF converter, such as the one shown in FIG. 7D. In such embodiments, multiple ITTF converters may be connected in parallel to individually charge the one or more subcore modules 125, or battery packs, included in the internal power source 120. In some embodiments, the input DC-DC converter 505 is implemented as an LLC/sync buck converter, such as the one shown in FIG. 7E. In such embodiments, the combination of the LLC and sync buck converters provide a DC-DC conversion stage capable of operating at greater than a 90% efficiency. In some embodiments, the input DC-DC converter 505 is implemented as a different converter circuit.

With reference to FIG. 5, the DC bus 405 is configured to transfer DC power between components included in power supply 100. For example, the DC bus 405 delivers DC power output by the input power conversion unit 400 to the internal power source 120 for charging of the internal power source 120. As another example, the DC bus 405 delivers DC power output by the internal power source 120 to the AC output power conversion unit 410 and/or the DC output power conversion unit 415. In some embodiments, the DC bus 405 transfers DC power from the input power conversion unit 400 directly to the AC and DC output power conversion units 410 and 415. The DC bus 405 is implemented as combination of one or more busbars, circuits, wires, and/or terminals used for transferring DC power to and from various components of the power supply 100.

The AC output power conversion unit 410 is configured to convert the DC power provided by internal power source 120 and/or the input power conversion unit 400 to an AC power used for powering one or more peripheral devices connected to the AC outlets 116A. The AC output power conversion unit 410 includes a first DC-DC converter 510 and an inverter 515. The first DC-DC converter 510 is configured to convert DC power from a voltage level used to charge the internal power source 120 (e.g., 36V, 72V, 120V, 280V, etc.) to a voltage level (e.g., 120V, 240V, etc.) that is provided as an input to the inverter 515. In some embodiments, the first DC-DC converter 510 is a boost converter configured to increase the voltage level of DC power provided by the internal power source and/or input power conversion unit 400. In some embodiments, the first DC-DC converter 510 is a buck converter configured to decrease the voltage level of DC power provided by the internal power source 120 and/or the input power conversion unit 400. In some embodiments, the input DC-DC converter 505 is a buck/boost converter. In some embodiments, the input DC-DC converter 505 is a single converter circuit. In some embodiments, the input DC-DC converter 505 is implemented as more than one converter circuit.

Figure 8B:
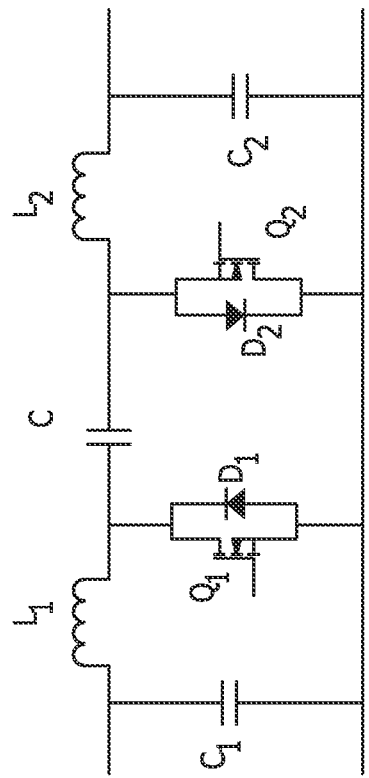
FIGS. 8A-8H illustrate embodiments of a DC-DC converter included in the portable power supply device of FIG. 1.
Figure 8D:
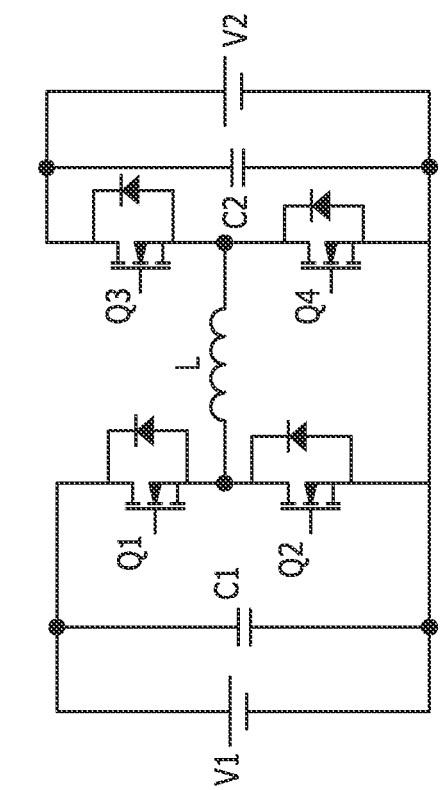
Figure 8A:
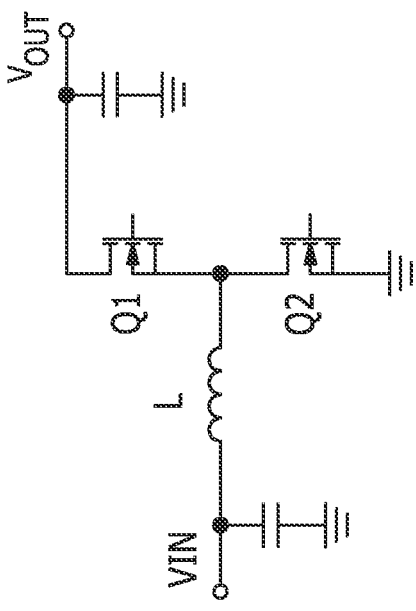
Figure 8C:
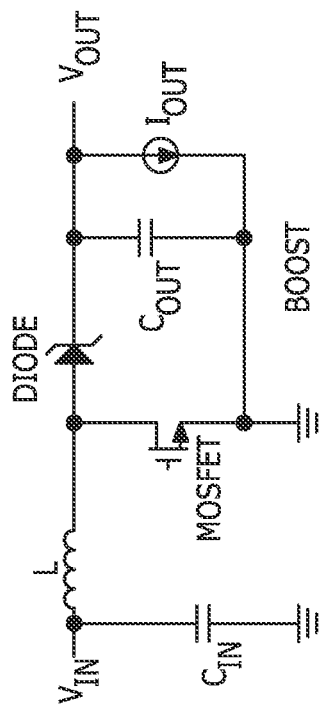
Figure 8F:
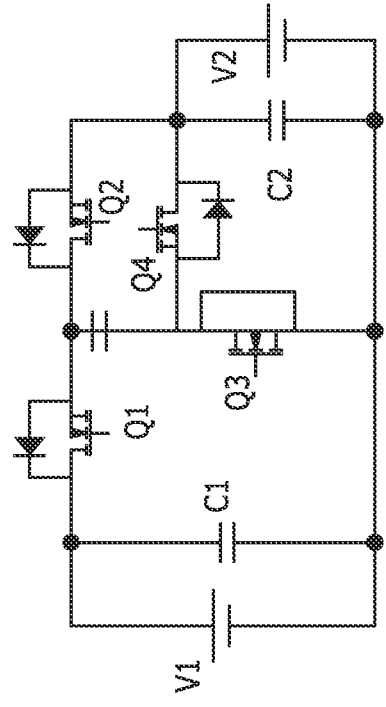
Figure 8H:
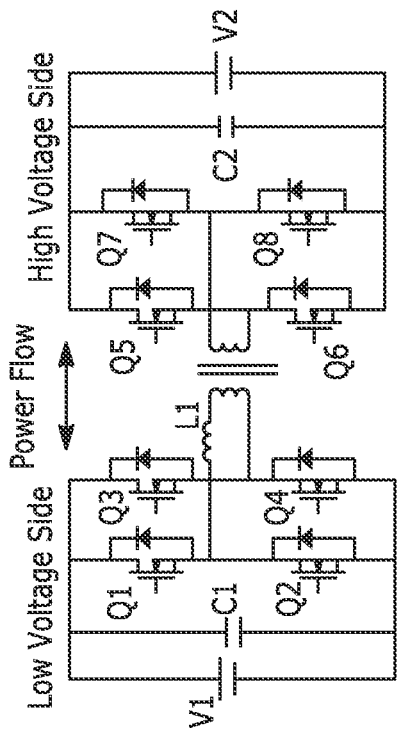
Figure 8E:
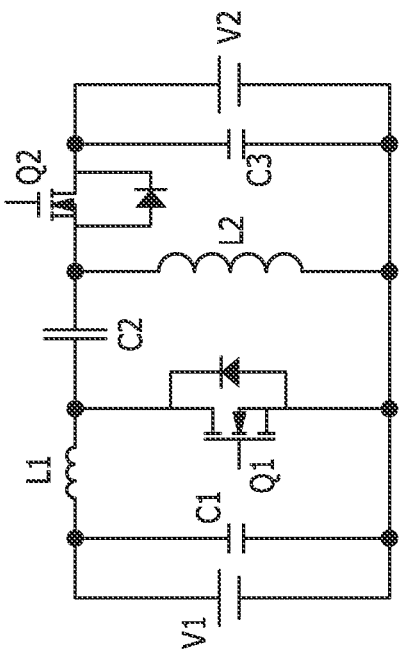
Figure 8G:
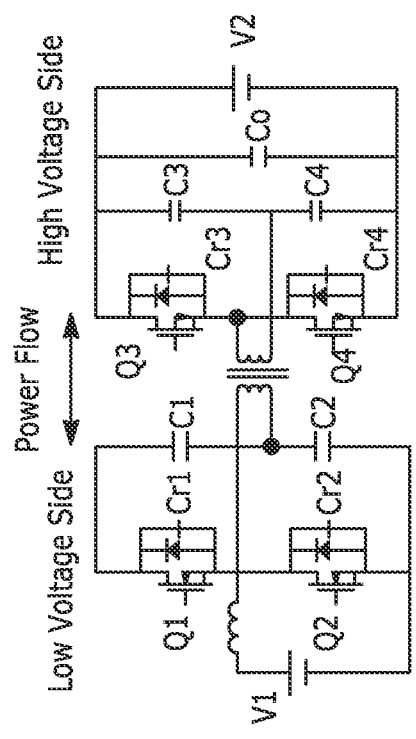

FIGS. 8A-8H illustrate various circuit configurations that may be used to implement the first DC-DC converter 510. In some embodiments, the first DC-DC converter 510 is implemented as a basic boost converter, such as the one shown in FIG. 8A. In some embodiments, the first DC-DC converter 510 is implemented as a synchronous boost converter such as the one shown in FIG. 8B. In some embodiments, the first DC-DC converter 510 is implemented as a bidirectional buck-boost converter, such as the one shown in FIG. 8C. In some embodiments, the first DC-DC converter 510 is implemented as a bidirectional CUK converter, such as the one shown in FIG. 8D. Bidirectional CUK converters produce low ripple currents when compared with other converter circuits. In some embodiments, the first DC-DC converter 510 is implemented as a bidirectional SEPIC-ZETA converter, such as the one shown in FIG. 8E. In such embodiments, the first DC-DC converter 510 operates as a SEPIC buck converter when power flows in a forward direction (e.g., left to right with respect to FIG. 8E) and operates as a ZETA boost converter when power flows in a reverse direction (e.g., right to left with respect to FIG. 8E). In some embodiments, the first DC-DC converter 510 is implemented as a bidirectional switched capacitor converter, such as the one shown in FIG. 8F. The bidirectional switched capacitor converter of FIG. 8F experiences less electromagnetic interference when compared to other converter circuits, as the bidirectional switched capacitor converter of FIG. 8F is a non-isolated converter that does not include any magnetics. In some embodiments, the first DC-DC converter 510 is implemented as a dual half-bridge bidirectional converter, such as the one shown in FIG. 8G. The dual half-bridge bidirectional converter of FIG. 8G is an isolated converter that includes a low number of MOSFETs and gate drivers when compared to full bridge converters. In some embodiments, the first DC-DC converter 510 is a dual full-bridge bidirectional converter, such as the one shown in FIG. 8H. The dual full-bridge bidirectional converter of FIG. 8H is an isolated converter well suited for high power applications. In some embodiments, the first DC-DC converter 510 is implemented as a different converter circuit that is not explicitly shown in FIGS. 8A-8H.

Figure 9A:
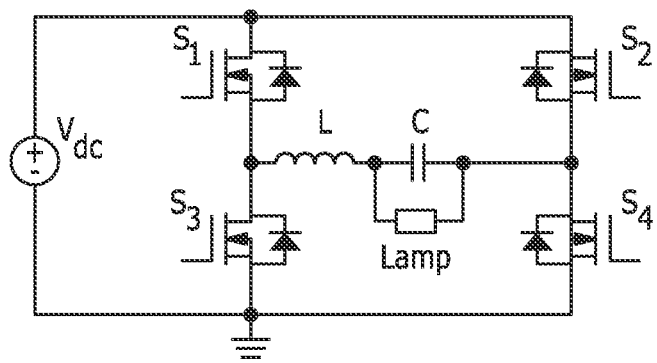
Figure 9B:
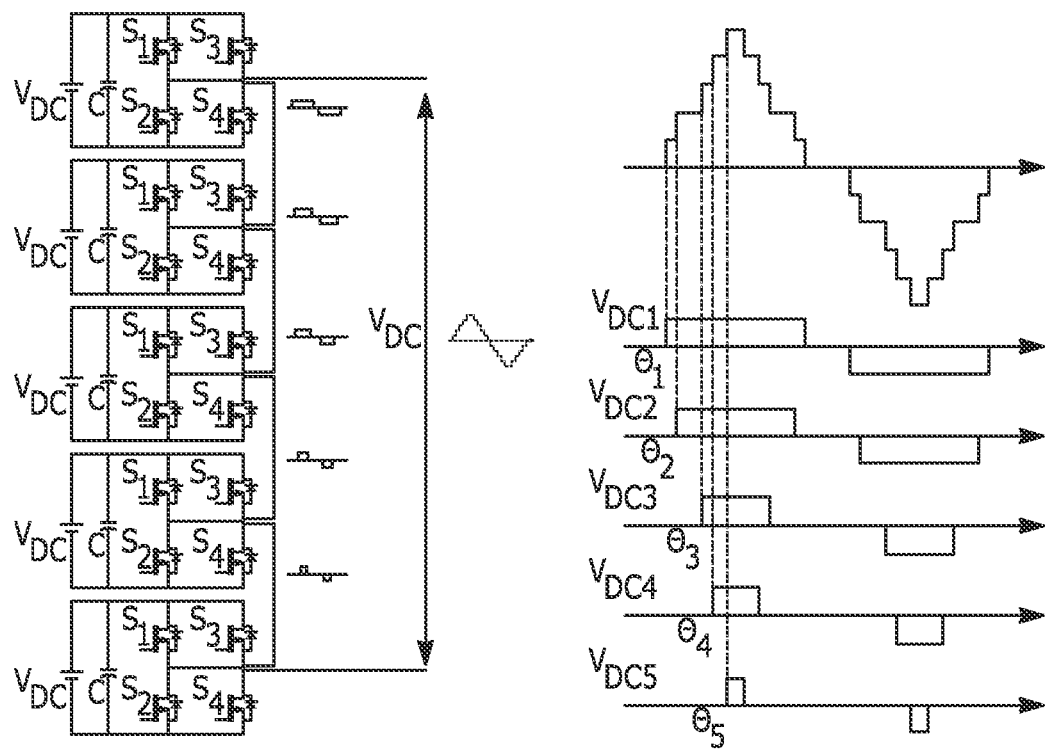
Figure 9E:
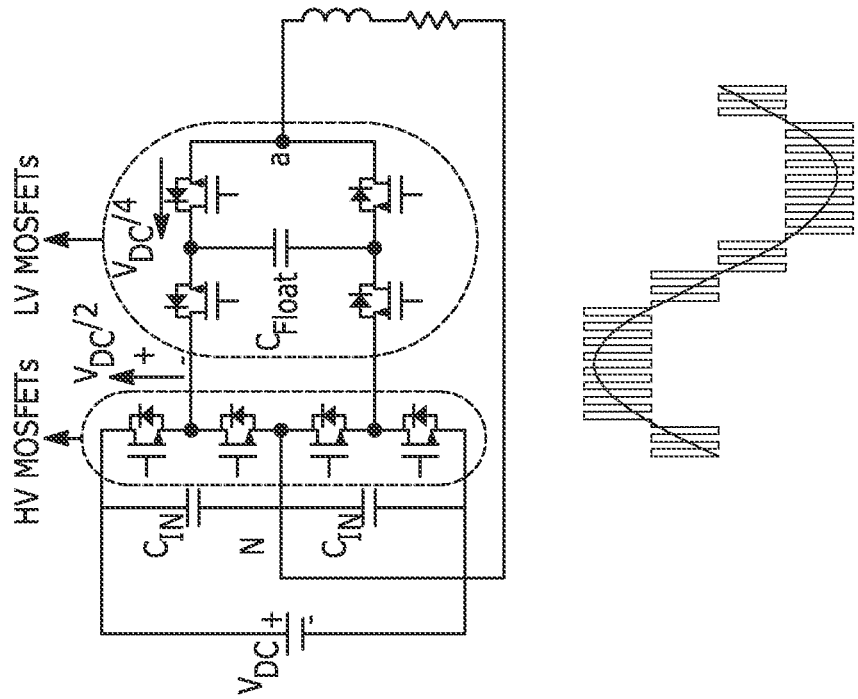
Figure 9D:
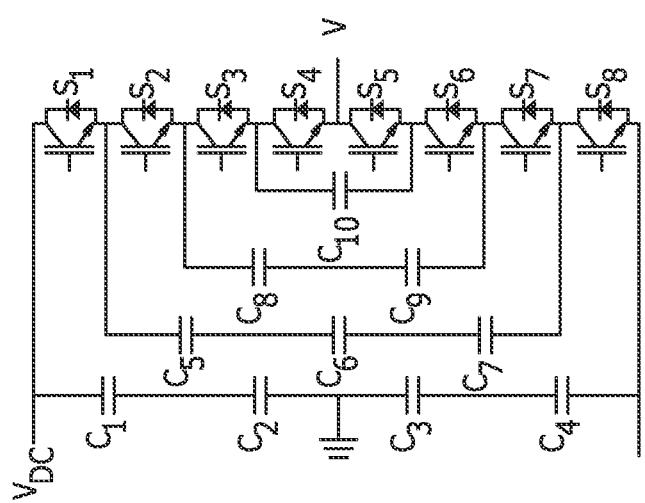

With reference to FIG. 5, the DC power output by the first DC-DC converter 510 is provided as the input to inverter 515. The inverter 515 is configured to convert the DC power output by the first DC-DC converter 510 to AC power used for powering one or more peripheral devices connected to the AC outlets 116A. FIGS. 9A-9E illustrate various circuit configurations that may be used to implement the inverter 515. In some embodiments, the inverter 515 is implemented as a full bridge inverter, such as the one shown in FIG. 9A. Full bridge inverters are relatively simple to control and require fewer switches than other inverters. In some embodiments, the inverter 515 is implemented as a cascaded H-bridge multilevel inverter, such as the one shown in FIG. 9B. The cascaded H-bridge inverter of FIG. 9B includes a modularized circuit layout having the least number of components when compared to other multilevel inverters. In some embodiments, the inverter 515 is implemented as a neutral clamped multilevel inverter, such as the one shown in FIG. 9C. The neutral point clamped multilevel inverter of FIG. 9C is relatively simple to control when compared to other multilevel inverters. In some embodiments, the inverter 515 is implemented as a flying capacitor multilevel inverter, such as the one shown in FIG. 9D. In some embodiments, the inverter 515 is implemented as a flying capacitor based active neutral point clamped (NPC) inverter, such as the one shown in FIG. 9E. In such embodiments, the flying capacitor based active NPC inverter has a reduced volume when compared to a traditional flying capacitor multilevel inverter, as the flying capacitor based active NPC inverter includes 50% less capacitors than the number of capacitors included in a traditional flying capacitor multi-level inverter. In addition, high voltage (HV) MOSFETs included in the flying capacitor based active NPC inverter can be replaced with two or more low voltage (LV) MOSFETs. In some embodiments, the first DC-DC converter 510 is implemented as converter circuit that is not explicitly shown in FIGS. 9A-9E.

With reference to FIG. 5, the DC output power conversion unit 415 is configured to convert the voltage level of DC power provided by internal power source 120 and/or the input power conversion unit 400 to one or more voltage levels of DC power used for powering one or more peripheral devices connected to the DC outlets 116B. In FIG. 5, the DC outlets 116B are illustrated as receptacles configured to charge power tool battery packs. However, it should be understood that the DC outlets 116B are not limited in implantation to battery pack chargers. For example, the DC outlets 116B may additionally or alternatively include DC power outlets such as USB outlets, headphone jacks (AUX cord port), cigarette lighters, or any other types of DC outputs.

In particular, the DC output power conversion unit 415 includes a second DC-DC converter 520 that is configured to convert DC power from a voltage level used to charge the internal power source 120 (e.g., 36V, 72V, 120V, 280V, etc.) to a voltage level (e.g., 5V, 12V, 18V, 36V, 72V, etc.) used to power one or more peripheral devices connected to the DC power outlets 116B. For example, if the DC outlets 116B are battery pack receptacles 116B configured to charge power tool battery packs, the second DC-DC converter 520 converts the DC power from a voltage level used to charge the internal power source 120 to one or more voltage levels used to charge one or more power tool battery packs (e.g., 5V, 12V, 18V, 72V, etc.). In some embodiments, the second DC-DC converter 520 is implemented as one or more of the DC-DC converter configurations described herein. In some embodiments, the second DC-DC converter 520 is implemented as one or more converter configurations not explicitly described herein.

In some embodiments, the second DC-DC converter 520 is implemented using a single DC-DC converter. In such embodiments, the second DC-DC converter 520 may be a wide-output converter capable of outputting DC power at a wide range of voltage levels. In some embodiments, the second DC-DC converter 520 is implemented using multiple DC-DC converters, wherein each of the multiple converters outputs DC power at a different voltage level. For example, the second DC-DC converter 520 may include a first converter that outputs DC power at 12V for charging 12V power tool battery packs, a second converter that outputs DC power at 18V for charging 18V power tool battery packs, and a third converter that outputs DC power at 72V for charging 72V battery packs.

FIGS. 10-27 illustrate various embodiments of the power supply 100 described above. The embodiments of power supply 100 illustrated in FIGS. 10-27 include components that are the same as and/or similar to the components included in the power supply 100 described above. Accordingly, it should be understood that components included in the power supply 100 embodiments illustrated in FIGS. 10-27 are configured to operate in a manner that is the same as and/or similar to the manner in which the components are described as operating above. Moreover, it should be understood that the components of power supply 100 illustrated in FIGS. 10-27 are electrically and communicatively coupled to controller 200, and thus, are controlled by the controller 200. In addition, the embodiments of power supply 100 illustrated in FIGS. 10-27 may also include additional components and/or fewer components than the components described above. Furthermore, it should be understood that any of the embodiments of power supply 100 illustrated in FIGS. 10-27 may be modified to incorporate functionality of and/or combined with of other embodiments of the power supply 100 described herein.

Figure 10:
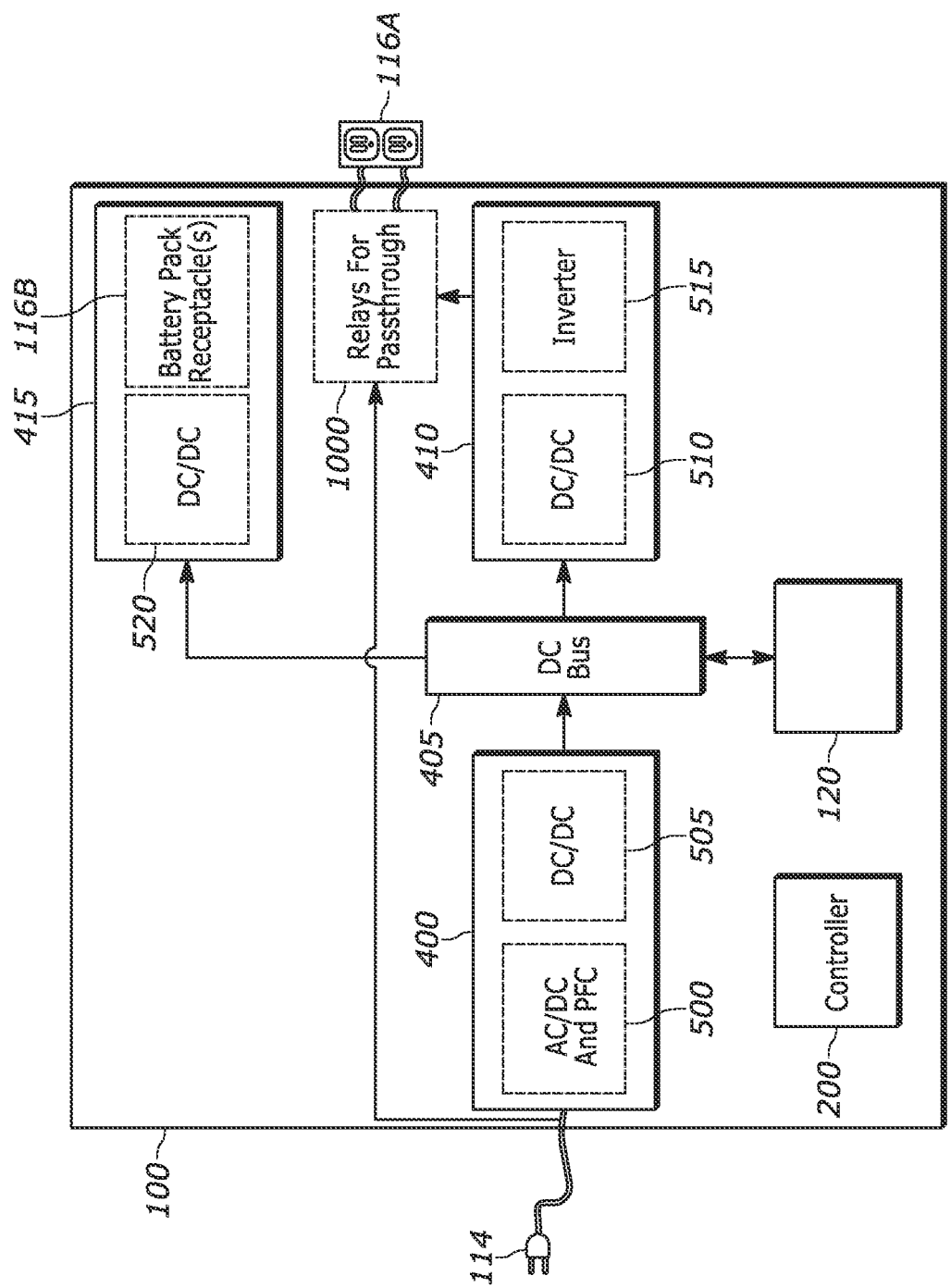
FIGS. 10-28 illustrate embodiments of the portable power supply device of FIG. 1.

FIG. 10 illustrates an embodiment in which the power supply 100 is configured to provide AC power provided by an external source directly to one or more peripheral devices connected to the AC outlets 116A. As shown in the embodiment of FIG. 10, the power supply 100 includes passthrough relays 1000 that are electrically connected between the power input unit 114 and the AC outlets 116A. The passthrough relays 1000 include one or more switches (e.g., transistors, toggle switches, electrical switches, mechanical switches, etc.) that are selectively controlled by the controller 200. For example, when the power input unit 114 is connected to an external power source (e.g., 120V outlet), the controller 200 closes one or more of the passthrough relays 1000 to allow AC power to flow directly form the external power source to the AC outlets 116A. However, when the power input unit 114 is not connected to an external power source, the controller 200 opens one or more of the passthrough relays 1000 to decouple the power input unit 114 from the AC outlets 116A.

The passthrough relays 1000 are additionally configured to couple the AC output power conversion unit 410 to the AC outlets 116A. For example, when the power input unit 114 is not connected to an external power source, the power supply 100 provides AC power output by the AC output power conversion unit 410 to one or more peripheral devices connected to AC outlets 116A. The controller 200 is configured to close one or more of the passthrough relays 1000 to allow power to flow from the AC output power conversion unit 410 to the AC outlets 116A when an external power source is not connected to power input unit 114.

Figure 11:
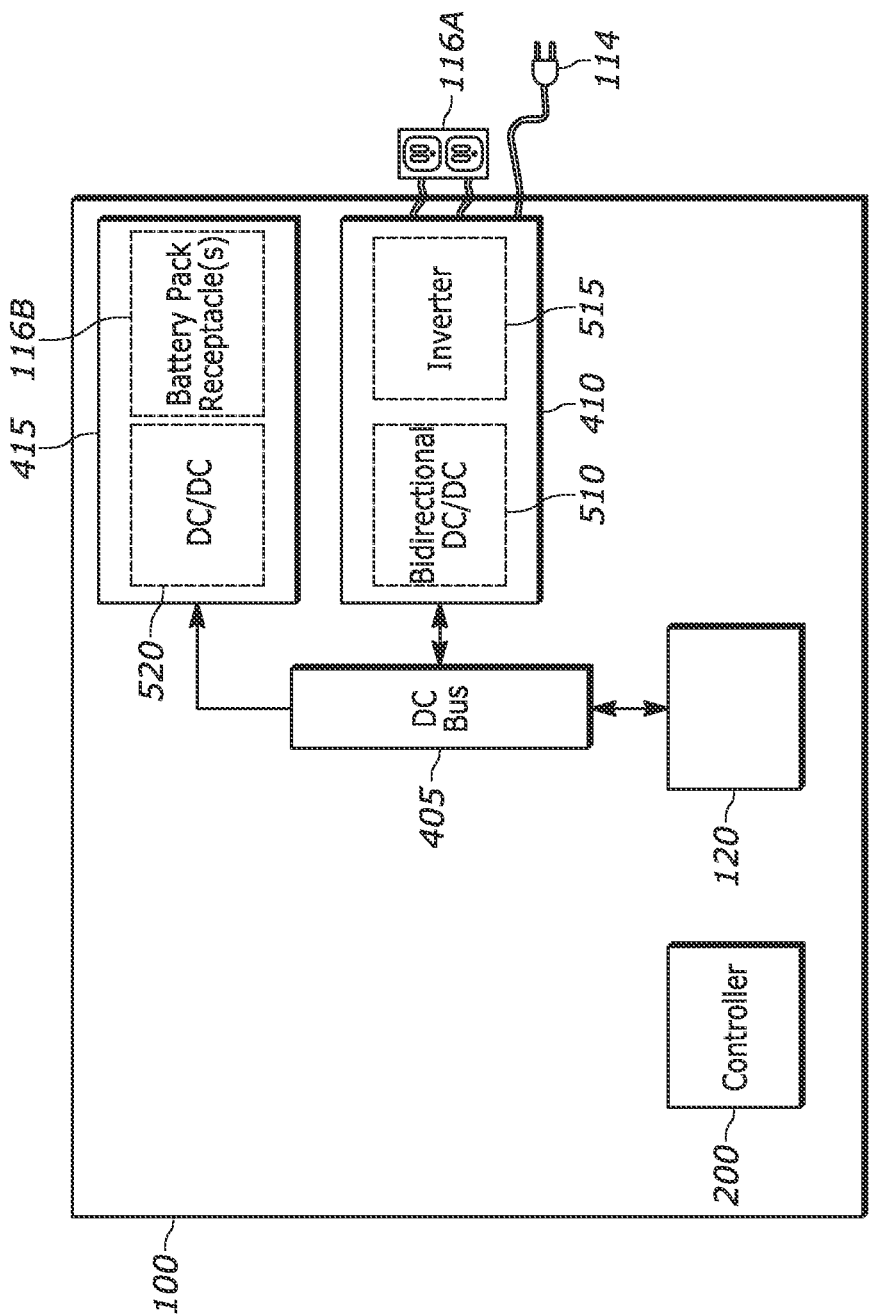

FIG. 11 illustrates an embodiment in which the power supply 100 does not include an input power conversion unit 400. As shown in FIG. 11, the AC output power conversion unit 410 is additionally configured to convert AC power provided by an external power source, via the power input unit 114, to DC power used to charge the internal power source 120. In this embodiment, the inverter 515 is a bidirectional inverter configured to rectify AC power provided by an external power source. That is, in addition to converting DC power to AC power used for powering one or more peripheral devices connected to AC outlets 116A, the inverter 515 is further configured to convert AC power provided by an external power source to DC power. The first DC-DC converter 510 which is a bidirectional converter configured to convert the DC power output by bidirectional inverter 515 to a voltage level used for charging the internal power source 120 (e.g., 36V, 120V, etc.). Therefore, the AC output power conversion unit 410 is configured to charge the internal power source 120 with power received from an external source when power supply 100 does not include an input power conversion unit 400.

Figure 12:
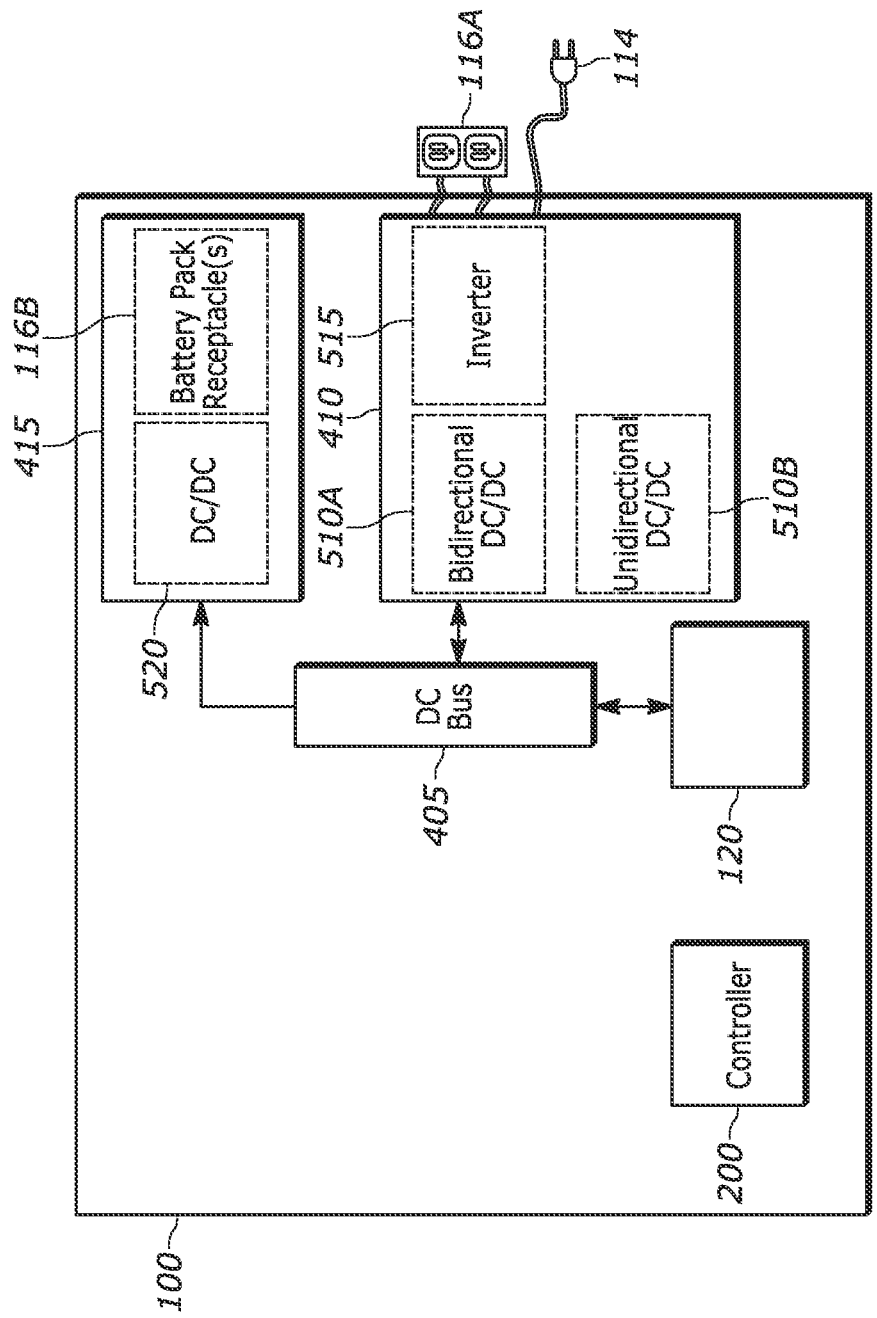

FIG. 12 illustrates another embodiment in which the power supply 100 does not include an input power conversion unit 400. In this embodiment, the AC output power conversion unit 410 includes a bidirectional DC-DC converter 510A, a unidirectional DC-DC converter 510B, and the inverter 515. The bidirectional DC-DC converter 510A is configured to convert DC power output by the internal power source 120 at a first voltage level to DC power provided to the inverter 515 at a second voltage level. The bidirectional DC-DC converter 510A is further configured to convert DC power output by the inverter 515 at a second voltage level to DC power of a first voltage level used for charging the internal power source 120. The unidirectional DC-DC converter 510B is configured to convert DC power output by the internal power source 120 at a first voltage level to DC power provided to the inverter 515 at a second voltage level. However, the unidirectional DC-DC converter is not configured to provide DC power from the inverter 515 to the internal power source 120.

The inverter 515 is a bidirectional inverter. In particular, the inverter 515 is configured to invert the combined DC output of the bidirectional and unidirectional DC-DC converter 510A and 510B when powering one or more peripheral devices connected to the AC outlets 116A. Furthermore, the inverter 515 includes a rectifier and is configured to provide rectified DC power to the bidirectional DC-DC converter 510A for charging the internal power source 510. Thus, when the power supply 100 is providing power to one or more peripheral devices connected to AC outlets 116A, power can flow through both the bidirectional DC-DC converter 510A and the unidirectional DC-DC converter 510B. However, power only flows through the bidirectional DC-DC converter 510A when the internal power source 120 is being charged.

This embodiment of power supply 100 may be useful for instances in which the power used to charge the internal power source 120 is less than an amount of power that power supply 100 is capable of providing to one or more peripheral devices. As an example, the internal power source 120 may be rated for 1 kW charging while the power supply 100 is rated to provide, or discharge, 4 kW of power to one or more peripheral devices connected to the AC outlets 116A. In such an example, the bidirectional DC-DC converter 510A is chosen to have a power rating of 1 kW, as only the bidirectional DC-DC converter 510A is used for charging the internal power source 120. Accordingly, when compared to DC-DC converters of higher power ratings, the 1 kW bidirectional DC-DC converter 510A is smaller, less expensive, and operates more efficiently when charging the internal power source 120. To make up for the relatively small power rating of the bidirectional DC-DC converter 510A, the power rating of the unidirectional DC-DC converter 510B is chosen to be 3 kW. Accordingly, when the power supply 100 is used to power one or more peripheral devices connected to the AC outlets 116A, the 1 kW bidirectional DC-DC converter 510A and the 3 kW unidirectional DC-DC converter 510B combine to output 4 kW of DC power to the inverter 515. It should be understood that the AC output power conversion unit 410 may include DC-DC converters of various other power ratings. Furthermore, the relative power ratings of the DC-DC converters 510A and 510B described above are provided merely as examples.

Figure 13:
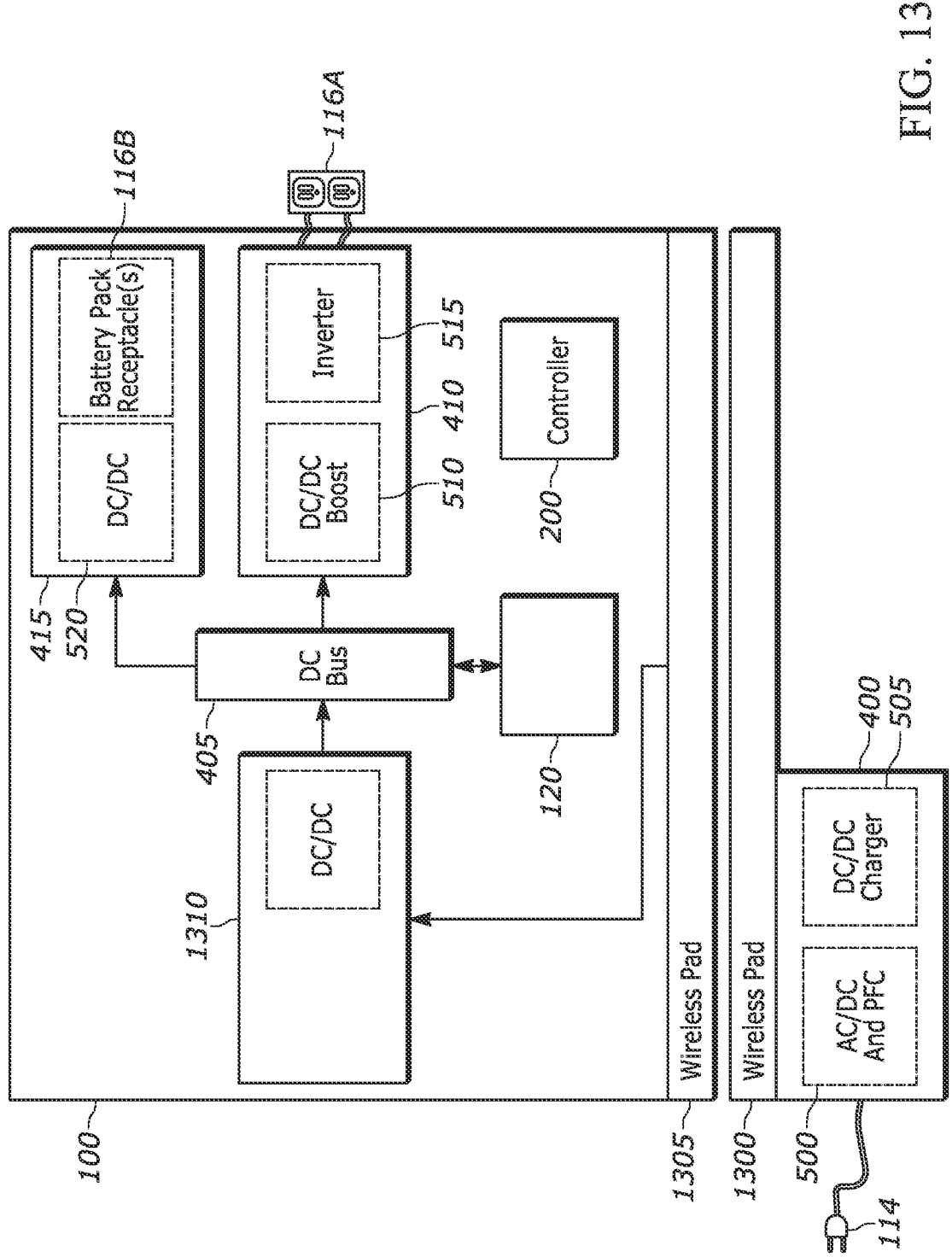

FIG. 13 illustrates an embodiment in which the power supply 100 is configured to wirelessly receive power form an external power source. As shown in FIG. 13, the power supply 100 includes a transmission-side, or first, wireless charging pad 1300 and a receiving-side, or second, wireless charging pad 1305. The input power conversion unit 400 is configured to convert AC power received, via power input unit 114, from an external power source to DC power that is to be wirelessly transmitted by the first wireless charging pad 1300. In particular, the first wireless charging pad 1300 is configured to wirelessly transmit the DC power output by input power conversion unit 400 to the second wireless charging pad 1305. The second wireless charging pad 1305 is configured to wirelessly receive the DC power transmitted by the first wireless charging pad 1300 and provide the received DC power to a second input power conversion unit 1310. The second input power conversion unit 1310 includes a DC-DC converter configured to convert the DC power received from second wireless charging pad 1305 to a voltage level used to charge the internal power source 120. The input power conversion unit 400 and the first wireless charging pad 1300 may be integrated into a toolbox, rolling workbox storage unit, or the like. Similarly, the second wireless charging pad 1305 may be integrated with a bottom surface of the power supply 100. Accordingly, the power supply 100 may wirelessly receive power from first wireless charging pad 1300 when the power supply 100 is placed on top of the first wireless charging pad 1300.

Figure 14:
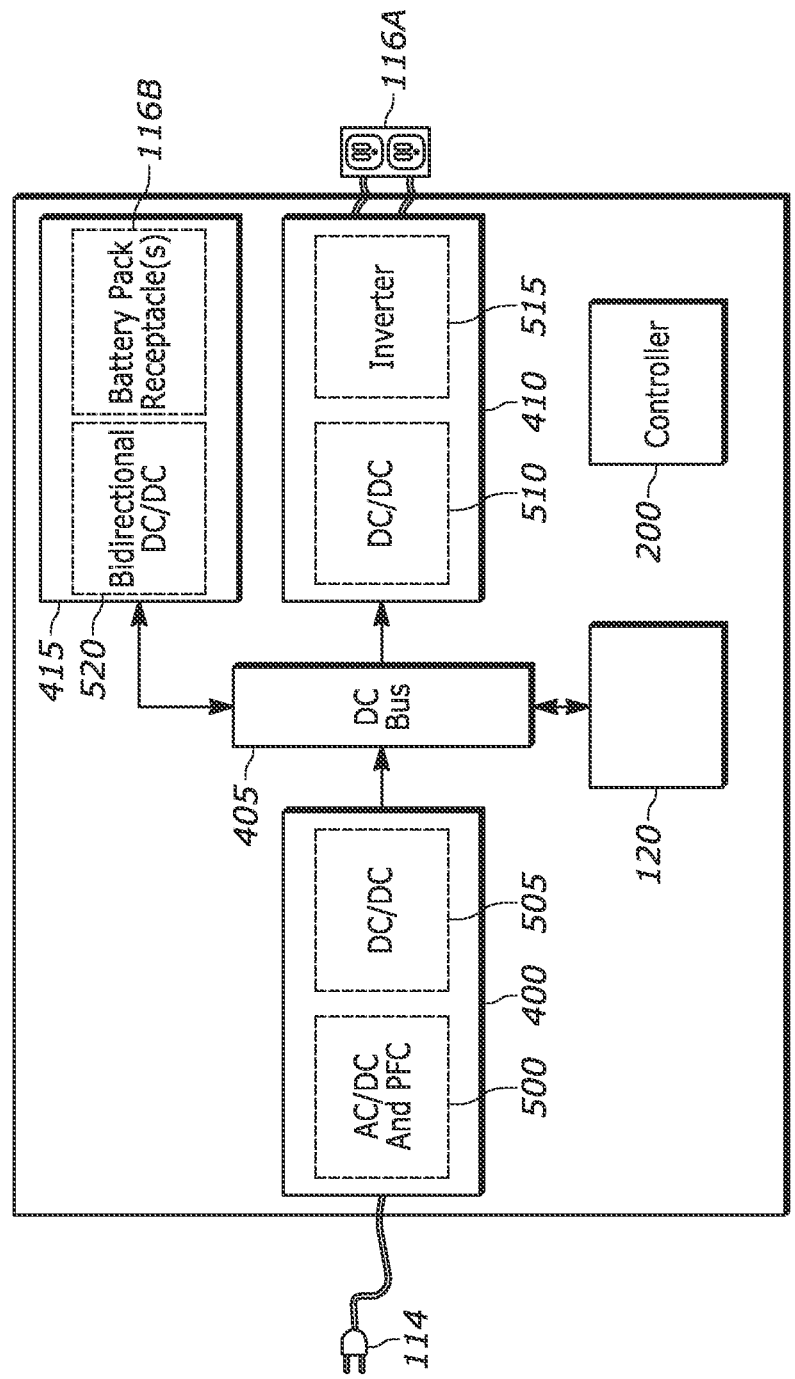

FIG. 14 illustrates an embodiment in which power tool battery packs connected to the battery pack receptacles 116B are used to power the power supply 100. In this embodiment, the second DC-DC converter 520 is a bidirectional converter configured to convert DC power provided by one or more battery packs connected to the battery pack receptacles 116B to a voltage level used to charge the internal power source 120. The DC power output by the second DC-DC converter 520 is transferred, via the DC bus 405, to the internal power source 120 for charging and/or the AC output power conversion unit 410 for powering one or more peripheral devices connected to AC outlets 116A. For example, if three 12V battery packs are connected to the battery pack receptacles 116B, the second DC-DC converter 520 is configured to charge the internal power source 120 and/or power one or more peripheral devices connected to AC outlets 116A with the power provided by the three 12V battery packs. As another example, if two 18V battery packs and one 72V battery pack are connected to the battery pack receptacles 116B, the second DC-DC converter 520 is configured to charge the internal power source 120 and/or power one or more peripheral devices connected to AC outlets 116A with the power provided by the two 18V battery packs and one 72V battery pack.

Figure 15:
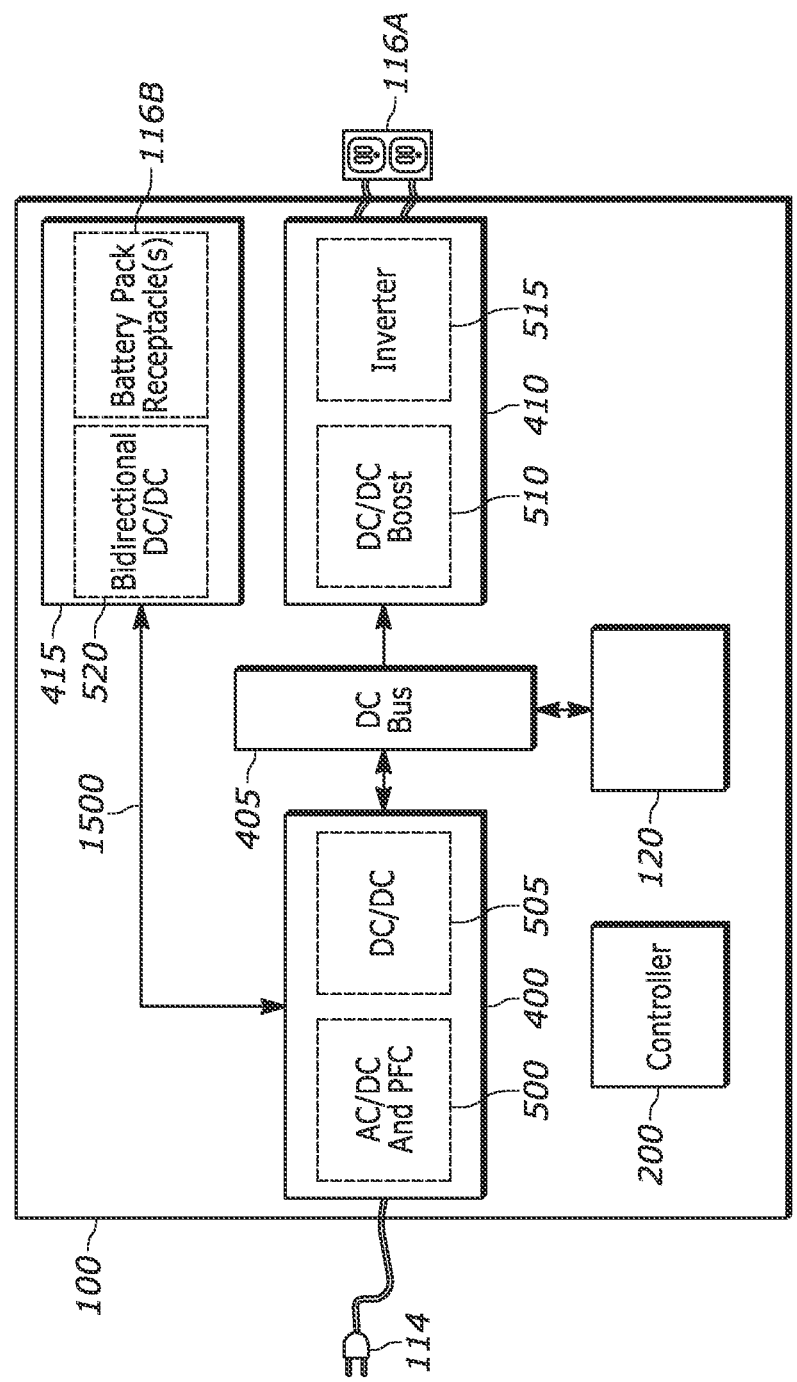

FIG. 15 illustrates an embodiment of power supply 100 in which DC power is provided directly from the input power conversion unit 400, via a second DC bus 1500, to the DC output power conversion unit 415 when the power input unit 114 is connected to an external power source. That is, when an external power source is connected to power supply 100, the DC output power conversion unit 415 is operable to receive power directly from the input power conversion unit 400 rather than having to receive power from the internal power source 120.

Figure 16:
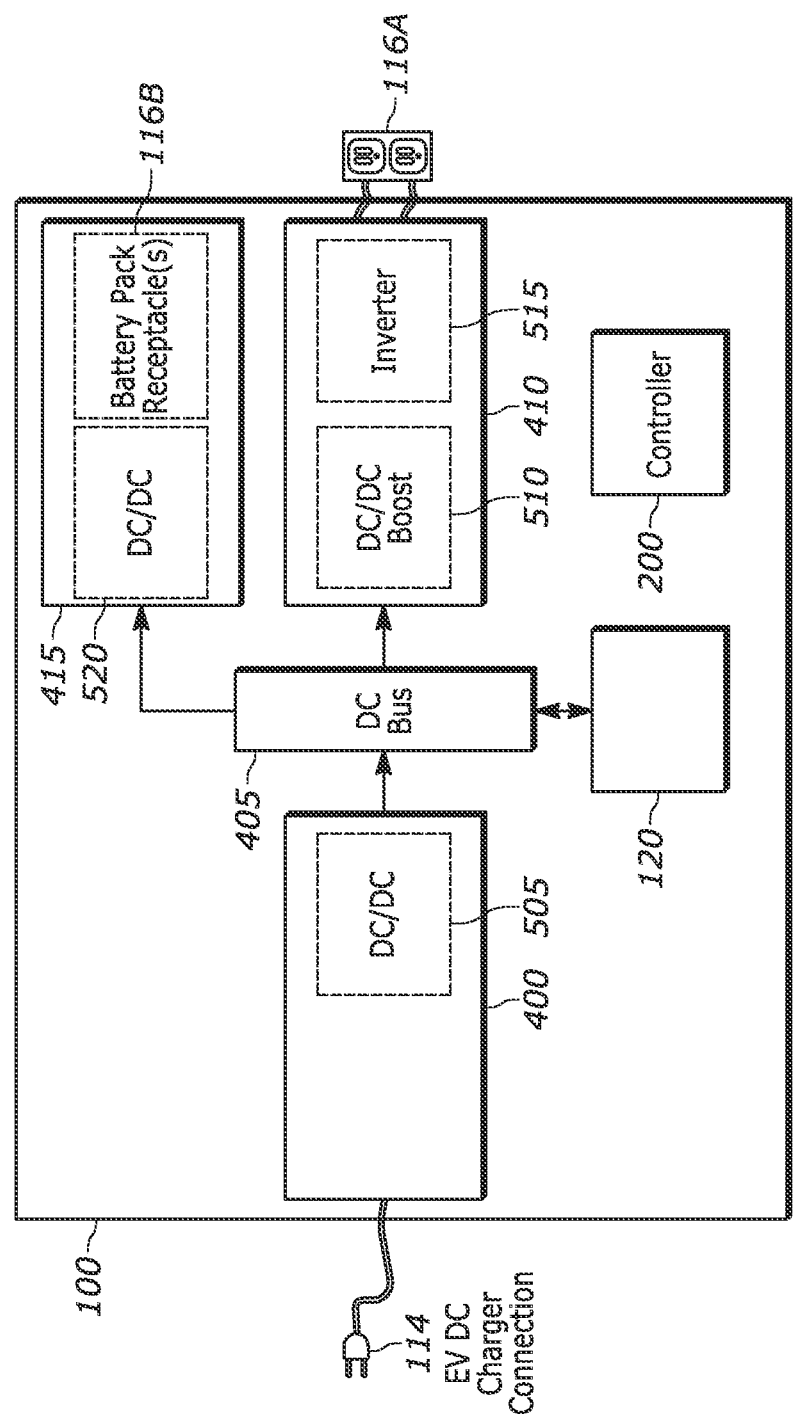

FIG. 16 illustrates an embodiment in which power supply 100 is powered by an electric vehicle (EV) charging station. In particular, the power input unit 114 is configured to receive DC power from an EV charging station and provide the received DC power to the input power conversion unit 400. Since the power received from the EV charging station is DC power, there is no need for a PFC circuit 500 to rectify the received power. Accordingly, the power input unit 114 provides the DC power from the EV charging station to the input DC-DC converter 505, which is configured to convert the received power to a level used for charging the internal power source 120. To account for the removal of PFC circuit 500, the input DC-DC converter 505 may additionally include circuit components (e.g., inductors, capacitors, etc.) configured to remove noise from the DC power provided by the EV charging station. In some embodiments, the EV charging station is a level one charger configured to provide 120V to the power supply 100. In some embodiments, the EV charging station is a level two charger configured to provide 240V to the power supply 100. In some embodiments, the EV charging station is a level three charger configured to provide 800V to the power supply 100.

Figure 17:
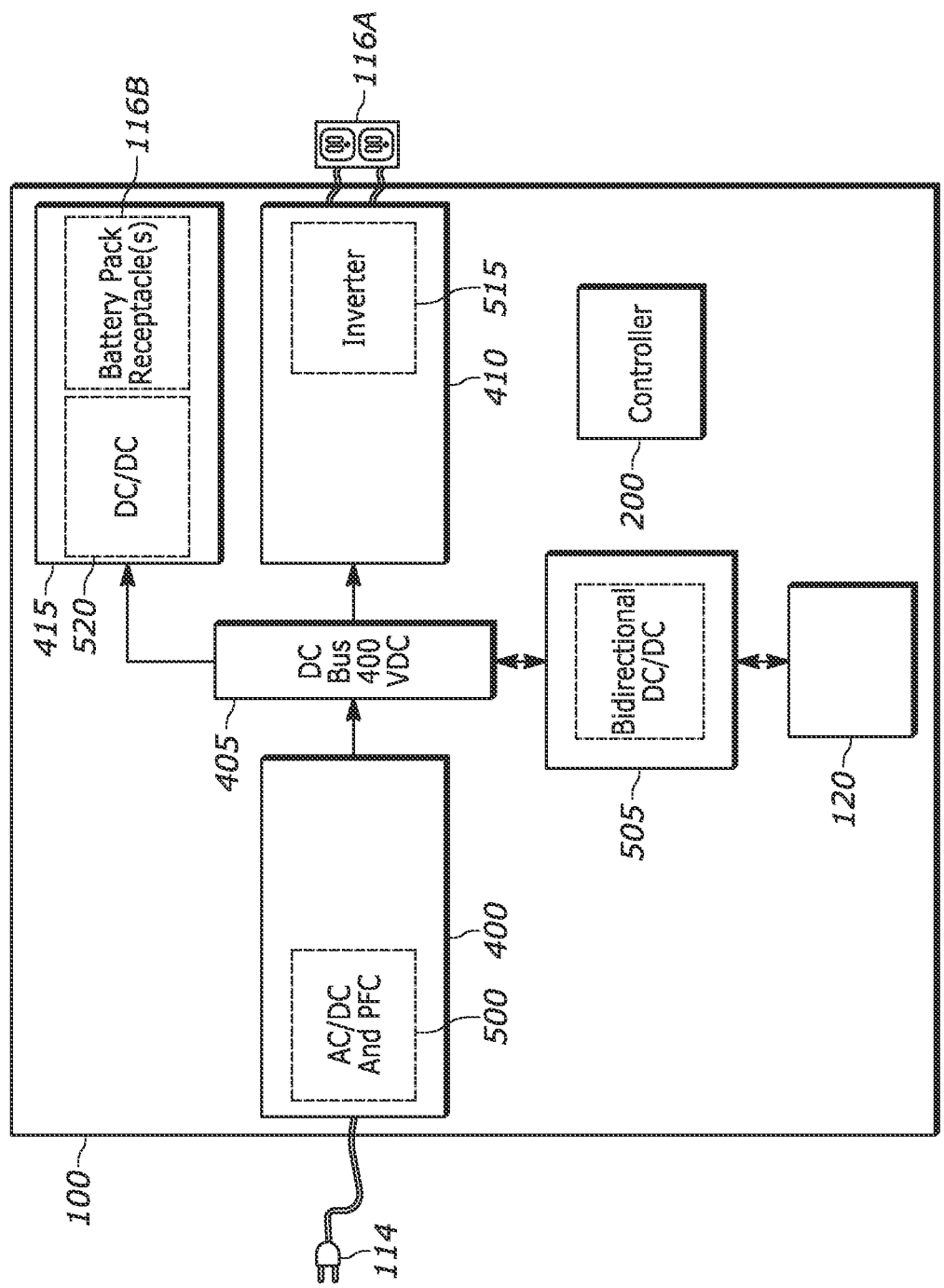

FIG. 17 illustrates an embodiment of power supply 100 in which the input DC-DC converter 505 is moved from the input power conversion unit 400 to a location in the power supply 100 that is connected between the internal power source 120 and the DC bus 405. When the power input unit 114 is connected to an external power source, the PFC circuit 500 converts and boosts AC power received from the external power source to a voltage level of DC power that is greater than the level used to charge internal power source 120 (e.g., 400V). Accordingly, power converted by the PFC circuit 500 is delivered, via the DC bus 405, to the AC output power conversion unit 410, the DC output power conversion unit 415, and/or the input DC-DC converter 505 at a voltage level that is greater than the voltage level used to charge internal power source 120 (e.g., 400V). As shown in FIG. 17, DC power output by the power input unit 114 is provided directly to the inverter 515 included in AC output power conversion unit 410. That is, the voltage level DC power output by input power conversion unit 400 is not increased by a boost stage (e.g., a first DC-DC converter 510) before being converted to AC power used to power one or more peripheral devices connected to the AC outlets 116A.

As further shown by FIG. 17, the DC bus 405 transfers DC power at a relatively high voltage level (e.g., 400V) to and from the internal power source 120 via the input DC-DC converter 505. In the illustrated embodiment, the input DC-DC converter 505 is a bidirectional converter configured to reduce, or buck, the voltage level (e.g., 400V) of DC power output by input power conversion unit 400 to a voltage level used to charge the internal power source 120 (e.g., 36V). Conversely, the bi-directional DC-DC converter 505 is further configured to increase, or boost, the voltage level (e.g., 36V) of DC power output by the internal power source 120 (e.g., 36V) to a relatively high voltage level (e.g., 400V).

Figure 18:
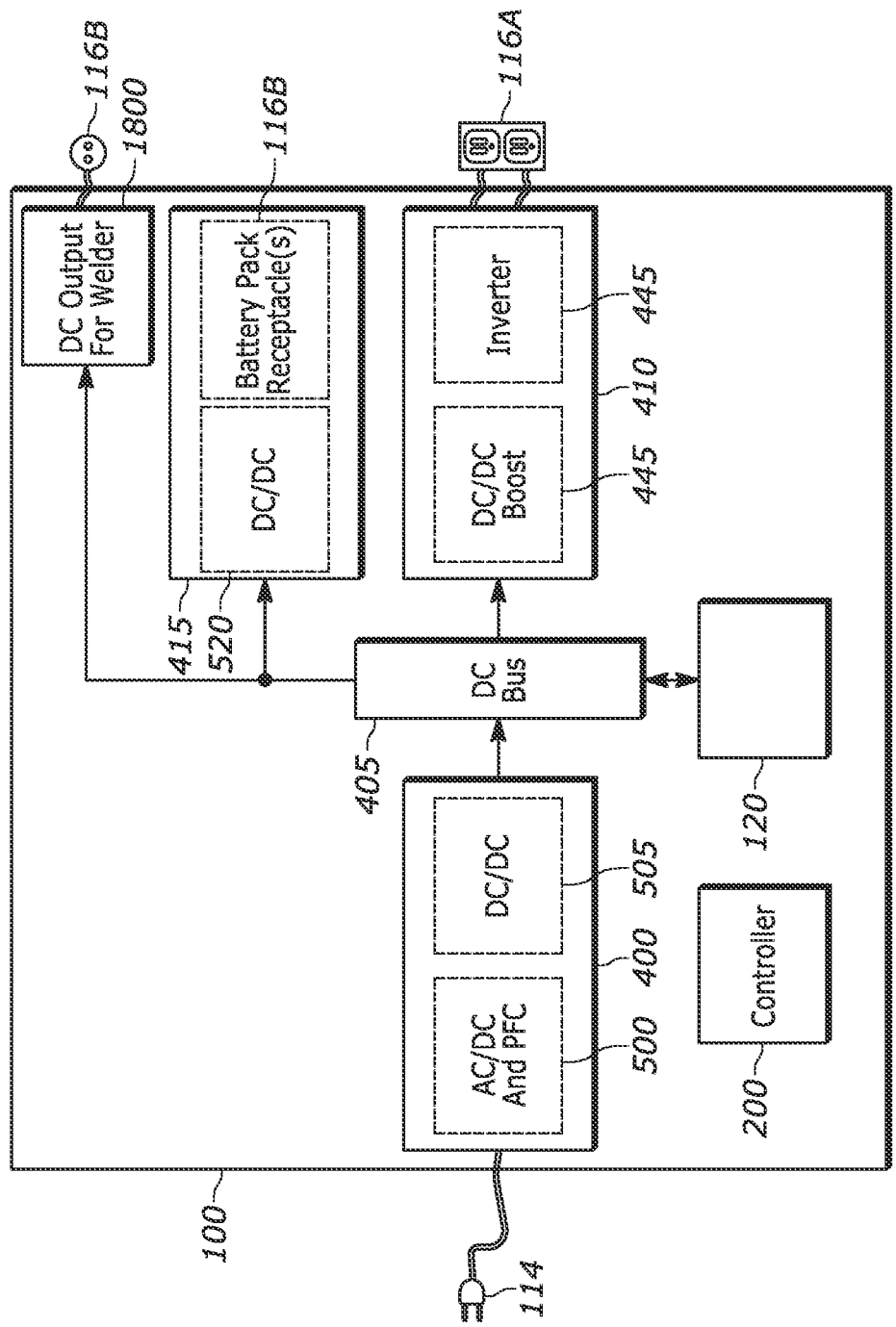

FIG. 18 illustrates an embodiment in which the power supply 100 includes an additional DC outlet 116B used for providing power to welding tools. As shown, the power supply 100 includes a third DC-DC converter 1800 configured to convert the voltage level of DC power delivered by DC bus 405 to a voltage level that is used for powering a welding tool. The third DC-DC converter 1800 may be implemented as one of the converter circuits described herein or as a converter circuit not explicitly described herein.

Figure 19:
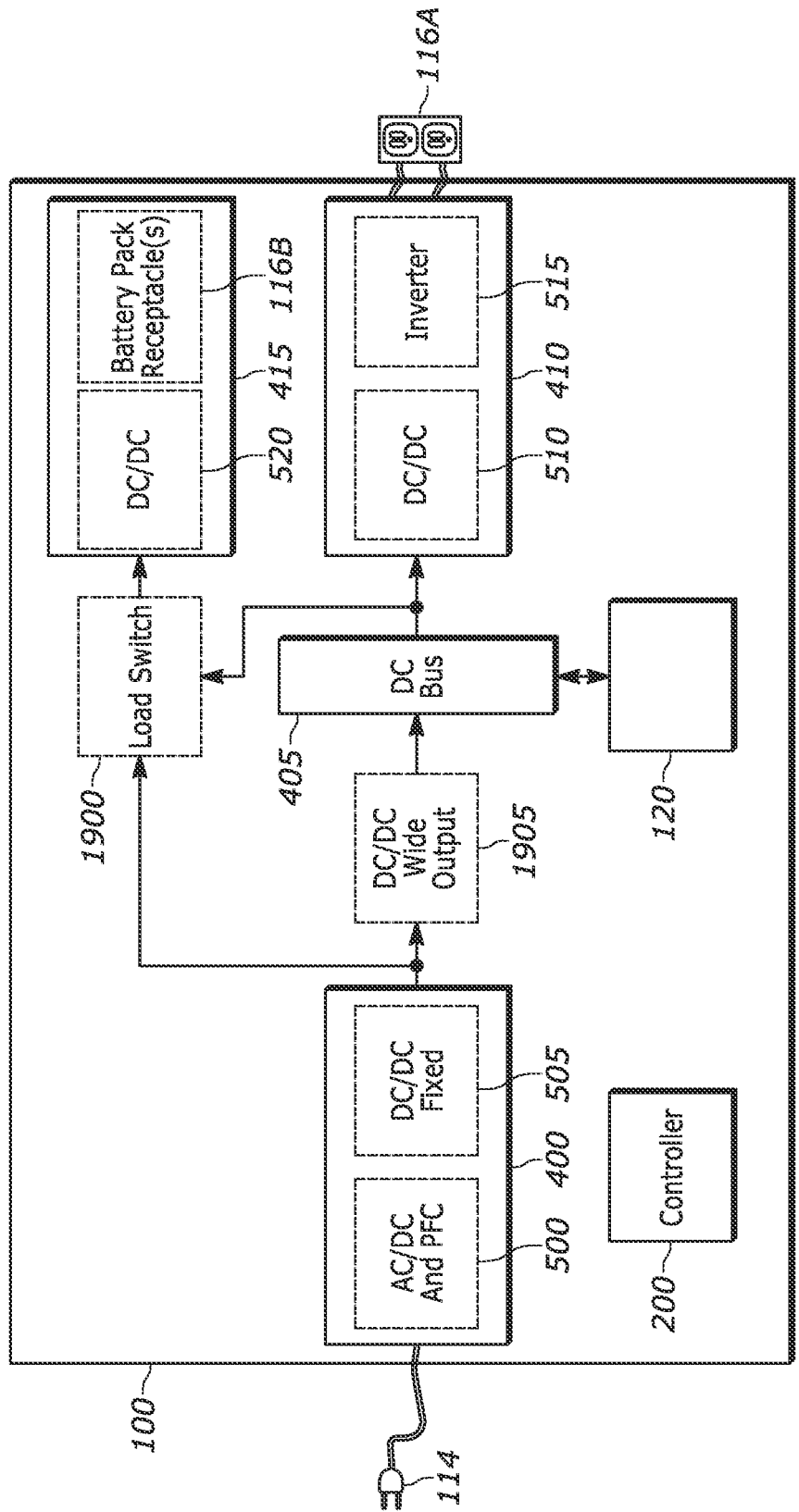

FIG. 19 illustrates an embodiment of power supply 100 in which DC power output by the input power conversion unit 400 is selectively provided directly to the DC output power conversion unit 415. In this embodiment, the input DC-DC converter 505 is configured to output DC power at a fixed, first voltage level. When the power input unit 114 is connected to an external power source (e.g., 120V outlet), the controller 200 closes one or more switches (e.g., transistors, toggle switches, electrical switches, mechanical switches, etc.) included in load switch 1900, thereby providing the DC power output by input DC-DC converter 505 directly to the DC output power conversion unit 415 at a first voltage level. In addition, DC power output by the input DC-DC converter 505 is converted from the first voltage level to one or more different voltage levels (e.g., a voltage level used to charge internal power source 120, a voltage level provided to the first DC-DC converter 510, etc.) by wide output DC-DC converter 1905. Thus, the wide output DC-DC converter 1905 is operable to convert DC power from a first voltage level to one or more different voltage levels used for powering other components of the power supply 100, such as the internal power source 120 and AC output power conversion unit 410.

When the power input unit 114 is not connected to an external power source, the controller 200 opens one or more of the switches included in load switch 1900 to decouple the input power conversion unit 400 from the DC output power conversion unit 415. Moreover, when the power input unit 114 is not connected to an external power source, the controller 200 is configured to close one or more of the switches included in load switch 1900 to provide DC power output by the internal power source 120 to the DC output power conversion unit 415.

Figure 20:
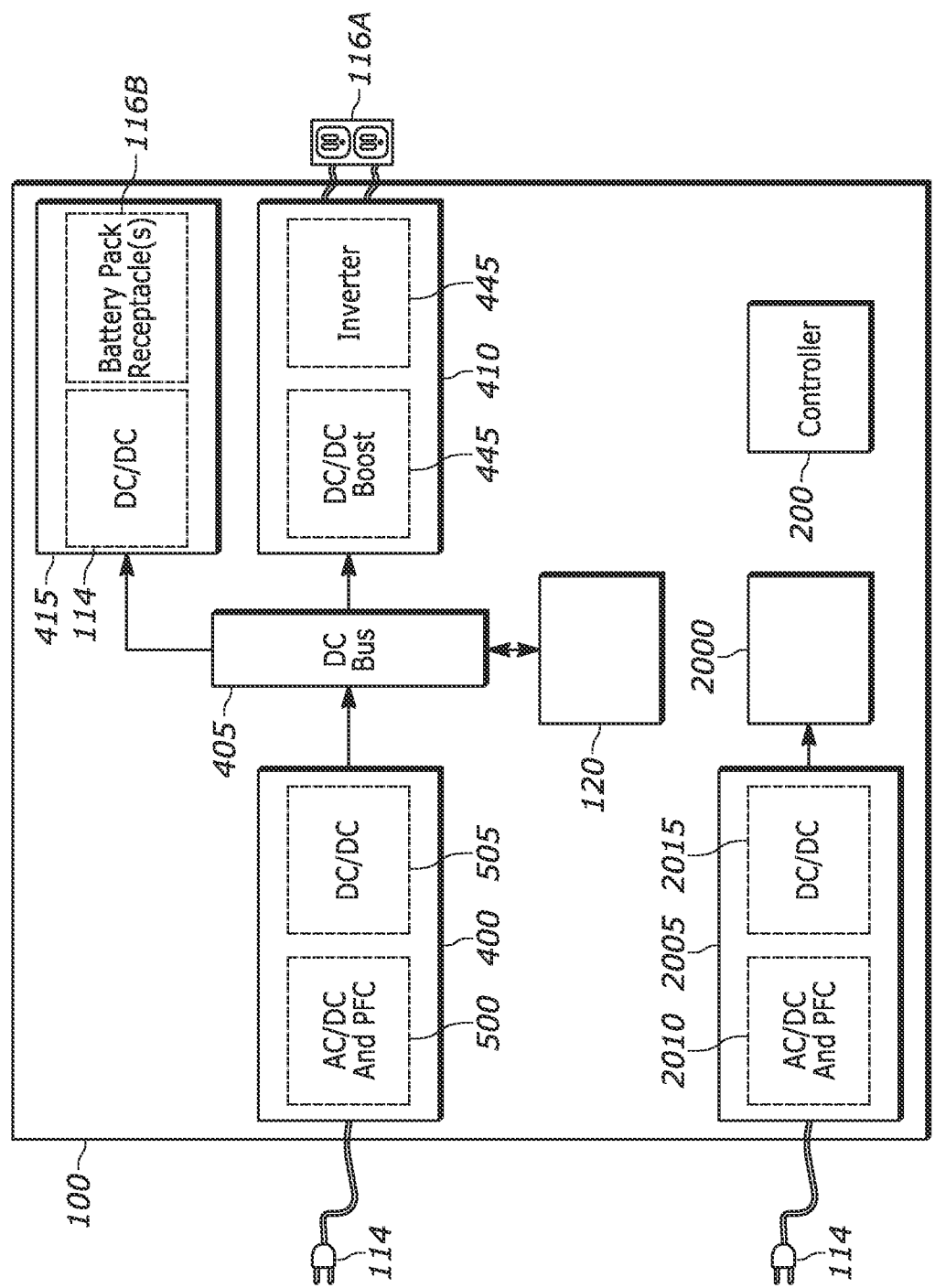

FIG. 20 illustrates an embodiment in which the power supply 100 includes a second internal power source 2000. The second internal power source 2000 is relatively small in comparison to internal power source 120 and is used for powering one or more "housekeeping" tasks. For example, the second internal power source 2000 may be implemented as a single subcore module 125 or a rechargeable power tool battery pack. Housekeeping tasks performed by the second internal power source 2000 may include, for example, powering the controller 200, powering the wireless communication controller 425, powering the RTC 429, powering the one or more sensors 430, and/or powering the one or more indicators included in power supply 100. By powering simple housekeeping tasks with the second internal power source 2000, the low dropout (LDO) effects (e.g., reduced efficiency, increased dissipation of power and heat, etc.) typically experienced by the internal power source 120 are reduced. In addition, powering simple housekeeping tasks with the second internal power source 2000 reduces quiescent current drawn from the internal power source 120.

As shown in FIG. 20, the power supply 100 may include a second input power conversion unit 2005 used for charging the second internal power source 2000. The second input power conversion unit 2005, which includes a PFC circuit 2010 and an input DC-DC converter 2015, is configured to convert AC power provided by an external source to a voltage level (e.g., 12V) of DC power used to charge the second internal power source 2000. Although illustrated as including two separate plugs, it should be understood that the power input unit 114 may include a single plug or other type of connection capable of providing power to both the input power conversion unit 400 and the second input power conversion unit 2005. In some embodiments, the power supply 100 does not include a second input power conversion unit 2005 for charging the second internal power source 2000. In such embodiments, the second internal power source 2000 is charged with power provided by the input power conversion unit 400, the internal power source 120, and/or battery packs connected to the battery pack receptacles 116B.

Figure 21:
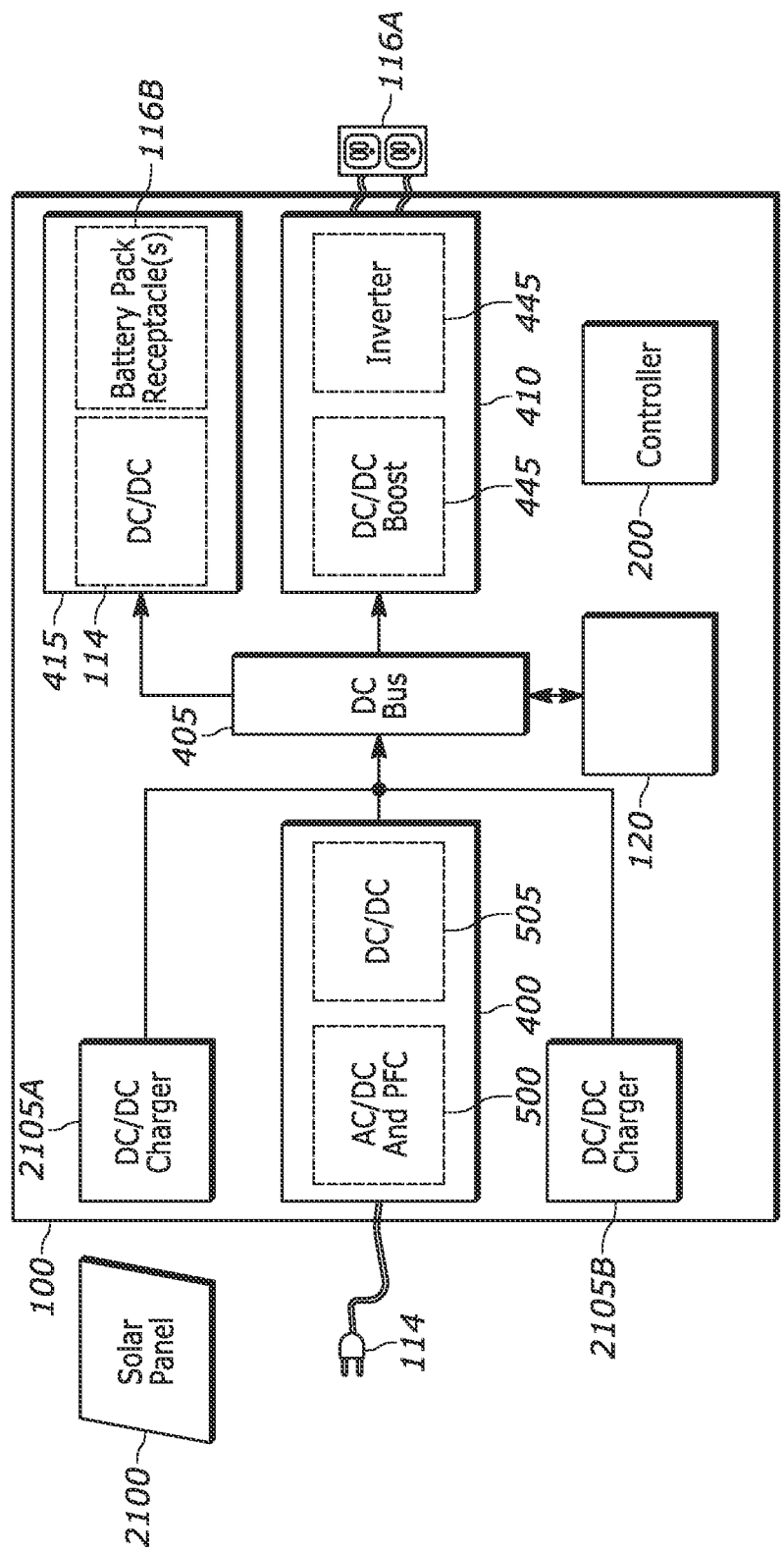

FIG. 21 illustrates an embodiment in which power supply 100 is configured to receive DC power from one or more solar panels 2100. As shown, the power supply 100 includes additional DC-DC converters 2105A and 2105B configured to convert the DC power received from one or more solar panels 2100 to a voltage level used for charging the internal power source 120. In some embodiments, the power supply 100 only includes one additional DC-DC converter 2105. In some embodiments, the power supply 100 does not include an additional DC-DC converter 2105. In such embodiments, the DC power may be provided directly from the one or more solar panels 2100 to the internal power source 120. Additionally or alternatively, in such embodiments, the input power conversion unit 400 may be configured to convert the DC power provided by the one or more solar panels 2100 to a voltage level used for charging the internal power source 120.

Figure 22:
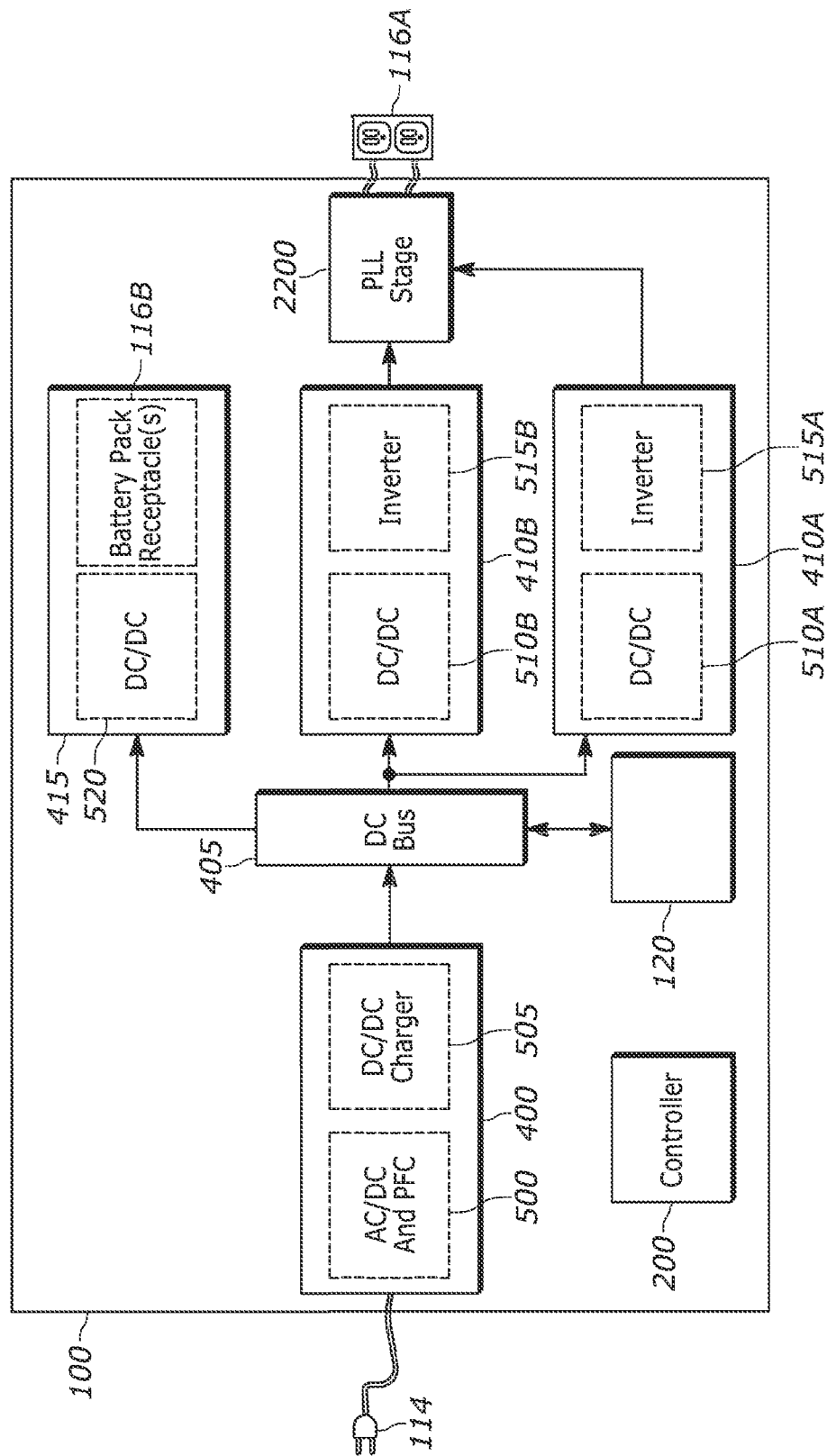

FIG. 22 illustrates an embodiment in which power supply 100 is configured to provide relatively large amounts of power (e.g., 3.6 kW, 10 kW, etc.) to one or more devices (e.g., tools, lights, etc.) connected to the AC outlets 116A. As shown, the power supply 100 includes first and second AC output power conversion units 410A and 410B connected in parallel between the DC bus 405 and a phase-locked loop (PLL) circuit 2200. The PLL circuit 2200 is configured to synchronize the phase of AC power provided to the AC outlets 116A with the combined phase of power output by the first and second AC output power conversion units 410A and 410B. That is, the PLL circuit 2200 syncs the respective phases of power output by the first and second inverters 515A, 515B thereby allowing the first and second inverters 515A, 515B to provide power to one or more peripheral devices in parallel. When compared to embodiments of the power supply 100 that include only a single AC output power conversion unit 410, the parallel-connected first and second AC output power conversion units 410A, 410B enable power supply 100 to provide larger amounts of power to one or more peripheral devices connected to the AC outlets 116A. Accordingly, a larger number of AC outlets 116A can be provided on the power supply 100 when parallel-connected first and second AC power output conversion units 410A, 410B are used.

Figure 23:
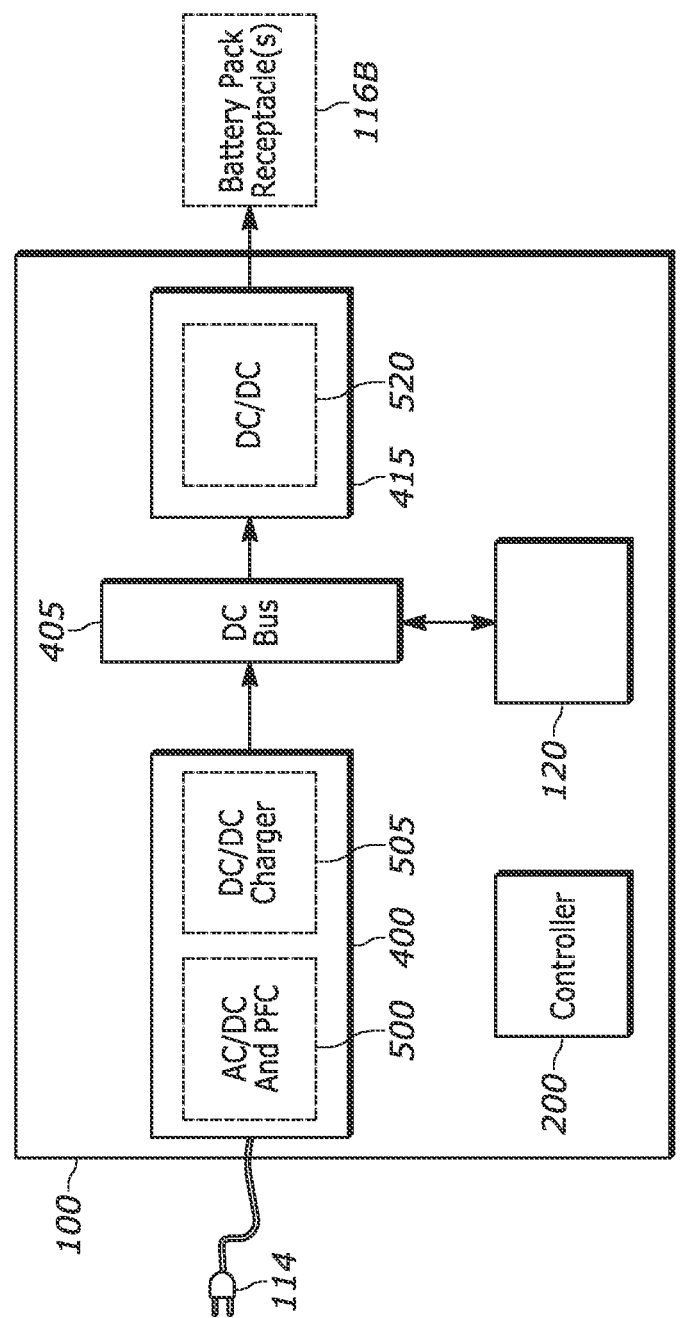

FIG. 23 illustrates an embodiment in which the power supply 100 is not configured to provide AC power to one or more peripheral devices. As shown, the power supply 100 does not include an AC output power conversion unit 410. Rather, the power supply 100 illustrated in FIG. 23 is only configured to provide DC power to one or more peripheral devices connected to the DC outlets 116B. For example, the power supply 100 is configured to charge one or more power tool battery packs connected to the battery pack receptacles 116B.

Figure 24:
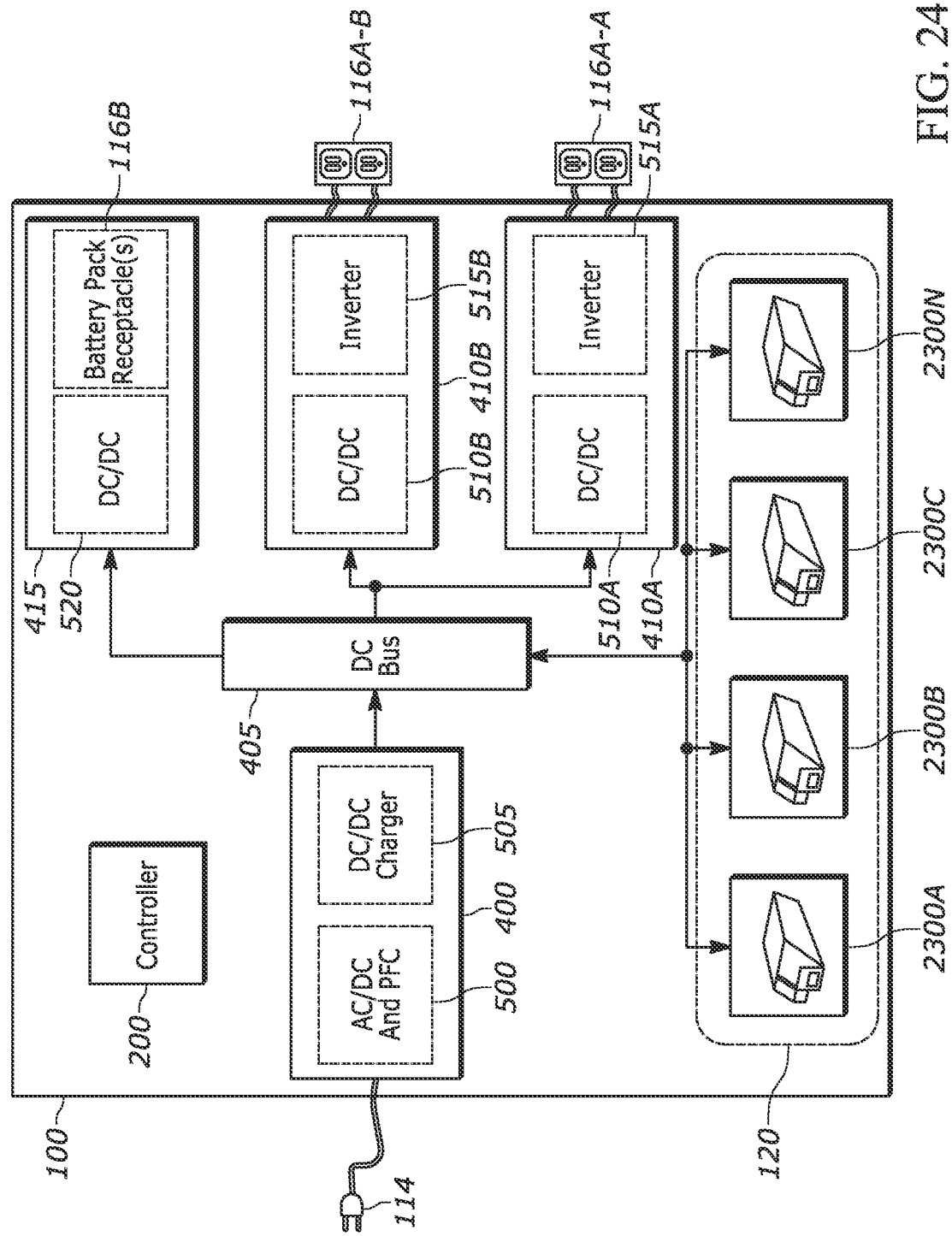

FIG. 24 illustrates an embodiment of power supply 100 in which the internal power source 120 is implemented as one or more removable and rechargeable power tool battery packs 2300A-2300N. In some embodiments, the power tool battery packs 2300A-2300N are high voltage battery packs. For example, the battery packs 2300A-2300N may have individual nominal voltages of 72V or greater (e.g., 72V-120V). In some embodiments, the power tool battery packs 2300A-2300N have individual voltages that are less than 72V (e.g., 12V, 18V, 36V). The power tool battery packs 2300A-2300N included in the internal power source 120 may be electrically connected in series and/or parallel combinations to optimize the combined voltage and runtime of the power supply 100. Although illustrated as including four battery packs 2300A-2300N, it should be understood that internal power source 120 may be implemented with any number, N, of power tool battery packs 2300. For example, the internal power source 120 may be implemented using more or fewer than four power tool battery packs 2300.

When compared to embodiments of the power supply 100 in which the internal power source 120 is integrated within power supply 100, the battery packs 2300A-2300N are configured to be removed, or swapped out, from the power supply 100. The ability to swap out drained, or depleted, battery packs 2300A-2300N with fully-charged replacement battery packs allows the runtime of power supply 100 to be extended. For example, if battery packs 2300A and 2300B are depleted after powering one or more peripheral devices connected to the power supply 100, the runtime of power supply 100 may be extended by replacing battery packs 2300A and 2300B with fully charged replacement battery packs. In some embodiments, the input power conversion unit 400 is removed to provide room for additional battery packs 2300A-2300N. In some embodiments, users remove the battery packs 2300A-2300N from power supply 100 to recharge the battery packs 2300A-2300N with external chargers. In such embodiments, users are able to recharge the battery packs 2300A-2300N without having to move the power supply 100 to a location proximate an external power source.

As shown in FIG. 24, the power supply 100 may additionally include first and second AC output power conversion units 410A and 410B. Each respective AC output power conversion unit 410 is configured to provide power to a respective AC outlet 116A, and thus, one or more peripheral devices connected to the respective AC outlet 116A. For example, the first AC output power conversion unit 410A is configured to power the one or more peripheral devices connected to AC outlets 116A-A. Similarly, the second AC output power conversion unit 410B is configured to power the one or more peripheral device connected to AC outlets 116A-B. When compared to embodiments in which power supply 100 includes only one AC power output conversion unit 410 and one set of AC outlets 116A, the embodiment of power supply 100 illustrated in FIG. 24 is operable to provide power to a larger number of peripheral devices. For example, the power supply 100 illustrated in FIG. 24 may be configured to power twice as many peripheral devices connected to the power supply 100 when compared to other embodiments of the power supply 100.

Figure 25:
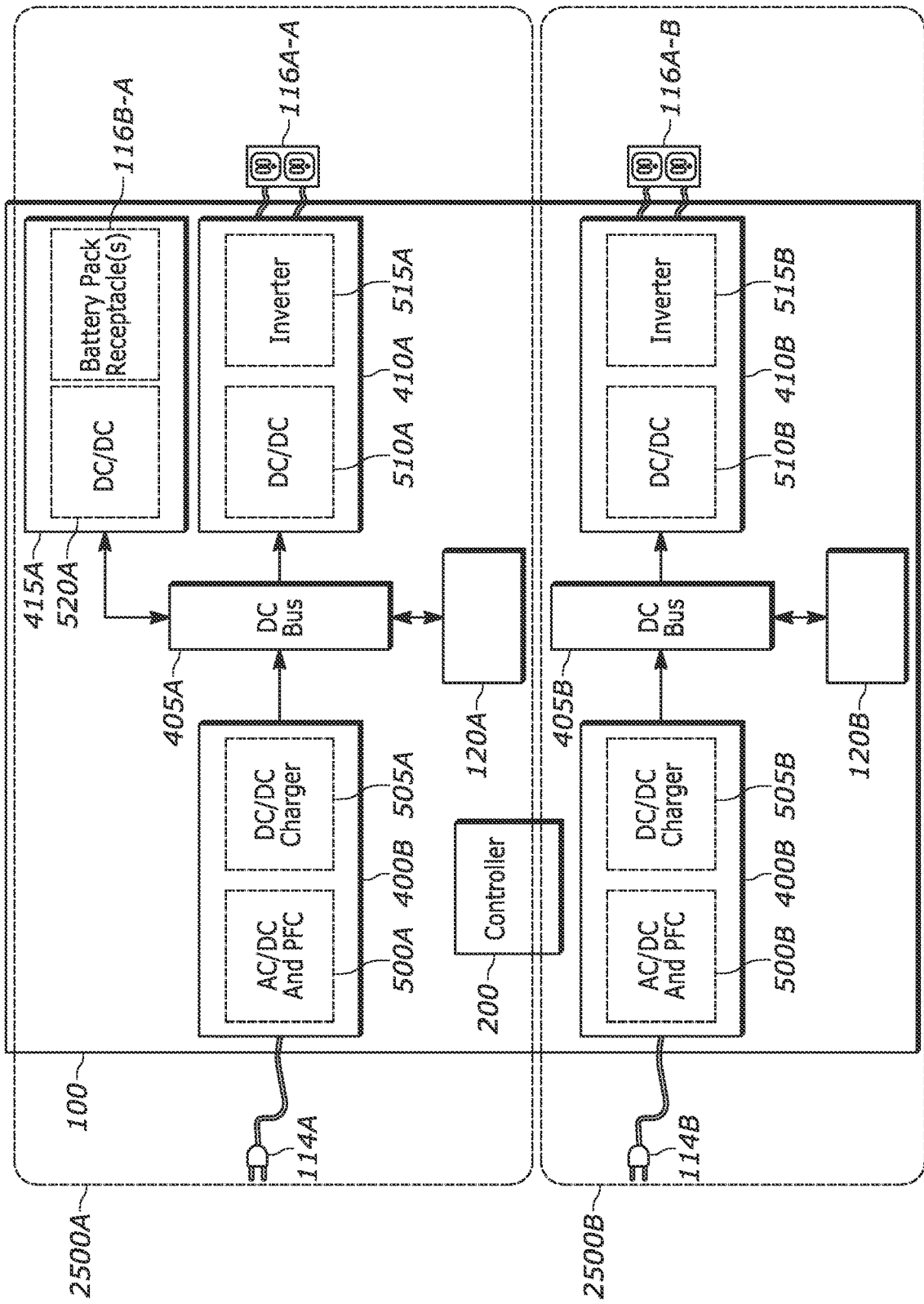

FIG. 25 illustrates an embodiment in which power supply 100 includes a first power circuit 2500A and a second power circuit 2500B. As shown, the first power circuit 2500A includes a first power input unit 114A, first input power conversion unit 400A, a first DC bus 405A, a first internal power source 120A, a first AC output power conversion unit 410A, a DC output power conversion unit 415A, AC outlets 116A-A, and DC outlets 116B. Similarly, the second power circuit 2500B includes a second power input unit 114B, a second input power conversion unit 400B, a second DC bus 405B, a second internal power source 120B, a second AC output power conversion unit 410B, and AC outlets 116A-B.

Although the power supply 100 is illustrated as including separate power input units 114A and 114B, it should be understood that the power input units 114A and 114B may be included as separate components of a single power input unit 114. Similarly, it should be understood that both the first and second power circuits 2500A and 2500B may have more or fewer components than what are illustrated in FIG. 25. For example, the second power circuit 2500B may additionally include a second DC output power conversion unit 415B and DC outlets 116B-B. Furthermore, it should be understood that controller 200 is configured to control operation of the components included in the first power circuit 2500A and the second power circuit 2500B. However, in some embodiments, first power circuit 2500A includes its own controller and second power circuit 2500B includes its own controller. In some embodiments, the first power circuit 2500A is configured to provide power for high power applications and the second power circuit 2500B is configured to provide power for low power applications. In some embodiments, the first power circuit 2500A and the second power circuit 2500B are identical.

When compared to embodiments in which a single, high power circuit is provided, such as the power circuits implemented by the previously described embodiments of power supply 100, smaller and less expensive components can be included in the first and second power circuits 2500A, 2500B. For example, circuit components with lower power ratings can be used to implement the first and second power circuits 2500A, 2500B. Thus, the cost and size of the first and second power circuits 2500A, 2500B are reduced when compared to the single power circuits included in the embodiments described above. In addition, by operating the circuit components of the first and second power circuits 2500A, 2500B at lower power levels, power losses are reduced and overall efficiency of the power supply 100 is improved.

Figure 26:
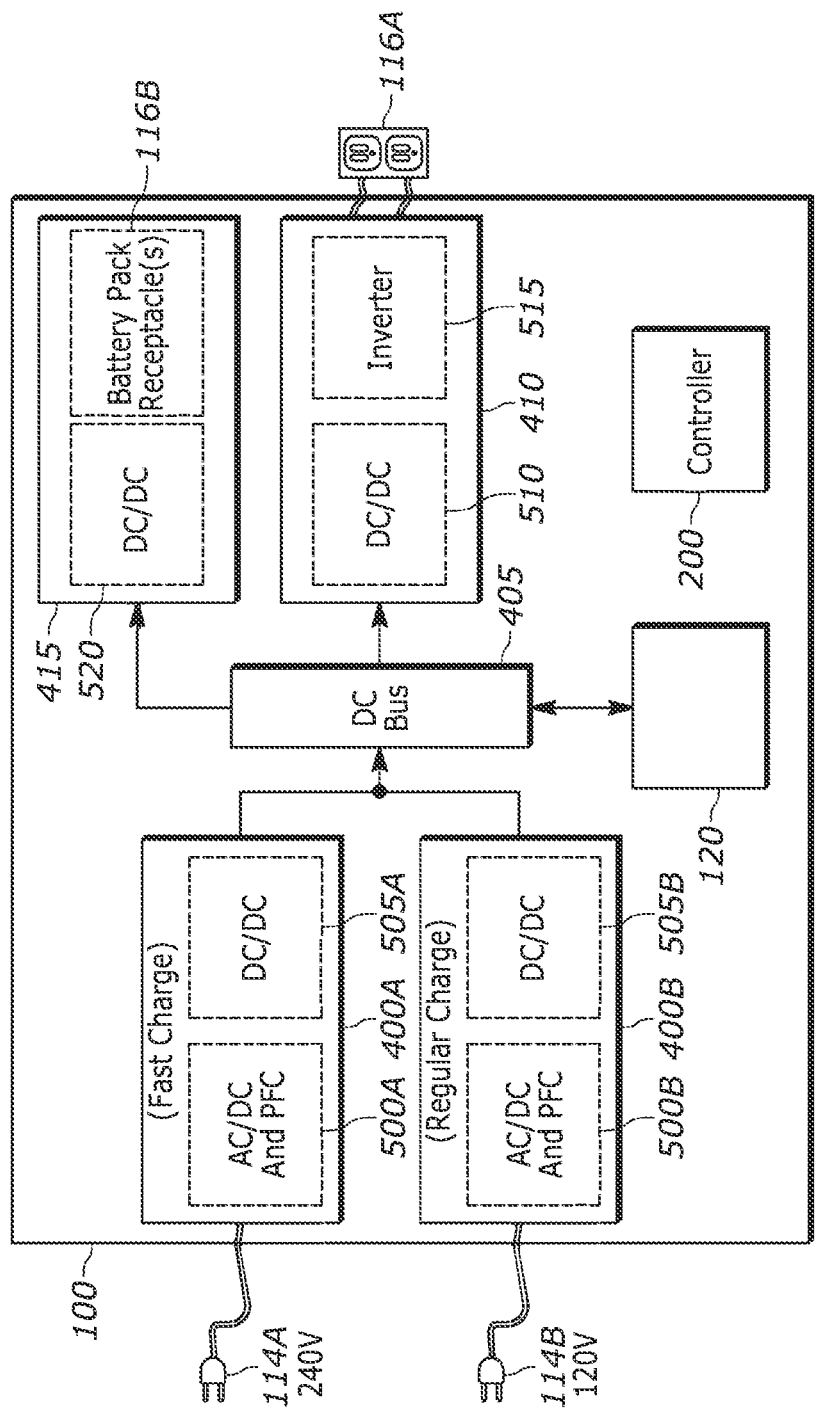

FIG. 26 illustrates an embodiment in which the power supply 100 is configured to charge the internal power source 120 at a fast charging rate or at a standard charging rate. As shown, the power supply 100 includes a first input power conversion unit 400A that is configured to charge the internal power source 120 at a fast charging rate. In particular, the first input power conversion unit 400A is configured to convert AC power received, via power input unit 114A, from a relatively high power external source (e.g., a 240V outlet) to DC power used to charge the internal power source 120 at a faster than standard rate. For example, the first input power conversion unit 400 may be configured to charge the internal power source 120 in an amount of time (e.g., 30 minutes or a three-C rate) that is less than the amount of time (e.g., 90 minutes or a one-C rate) it takes to charge the internal power source 120 at a standard charging rate. When a relatively high power external source is not available, the power supply 100 is configured to charge, via the second input power conversion unit 400B, the internal power source 120 at a standard rate with power received from a normal external power source (e.g., 120V outlet).

Figure 27:
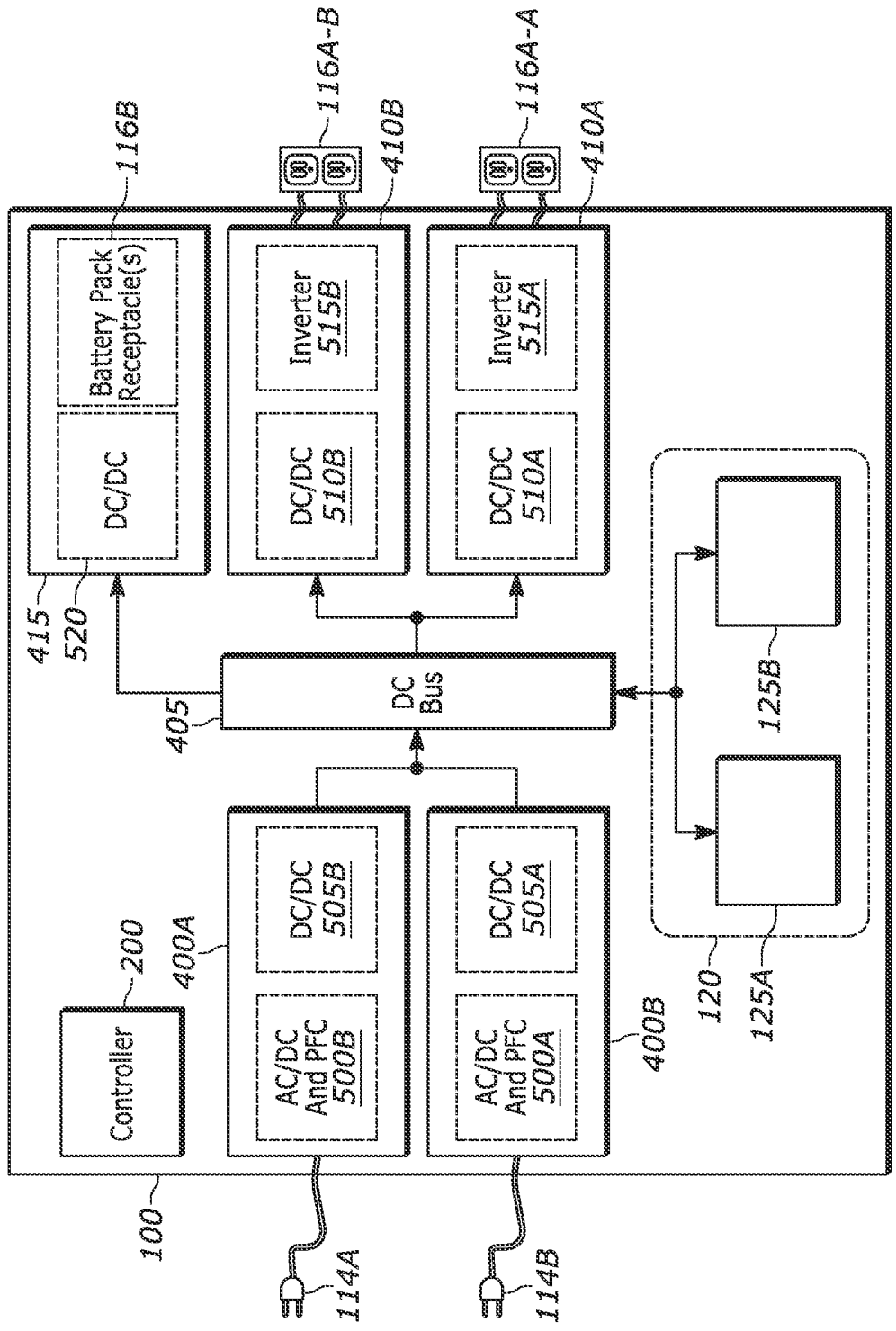

FIG. 27 illustrates an embodiment in which the power supply 100 includes first and second input power conversion units 400A and 400B. In this embodiment, the first input power conversion unit 400A and/or the second input power conversion unit 400B may be used to charge the internal power source 120. When only one of the first and second input power conversion units 400A and 400B is connected to an external power source, the internal power source 120 is charged at a standard rate (e.g., a one-C rate). For example, if the first input power conversion unit 400A is connected, by the first power input unit 114A, to an external power source and the second input power conversion unit 400B is not connected to an external power source, the internal power source 120 is charged at the standard rate with power output by the first input power conversion unit 400A. However, when both of the first and second input power conversion units 400A and 400B are respectively connected to external power sources, the combined power output of the first and second input power conversion units 400A, 400B is used to charge the internal power source 120 at a faster than standard rate (e.g., a two-C rate, a three-C rate, etc.). That is, if the first input power conversion unit 400A is connected, by the first power input unit 114A, to an external power source and the second input power conversion unit 400B is connected, by the second power input unit 114B, to an external power source, the internal power source 120 is charged at a faster than standard rate with the combined power output of the first and second input power conversion units 400A and 400B.

Furthermore, the first input power conversion unit 400A and/or the second input power conversion unit 400B may be used to power the power output conversion units 400A, 410B, and 415 when one or more peripheral devices are connected to the power supply 100. When only one of the first and second input power conversion units 400A and 400B is connected to an external power source while the power supply 100 is powering one or more peripheral devices, a first, or standard, amount of power is provided to power output conversion units 410A, 410B, and 415. However, when both of the first and second input power conversion units 400A and 400B are respectively connected to external power sources, the first and second input power conversion units 410A, 410B combine to provide a second, or larger, amount of power to the power output conversion units 410A, 410B, and 415.

Figure 28:
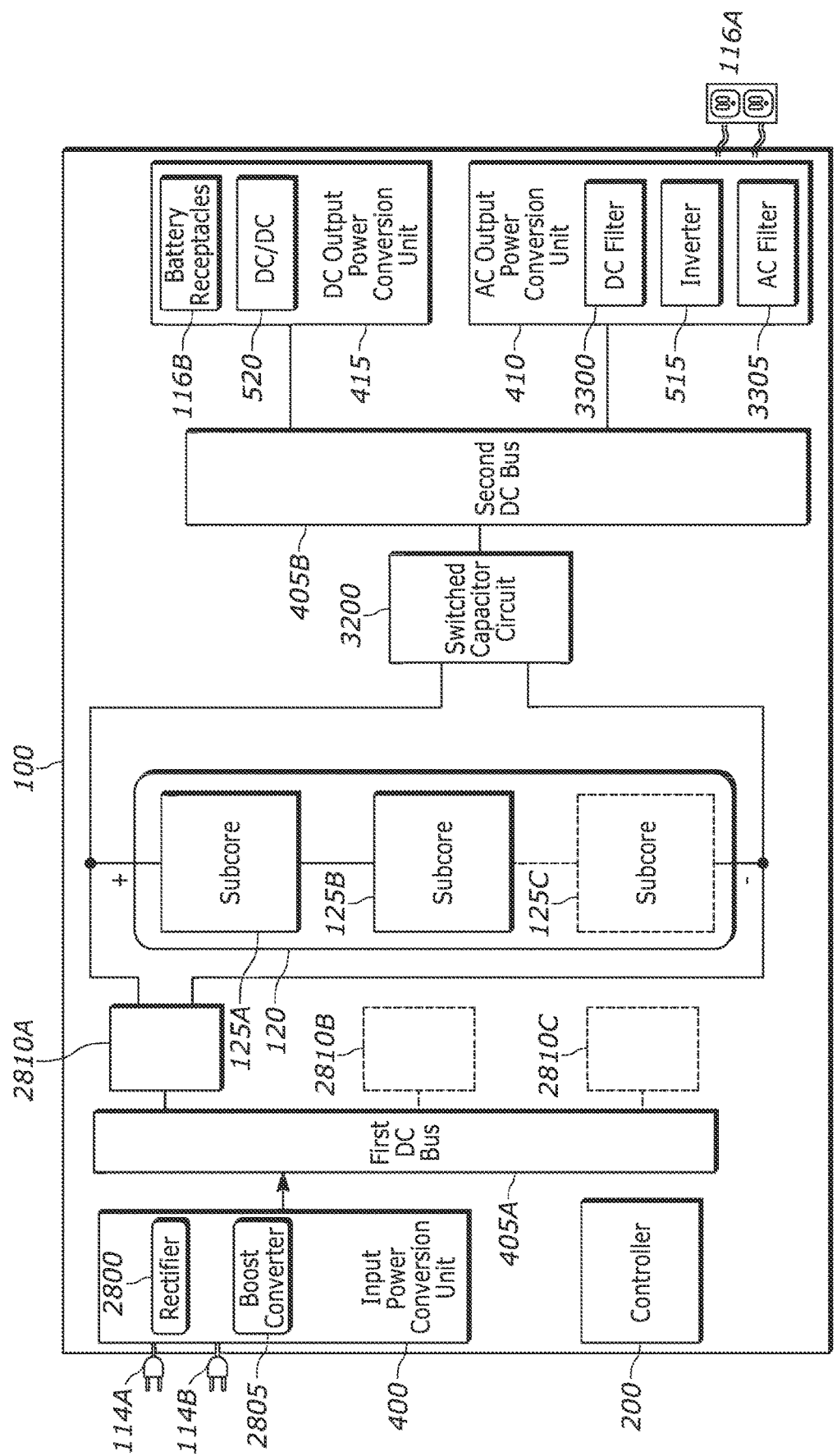

FIG. 28 illustrates an alternative embodiment of the power supply 100. The power supply 100 illustrated in FIG. 28 includes components that are the same as and/or similar to the components included in the various embodiments of power supply 100 described above. Accordingly, it should be understood that components included in the power supply 100 illustrated in FIG. 28 are configured to operate in a manner that is the same as and/or similar to the manner in which the components are described as operating above when implemented in other embodiments of the power supply 100. In addition, it should be understood that the power supply 100 illustrated in FIG. 28 may be modified to incorporate functionality of and/or combined with other embodiments of the power supply 100 described herein. Furthermore, it should be understood that controller 200 is electrically and communicatively coupled to each of the components included in the power supply 100, and thus, operation of the one or more components included in power supply 100 are controlled by controller 200.

As shown in FIG. 28, the power supply 100 includes first and second power input units 114A and 114B. The first power input unit 114A is configured to receive power from a first external power source, such as a conventional wall outlet found in North America (e.g., a 120V outlet). Similarly, the second power input unit 114B is configured to receive power from a second external power source, such as conventional wall outlets found outside of North America (e.g., a 220V outlet or a 230V outlet). Power received by the first power input unit 114A and/or the second power input unit 114B is provided to the input power conversion unit 400. Although the first and second power input units 114A and 114B are illustrated as electrical plugs, the first and second power input units 114A and 114B may be implemented as any of the examples described herein with respect to the power input unit 114.

The input power conversion unit 400 is configured to convert AC power provided by an external source to DC power used to charge the internal power source 120. As shown in FIG. 28, the input power conversion unit 400 includes a rectifier 2800 and a boost converter 2805. The rectifier 2800 is configured to convert the AC power received from the external source to DC power. In some embodiments, the rectifier 2800 includes additional PFC components (e.g., inductors, capacitors, chokes, filters, etc.) that are configured to improve the power factor and/or efficiency of the rectifier 2800.

The boost converter 2805 is configured to increase the voltage level of DC power output by the rectifier 2800 to a voltage level that is provided to subcore charging circuits 2810A-2810C. For example, the boost converter 2805 may be configured to increase the voltage level of the DC power to a voltage level that lies within the range of 240V-500V. In some embodiments, the increase in voltage level of the DC power output by rectifier 2800 is determined in accordance with the voltage level of the AC power provided by the external source. For example, the controller 200 may be configured to increase, by the boost converter 2805, the voltage level of the DC power output by rectifier 2800 to a first level (e.g., 250V) when the external power source is a conventional wall outlet that provides 120V to the rectifier 2800. As another example, the controller 200 may be configured to increase, by the boost converter 2805, the voltage level of the DC power output by rectifier 2800 to a second level (e.g., 400V) when the external power source is a conventional wall outlet that provides 220V to the rectifier 2800. In some embodiments, the boost converter includes additional PFC components (e.g., inductors, capacitors, chokes, filters, etc.) that are configured to improve the power factor of the rectifier 2800.

FIGS. 29A-29D illustrate various embodiments of circuit configurations that may be used to implement the rectifier 2800 and the boost converter 2805 included in input power conversion unit 400. For example, in the illustrated embodiment of FIG. 29A, the rectifier 2800 is a full-bridge rectifier that includes first and second sets of boost inductors 2900A and 2900B electrically connected to the AC side of the rectifier 2800. In particular, the first set of boost inductors 2900A is electrically connected between the terminals of the first power input unit 114A and the AC side of rectifier 2800. Likewise, the second set of boost inductors 2900B is electrically connected between the terminals of the second power input unit 114B and the AC side of rectifier 2800. The first and second sets of boost inductors 2900A and 2900B are configured to filter the AC power provided by the external power sources connected to power supply 100. The respective values of the first and second sets of boost inductors 2900A and 2900B are chosen in accordance with the power input unit 114 to which they are connected. For example, the respective values of the boost inductors included in the first set of boost inductors 2900A are chosen in accordance with the voltage and current ratings of external power sources found in North America. As another example, the respective values of the boost inductors included in the second set of boost inductors 2900B are chosen in accordance with the voltage and current ratings of external power sources found outside of North America.

Although rectifier 2800 is illustrated in FIG. 29A-29D as a full-bridge rectifier, it should be understood that the rectifier 2800 may be implemented using other rectifier circuit configurations, such as the other PFC and rectifier circuit configurations described herein. Furthermore, the boost converter 2805 may be implemented using other boost converter configurations that are not illustrated in FIGS. 29A-29D. The boost converter 2805 is illustrated as including a separate PFC controller 2905. However, in some embodiments, the boost converter 2805 does not include the PFC controller 2905, as the controller 200 is configured to control operation of the switch included in boost converter 2805.

Figure 29A:
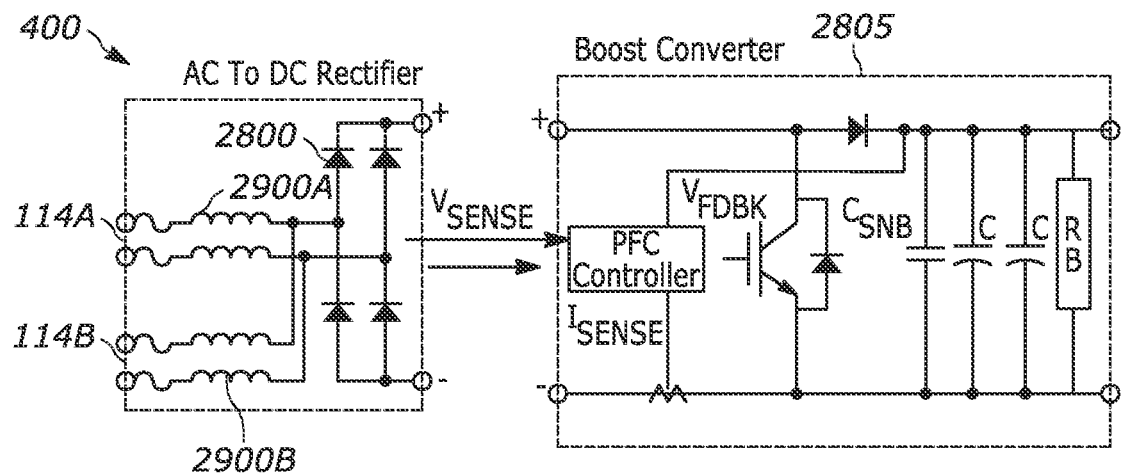
FIGS. 29A-29D illustrate embodiments of a power input conversion unit included in the portable power supply device of FIG. 28.
Figure 29B:
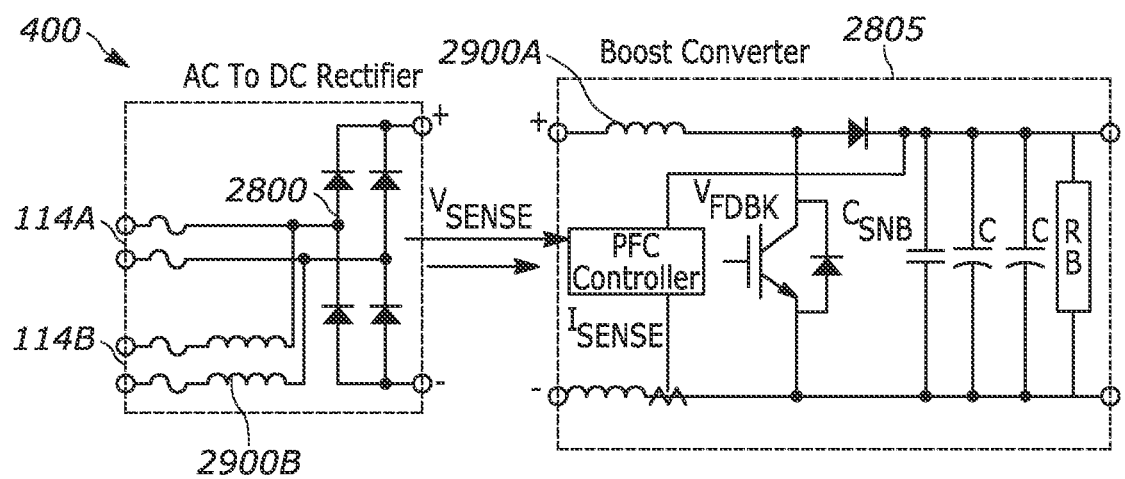

FIG. 29B illustrates an embodiment of the input power conversion unit 400 in which the first set of boost inductors 2900A has been moved from the AC side of rectifier 2800 to the DC side of rectifier 2800. That is, the boost inductors included in the first set of boost inductors 2900A are respectively connected between the output terminals of the rectifier 2800 and the input terminals of the boost converter 2805. When the first set of boost inductors 2900A are connected at the DC side of rectifier 2800, the common mode current, and hence, the electromagnetic interference, experienced by the boost converter 2805 is reduced.

Figure 29C:
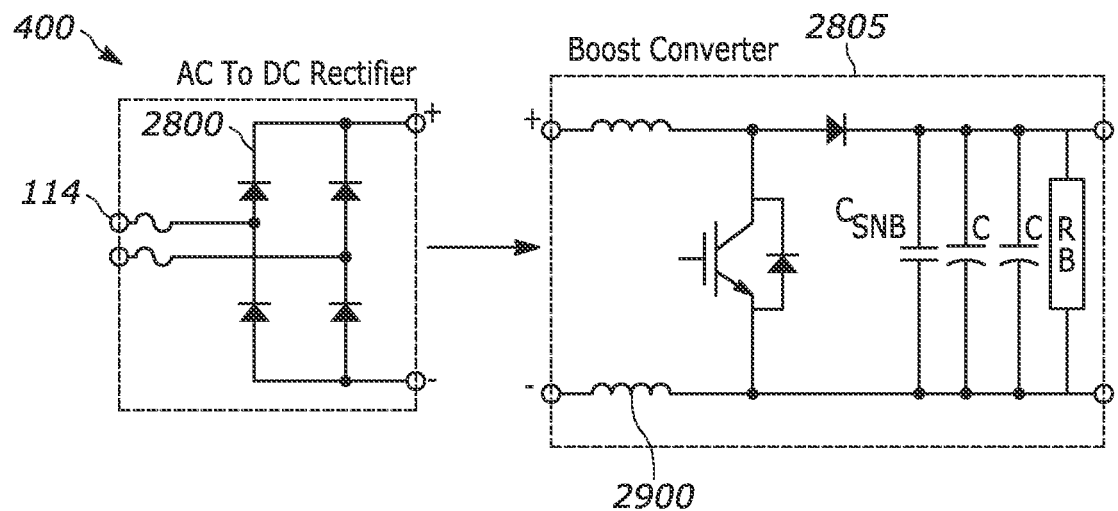

FIG. 29C illustrates an embodiment in which the power supply 100 does not include both a first power input unit 114A configured to receive power from a first external source, such as a conventional North American wall outlet, and a second power input unit 114B configured to receive power from a second external source, such as a conventional wall outlet found outside of North America. Rather, power supply 100 includes a single power input unit 114 that is configured to receive power from various external sources. For example, the power input unit 114 is configured to receive power from both the first external source and the second external source. The controller 200 is configured to control operation of the boost converter 2805 based on the voltage level of the AC power provided by an external source.

As further shown in the illustrated embodiment of FIG. 29C, the input power conversion unit 400 includes a single set of boost inductors 2900. In particular, the boost inductors included in the boost inductors 2900 are respectively connected between the output terminals of the rectifier 2800 and the input terminals of the boost converter 2805. Accordingly, in this arrangement, the set of boost inductors 2900 act as a set of dual DC chokes configured to reduce, or filter, the noise of the DC power output by the rectifier 2800.

Figure 29D:
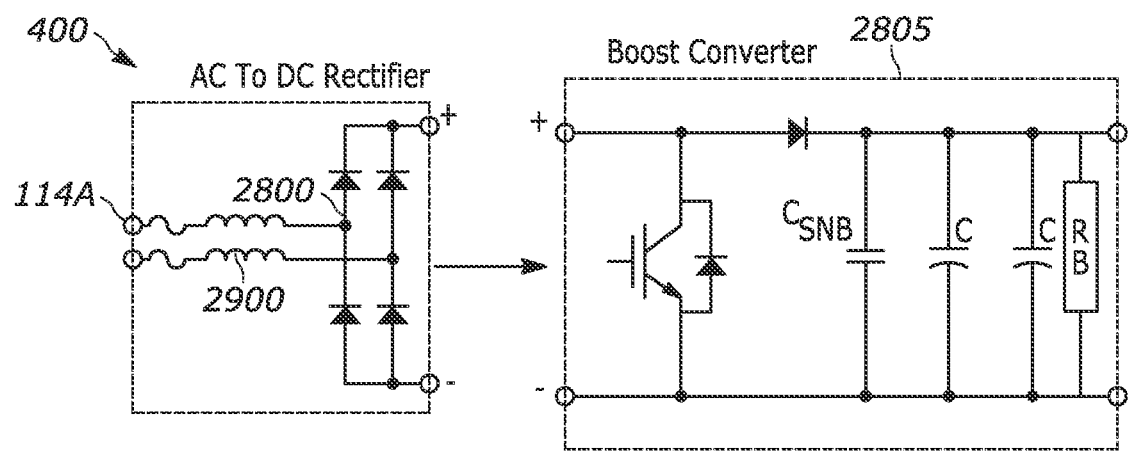

FIG. 29D illustrates another embodiment in which the power supply 100 does not include both a first power input unit 114A and a second power input unit 114B. Rather, power supply 100 includes a single power input unit 114 that is configured to receive power from various external sources. However, in the illustrated embodiment of FIG. 29D, the set of boost inductors 2900 is moved from the DC side of rectifier 2800 to the AC side of rectifier 2800. In particular, the boost inductors included in the set of boost inductors 2900 are respectively connected between the terminals of power input unit 114 and the input terminals of the rectifier 2800. Accordingly, in this arrangement, the set of boost inductors 2900 act as a set of dual AC chokes configured to further improve noise immunity of the input power conversion unit 400.

Figure 30A:
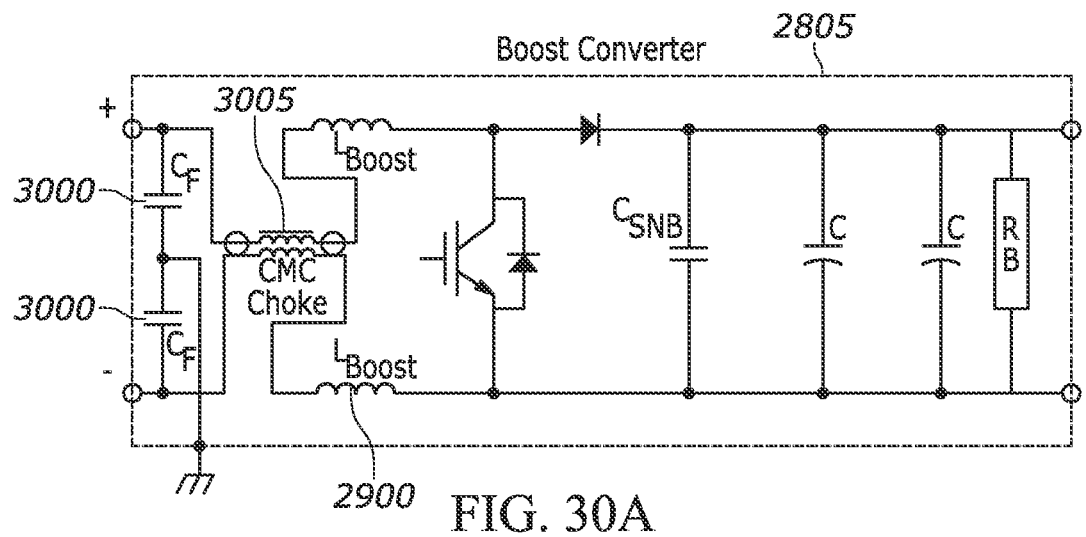
FIGS. 30A-30C illustrate embodiments of a boost converter included in a portable power supply device.
Figure 30B:
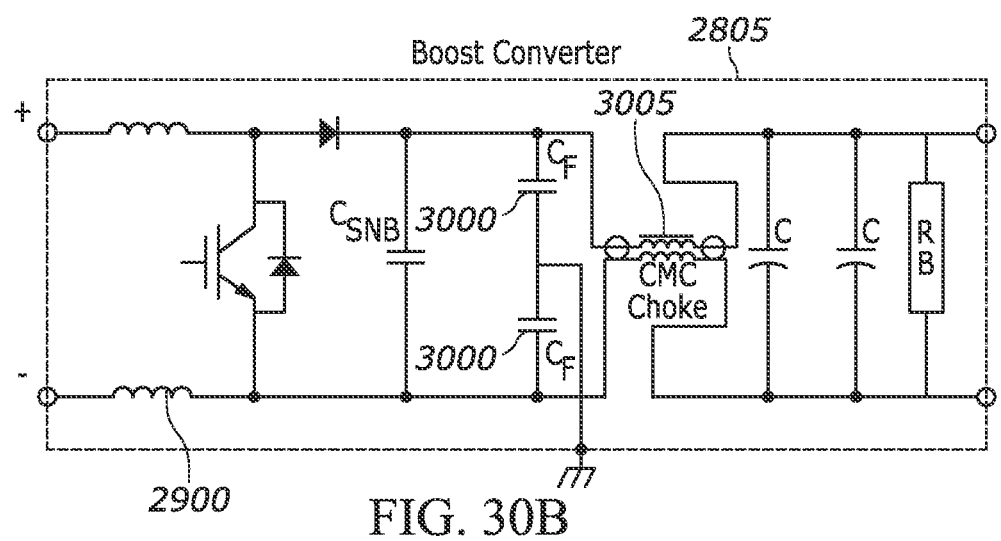
Figure 30C:
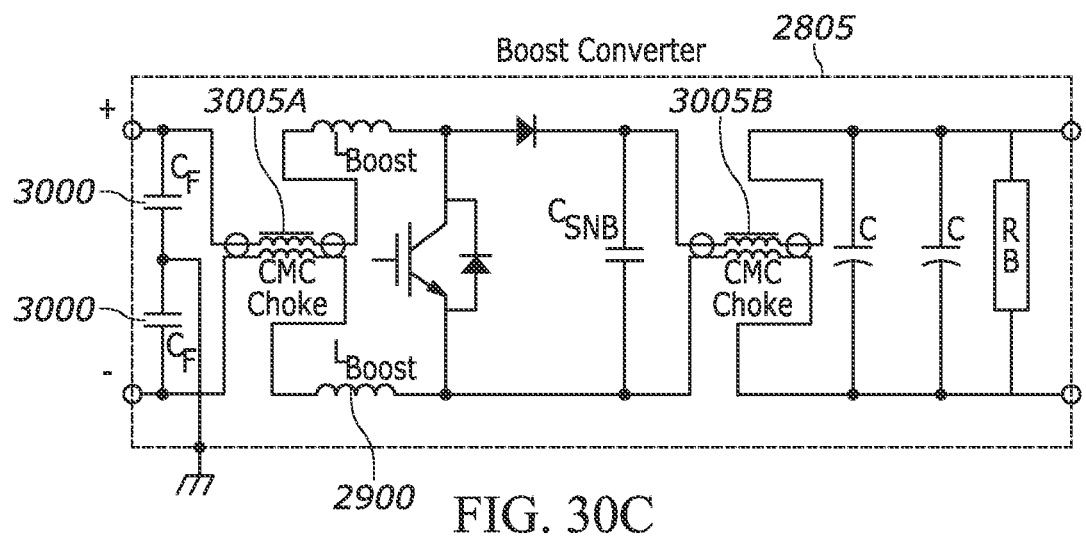

FIGS. 30A-30C illustrate various embodiments of circuit configurations that may be used to implement the boost converter 2805 included in input power conversion unit 400. In particular, the boost converter circuit configurations illustrated in FIGS. 30A-30C include additional circuit components that are configured to improve the EMI filtering capabilities of boost converter 2805. For example, the boost converter 2805 illustrated in FIG. 30A includes filter capacitors 3000 and a common mode choke (CMC) 3005 connected at the input side of boost converter 2805. As another example, the boost converter 2805 illustrated in FIG. 30B includes filter capacitors 3000 and a CMC 3005 that are connected at the output side of boost converter 2805. FIG. 30C illustrates an embodiment of the boost converter 2805 in which filter capacitors 3000 and a first CMC 3005A are connected at the input side of boost converter 2805 and a second CMC 3005B is connected at the output side of boost converter 2805. In some embodiments, the boost converter 2805 includes additional EMI filtering components that are not illustrated in FIGS. 30A-30C.

Referring back to FIG. 28, the DC power output by input power conversion unit 400 is provided, via the first DC bus 405, to the subcore charging circuit 2810A, which is configured to charge the subcores 125A-125C included in internal power source 120. In some embodiments, the power supply 100 includes multiple subcore charging circuits, such as subcore charging circuits 2810A-2810C. In other embodiments, only a single subcore charging circuit 2810A is included.

The subcore charging circuit 2810A is configured to convert the voltage level of DC power output by input power conversion unit 400 to a voltage level used for charging one or more of the subcore modules 125A-125C included in the internal power source 120. For example, if each of the subcore modules 125A-125C is implemented as a battery pack having a nominal voltage of 90V, the subcore charging circuit 2810A may be configured to convert the voltage level (e.g., 250V) of DC power output by input power conversion unit 400 to a 90V level used for charging an individual one of the subcore modules 125A-125C. As another example, the subcore charging circuit 2810A may be configured to convert the voltage level (e.g., 250V) of DC power output by input power conversion unit 400 to a 180V level used for charging two of the subcore modules, such as subcore modules 125A and 125B, in series. As another example, the subcore charging circuit 2810A may be configured to convert the voltage level (e.g., 250V) of DC power output by input power conversion unit 400 to a 270V level used for charging all three subcore modules 125A-125C, in series. In some embodiments, the power supply 100 includes multiple subcore charging circuits 2810A-2810C, wherein each subcore charging circuit 2810 is configured to charge a respective one of the subcore modules 125 included in the internal power source 120. In some embodiments, the subcore charging circuit 2810A is only used to charge the first subcore module 125A and the second subcore module 125B. In such embodiments, the third subcore module 125C is charged outside of the power supply 100 before insertion into internal power source 120.

The third subcore module 125C is selectively connected in series with the first and second subcore modules 125A and 125B by a set of contactors or equivalent device (e.g., a relay, a switch, etc.). In some embodiments, the third subcore module 125C is configured to act as a backup power source that serves a purpose analogous to the purpose served by a spare tire. For example, the third subcore module 125C may be swapped out with, or otherwise replace, the first and/or second subcore modules 125A and 125 during operation of power supply 100 when the first and/or second subcore modules 125A and 125B become depleted. In some embodiments, the internal power source 120 does not include a third subcore module 125B.

In some embodiments, the third subcore module 125C is selectively connected in series, by a set of contactors or equivalent device, with the first and second subcore modules 125A and 125B to increase the combined output voltage of the internal power source 120. With respect to the above example, the internal power source 120 outputs power at 180V when the third subcore module 125C is disconnected from the first and second subcore modules 125A and 125B. However, when the third subcore module 125C is connected in series with the first and second subcore modules 125A and 125B, the internal power source 120 outputs power at approximately 270V. Accordingly, in such embodiments, selective control of the voltage level at which power is output by the internal power source 120 offers flexibility when using the power supply 100. For example, when the power supply 100 is used in a North American market, the controller 200 may be configured to disconnect the third subcore module 125C from the first and second subcore modules 125A, 125B such that internal power source 120 outputs power at a first voltage level (e.g., 180V). Alternatively, when the power supply 100 is used in a rest of world (ROW) market, the controller 200 may be configured to connect the third subcore 125C in series with the first and second subcore modules 125A, 125B such that the internal power source 120 outputs power at a second, or greater, voltage level (e.g., 270V).

Figure 31:
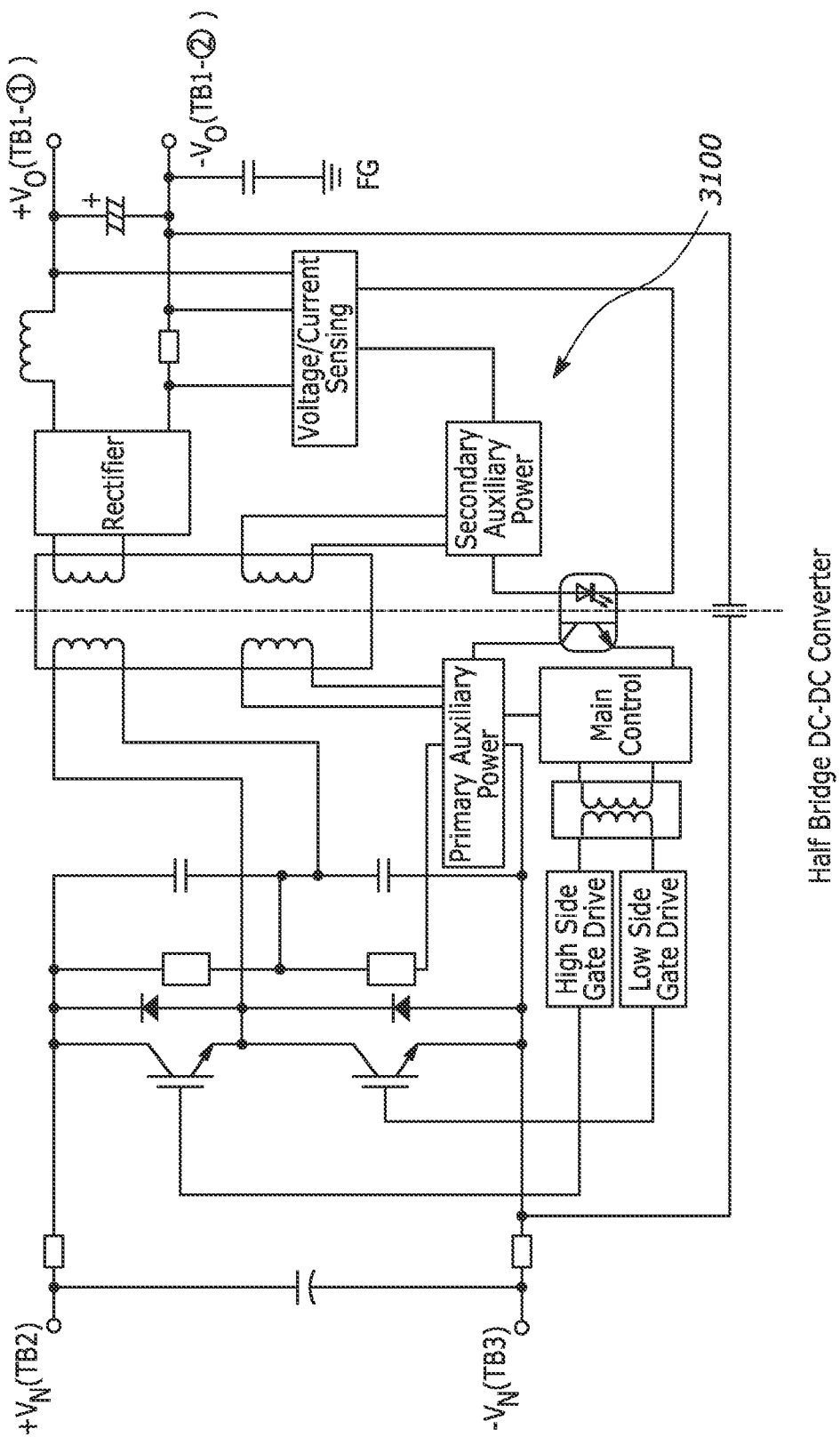
FIG. 31 illustrates an embodiment of a DC-DC converter included in a portable power supply device.

As described above, the one or more subcore charging circuits 2810 are implemented as DC-DC converters configured to convert the DC power output by input power conversion unit 400 to a voltage level used to charge the subcore modules 125 included in the internal power source 120. FIG. 31 illustrates an embodiment in which a half bridge converter, such as the half bridge converter 3100, is used to implement a respective subcore charging circuit 2810. The half bridge converter 3100 is configured to charge a subcore module 125 with minimal electromagnetic interference. For example, the switching speed of the half bridge converter 3100 may be kept low to minimize the EMI footprint of the input side of converter 3100. In addition, the half bridge converter 3100 may be configured to operate in a continuous conduction mode when appropriate values are chosen for the components, such as the transformer and capacitors, included within. Operation of the half bridge converter 3100 in a continuous conduction mode of operation eliminates the need for lossy snubbers to be connected across the converter switches. Furthermore, control of the half bridge converter 3100 is simplified, as the output voltage of converter 3100 is controlled by changing the pulse width of the output power signal rather than changing the frequency of the output power signal. In some embodiments, a subcore charging circuit 2810 is implemented as one of the other converter circuits described herein. In some embodiments, a subcore charging circuit 2810 is implemented as a converter circuit that is not explicitly described herein.

With reference to FIG. 28, the power supply 100 further includes a switched capacitor circuit 3200. The switched capacitor circuit 3200 is electrically connected to the output, or positive and negative terminals, of the internal power source 120. The switched capacitor circuit 3200 is configured to increase, or boost, the voltage level of DC power provided by the internal power source 120 (e.g., 180V-300V) to a voltage level that is provided, via the second DC bus 405, to the AC output power conversion unit 410 and the DC output power conversion unit 415. For example, when the internal power source 120 provides DC power at 180V to the switched capacitor circuit 3200, the switched capacitor circuit 3200 may be configured to output DC power at a voltage level between 300V and 400V. As another example, when the internal power source 120 provides DC power at 270V to the switch capacitor circuit 3200, the switched capacitor circuit 3200 may be configured to output DC power at a voltage level between 500V and 600V.

Figure 32A:
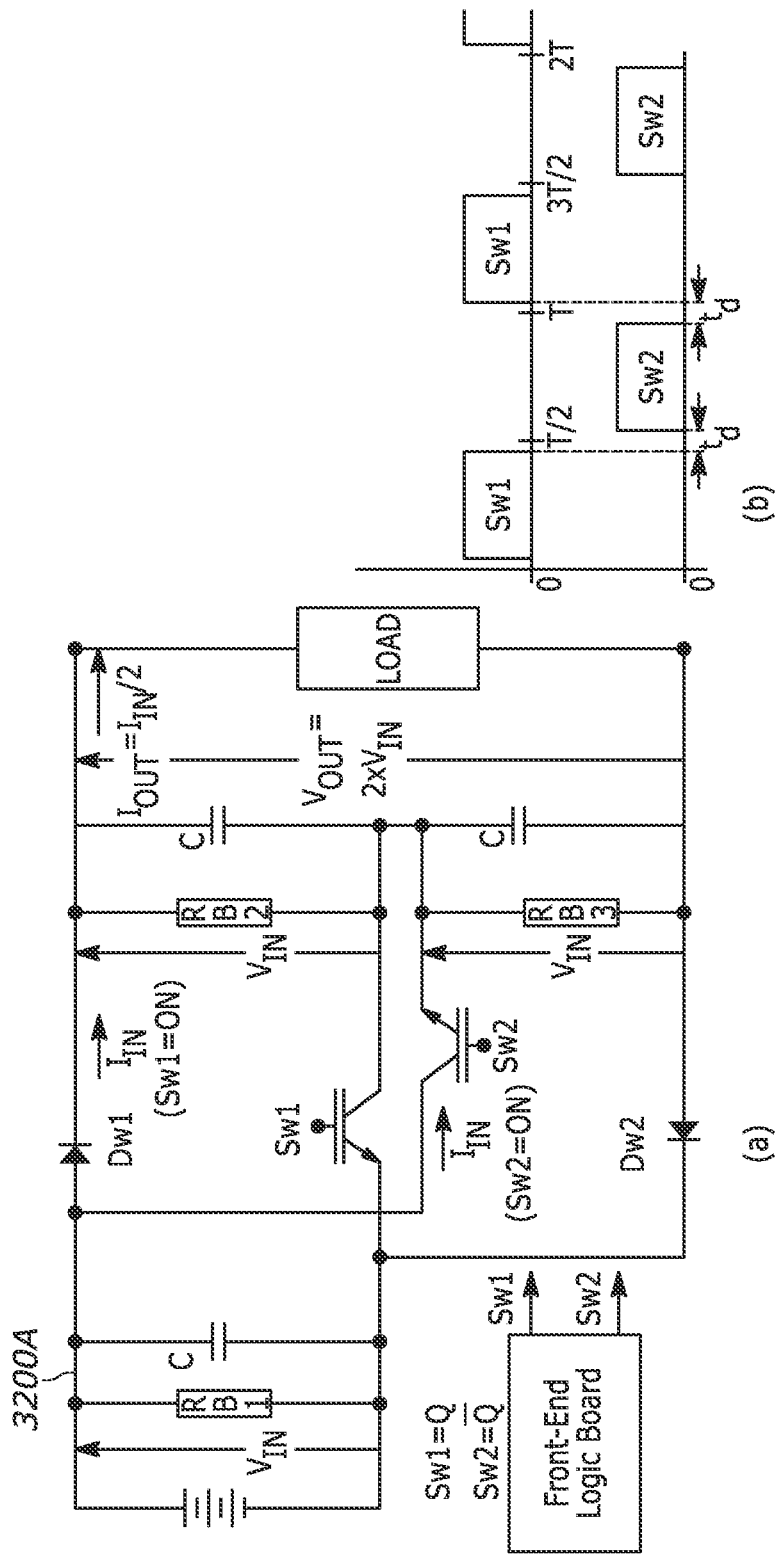
FIGS. 32A-32B illustrate embodiments of a switched capacitor circuit included in a portable power supply device.
Figure 32B:
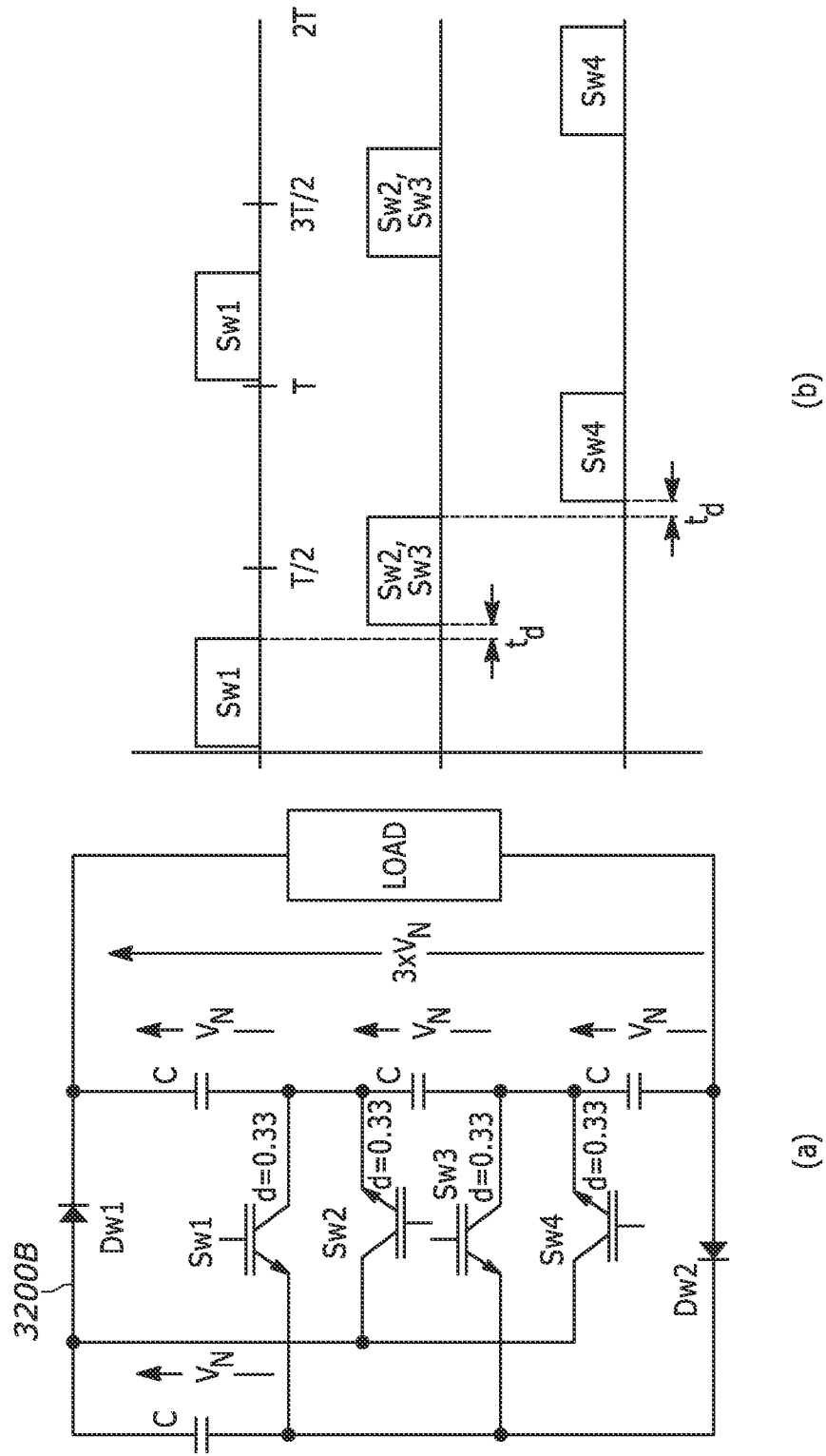

FIGS. 32A-32B illustrate various embodiments of circuit configurations that may be used to implement the switched capacitor circuit 3200. For example, FIG. 32A illustrates a switched capacitor circuit 3200A that is configured to output DC power at a voltage level that is at least double the voltage level at which DC power is received from the internal power source 120. The control of the switched capacitor circuit 3200A does not require feedback. Rather, the switched capacitor circuit 3200A is controlled using an open-loop pulse-width modulated (PWM) control scheme. In some embodiments, the switches Sw1 and Sw3 included in the switched capacitor circuit 3200A are controlled by the controller 200. In some embodiments, the switches Sw1 and Sw2 are controlled by additional PWM controllers that are operatively coupled to the controller 200. In some embodiments, the switches Sw1 and Sw2 are controlled by additional PWM controllers that are operated independently of the controller 200

FIG. 32B illustrates a switched capacitor circuit 3200B that is configured to output DC power at a voltage level that is at least triple the voltage level at which DC power is received from the internal power source 120. Similar to the switched capacitor circuit 3200A, the switched capacitor circuit 3200B is controlled with an open-loop PWM control scheme. The switches Sw1-Sw4 included in the switched capacitor circuit 3200B may be controlled by the controller 200, additional PWM controllers that are operatively coupled to the controller 200, or additional PWM controllers that operate independently of the controller 200.

Figure 33:
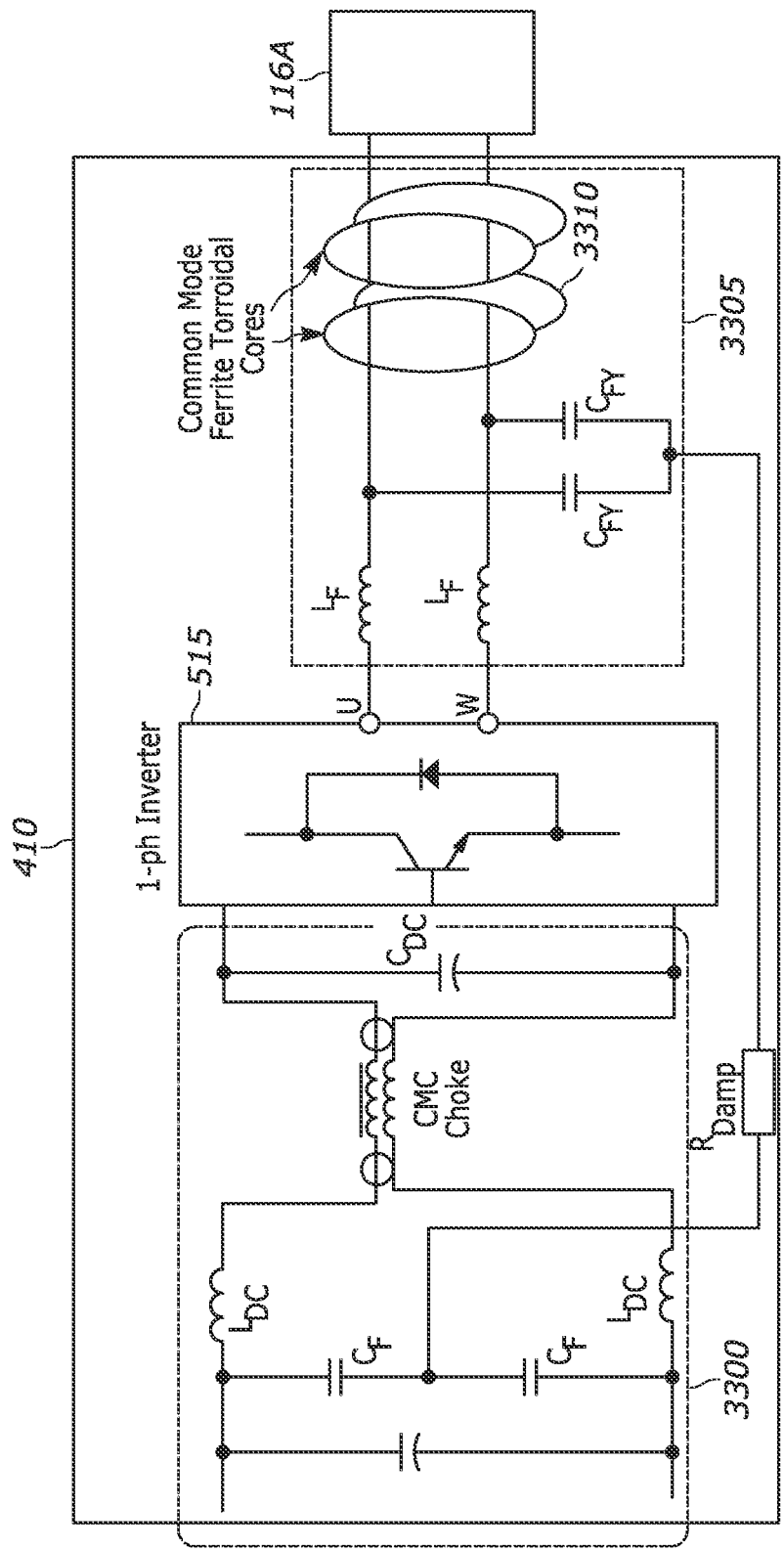
FIG. 33 illustrates an embodiment of an output power conversion unit included in a portable power supply device.

With reference to FIG. 28, the switched capacitor circuit 3200 outputs DC power to the AC output power conversion unit 410 and the DC output power conversion unit 415. As described above, the AC output power conversion unit 410 is configured to convert DC power to AC power used for powering one or more peripheral devices connected to the AC outlets 116A. The AC output conversion unit includes a DC filter 3300 that is configured to remove noise from the DC power output by the switched capacitor circuit 3200. For example, as shown in FIG. 33, the DC filter may be implemented using a common mode choke circuit configuration.

The inverter 515 is configured to convert the filtered DC power output by DC filter 3300 to AC power used for powering the one or more peripheral devices connected to AC outlets 116A. In some embodiments, the inverter 515 is implemented as one of the inverter configurations described herein. In some embodiments, the inverter 515 is implemented as an inverter configuration not explicitly described herein. An AC filter 3305 is connected between the output of inverter 515 and the AC outlets 116A. The AC filter 3305 is configured to further remove noise from the AC power signal provided to the one or more peripheral devices connected to outlets 116A. As shown in FIG. 33, the AC filter 3305 may be implemented as a sine wave filter that includes common mode ferrite toroidal cores 3310.

Similarly, the DC output power conversion unit 415 is configured to convert the DC power output by switched capacitor circuit 3200 to a DC power used for powering one or more peripheral devices connected to the DC outlets 116B. As described above, the DC output power conversion unit 415 includes a DC-DC converter 520 that is configured to convert the voltage level of DC power output by switched capacitor circuit 3200 to a voltage level (e.g., 12V, 18V, 72V, etc.) used to charge one or more battery packs connected to the battery pack receptacles 116B. In some embodiments, the DC-DC converter 520 is implemented as one of the converter configurations described herein. However, in other embodiments, the DC-DC converter 520 is implemented as a converter configuration not explicitly described herein.

Figure 34:
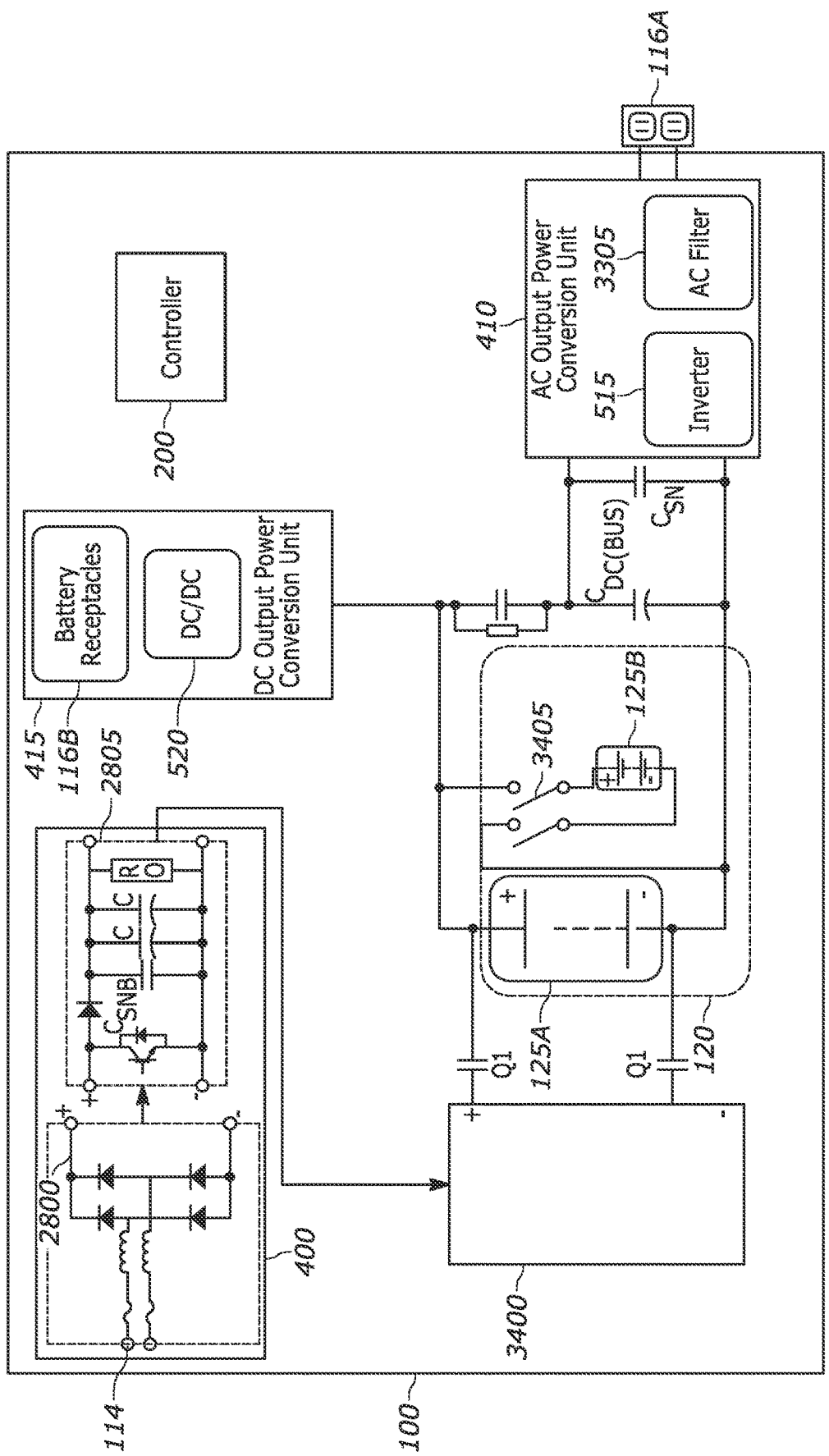
FIGS. 34, 35A, and 35B illustrate embodiments of a portable power supply device.

FIGS. 34-35 illustrate embodiments in which the power supply 100 does not include a boosting stage connected between the internal power source 120 and the AC output power conversion unit 410 and the DC power output conversion unit 415. The embodiments of power supply 100 illustrated in FIGS. 34-35 include components that are the same as and/or similar to the components included in the other embodiments of power supply 100 described herein. Accordingly, it should be understood that components included in the embodiments of the power supply 100 illustrated in FIGS. 34-35 are configured to operate in a manner that is the same as and/or similar to the manner in which the components are described as operating above. In addition, the embodiments of power supply 100 illustrated in FIGS. 34-35 may also include additional components and/or less components than the components described above. Moreover, it should be understood that controller 200 is electrically and communicatively coupled to the components of power supply 100 illustrated in FIGS. 34-35, and thus, the controller 200 is configured to control these components included in power supply 200. Furthermore, it should be understood that any of the embodiments of power supply 100 illustrated in FIGS. 34-35 may be modified to incorporate functionality of and/or may be combined with of other embodiments of the power supply 100 described herein.

With reference to the illustrated embodiment of FIG. 34A, the power supply 100 includes an input power conversion unit 400 that is configured to convert AC power received from an external source to DC power used to power the internal power source charger 3400. The internal power source charger 3400 is a DC-DC converter configured to convert the voltage level of DC power output by input power conversion unit 400 to a voltage level used to charge the internal power source 120.

The internal power source 120 includes first and second subcore modules 125A and 125B. In some embodiments, the first and second subcore modules 125A and 125B are implemented as rechargeable battery packs that are removably attached from the power supply 100. In other embodiments, the first and second subcore modules 125A and 125B are rechargeable battery packs integrated within the power supply 100. In this embodiment, the nominal voltage of the first subcore 125A is large enough (e.g., 180V, 280V, etc.) such that power output by the first subcore 125A is provided directly to the DC and AC output conversion units 410 and 415. That is, the voltage level of power output by the first subcore 125A is not increased, or boosted, before delivery to the AC and DC output conversion units 410 and 415. The first subcore module 125A includes two or more parallel stacks of series-connected batteries, wherein the nominal voltage of subcore module 125A is equal to the combined voltage of the stacks of series-connected battery cells. As described above, the number of battery cells included in the stacks of series-connected battery cells should be chosen such that combined voltage of the series connected battery cells does not need to be increased, or boosted, when subcore module 125A outputs power. For example, the first subcore module 125A may include two or more parallel stacks of seventy series-connected battery cells. In this example, if it is assumed that each battery cell included in the first subcore module 125A has a nominal voltage of 4V, the nominal voltage of the first subcore module 125A is 280V. In some embodiments, the nominal voltage of the first subcore module 125A is a nominal voltage value (e.g., 180V, 220V, 240V, etc.) that does not equal 280V. Furthermore, in some embodiments, the first subcore module 125A only includes a single stack of series-connected battery cells.

The second subcore module 125B has a nominal voltage that is equal to the nominal voltage of the first subcore module 125A. However, in some embodiments, the capacity of the second subcore module 125B is less than the capacity of the first subcore module 125A. For example, if the first subcore module 125A includes two or more parallel stacks of series-connected battery cells, the second subcore module may only include a single stack of series-connected battery cells. Thus, the absence of additional parallel stacks of series-connected battery cells results in a reduced capacity of subcore module 125B when compared to the capacity of subcore module 125A. However, since the second subcore module 125B includes fewer stacks of series-connected battery cells than the first subcore module 125A, the size and cost of the second subcore module 125B may be lower than the size and cost of the first subcore module 125A. The second subcore module 125B serves the purpose of providing additional capacity to the internal power source 120. In some embodiments, the power supply 100 does not include a second subcore module 125B.

As shown in FIG. 34, the power supply 100 includes a selector switch 3405 that is configured to selectively connect the second subcore module 125B in parallel with the first subcore module 125A. That is, controller 200 is configured to close and open selector switch 3405. When the selector switch 3405 is closed, the power output by internal power source 120 is equal to the combined power output by the first and second subcore modules 125A and 125B. When the selector switch 3405 is open, the power output by internal power source 120 is equal to the power output by the first subcore module 125A. As described above, the power output by internal power source 120 does not need to pass through a boost stage. Rather, the power output by internal power source 120 is provided directly to the AC and DC output power conversion units 410 and 415. When compared to embodiments in which a boost stage is connected between the internal power source 120 and loads connected to power supply 100, the power supply 100 illustrated in FIG. 34 does not experience power losses that would otherwise occur at the boost stage.

Figure 35A:
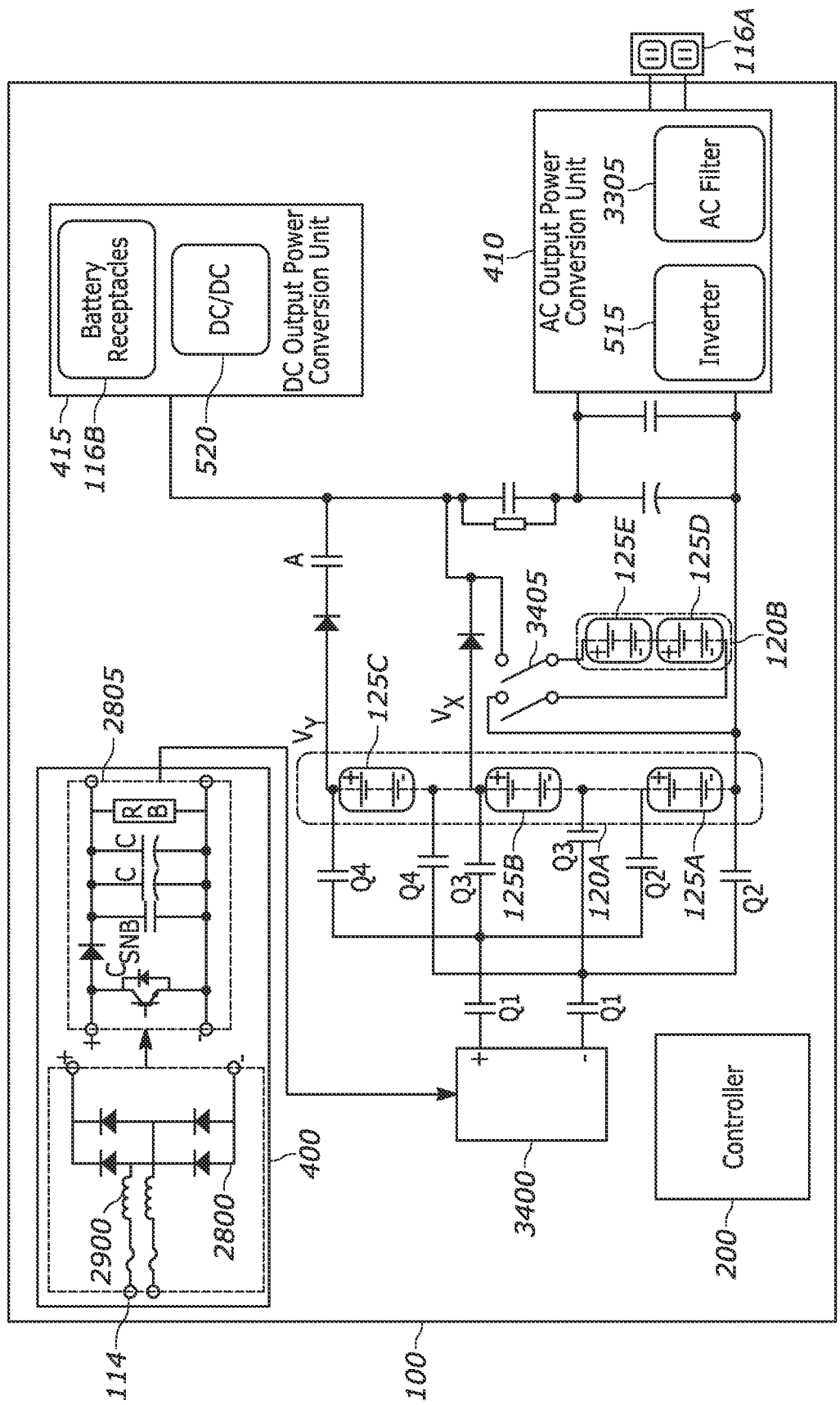

The embodiment of power supply 100 illustrated in FIG. 35A is similar to the illustrated embodiment of FIG. 34. However, as shown, the power supply 100 illustrated in FIG. 35 includes a first internal power source 120A and a second internal power source 120B. The first internal power source 120A includes a first plurality of series-connected subcore modules 125A-125C. When compared to the first subcore module 125A illustrated in the embodiment of FIG. 34, the respective nominal voltage of each subcore module 125A-125C included in the first internal power source 120A is less. In particular, the respective stacks of series-connected battery cells included in subcore modules 125A-125C include fewer series-connected battery cells than the stacks of series-connected battery cells included in the first subcore module 125A of FIG. 34. For example, the first subcore module 125A included in the first internal power source 120A may include one or more parallel stacks of twenty or more (e.g., twenty-four) series connected battery cells. If it is assumed that each battery cell has a nominal voltage of 4V, the nominal voltage of the first subcore module 125A is approximately 96V, which is less than the nominal voltage of a subcore module that includes a large number (e.g., seventy) of series connected battery cells.

In some embodiments, the nominal voltage of the second subcore module 125B included in the first internal power source 120A is equal to the nominal voltage of the first subcore module 125A included in the first internal power source 120A. In such embodiments, the first internal power source 120A is configured to output power at a first voltage, $V_x$, wherein $V_x$ is equal to the combined voltage of the first and second subcore modules 125A and 125B included in the first internal power source. With reference to the above example, $V_x$ is approximately equal to 192V when the first and second subcore modules 125A and 125B include fully charged stacks of twenty or more (e.g., twenty-four) series-connected battery cells. As shown in FIG. 35A and discussed above, power output by the first internal power source 120A at a voltage level of $V_x$ is provided directly, without passing through a boosting stage, to the AC and DC output power conversion units 410 and 415. Accordingly, rather than including a single subcore module 125 that has a single, high-voltage stack of battery cells, the first internal power source 120A uses the combined output of series-connected subcore modules 125A and 125B to output power at a voltage level, $V_x$, that does not require boosting.

Furthermore, the first internal power source 120A is configured to output power at a second voltage level, $V_y$, which may be greater than the voltage level, $V_x$. For example, as the first and second subcore modules 125A and 125B are discharged over time, the voltage level, $V_x$, at which the first internal power source 120A outputs power is gradually reduced. Thus, to satisfy the power requirements of peripheral devices connected to the power supply 100, the first internal power source 120A may be further configured to output power at a voltage level, $V_y$. As shown, $V_y$, is equal to the combined voltage of the subcore modules 125A-125C included in the first internal power source 120A. When the first and second subcore modules 125A and 125B become depleted and/or higher voltage loads are connected to the power supply 100, the controller 200 is configured to electrically connect the third subcore module 125 in series with the first and second subcore modules 125A, 125B. Accordingly, the first internal power source 120A is configured to provide the combined power output of subcore modules 125A-125C to the AC output power conversion unit 410 at the voltage level, $V_y$. Therefore, rather than including a single subcore module 125 having a high-voltage stack of battery cells, the first internal power source 120A is further configured to use the combined output of series-connected subcore modules 125A-125C to output power at a voltage level that does not require boosting.

In some embodiments, the nominal voltage of the third subcore module 125C is equal to respective nominal voltages of the first and second subcore modules 125A and 125B. With reference to the above example, if the nominal voltage of the third subcore module 125C is approximately 96V, $V_y$ is approximately equal to 288V when the subcore modules 125A-125C are fully charged. However, as described above, the third subcore module 125C may be electrically connected in series with the first and second subcore modules 125A, 125B when the first and second subcore modules 125A, 125B are not fully charged. Thus, for example, $V_y$ may be equal to a voltage value that is less than 288V but greater than or equal to 180V. In some embodiments, the nominal voltage of the third subcore module 125C is less than the respective nominal voltages of the first and second subcore modules 125A and 125B. With reference to the above example, the third subcore module 125C may include parallel stacks of twenty series-connected battery cells, and thus, have a nominal voltage of approximately 80V. It should be understood that the first internal power source 120A is operable to output power to the AC and DC output conversion units 410 and 415 at voltage levels that are different than the voltage levels (e.g., 120V, 220V, 240V, 280V, etc.) described in the above examples.

Figure 35B:
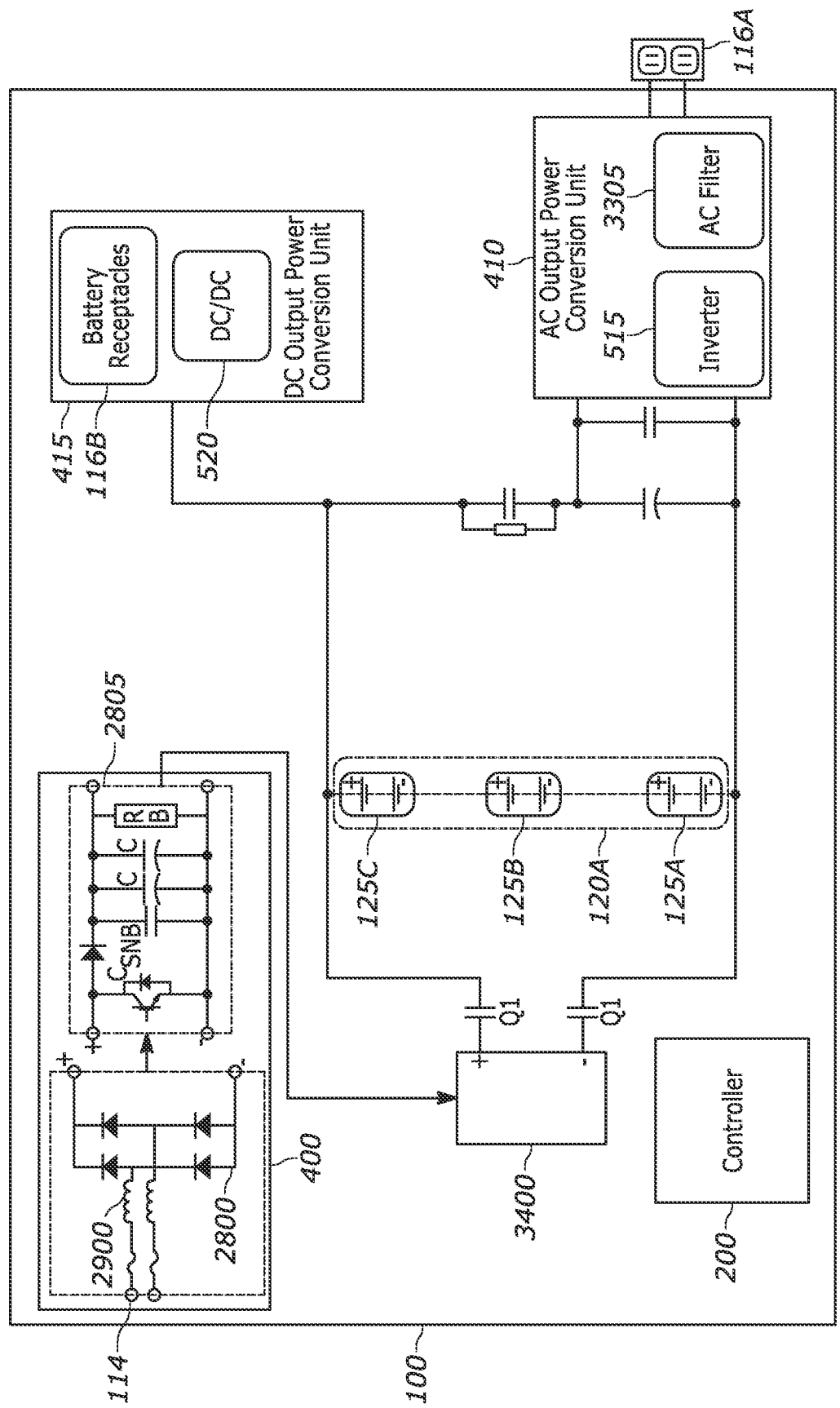

As further shown in FIG. 35A, the second internal power source 120B is selectively coupled to the AC and DC output conversion units 410 and 415 by selector switch 3405. That is, when the controller 200 closes selector switch 3405, the second internal power source 120B is operable to provide power to the AC and DC output power conversion units 410 and 415. The second internal power source 120B includes a second plurality of series-connected subcore modules 125D-125E. In some embodiments, the respective nominal voltages of the fourth and fifth subcore modules 125D and 125E are equal to the respective nominal voltages of the first and second subcore modules 125A-125B. For example, with respect to the above example, the respective nominal voltages of the fourth and fifth subcore modules 125D and 125E may be equal to 96V, and thus, the second internal power source 120B outputs power at a voltage level of approximately 192V. However, in some embodiments, the respective nominal voltages of the fourth and fifth subcore modules 125D and 125E are not equal to the respective nominal voltages of the first and second subcore modules 125A and 125B. For example, the fourth and fifth subcore modules 125D and 125E may include parallel stacks of twenty-eight series connected battery cells, and thus, the second internal power source 120B is operable to output power at approximately 224V. In some embodiments, the power supply 100 does not include a second internal power source 120B. For example, FIG. 35B illustrates an embodiment in which the power supply 100 does not include the second internal power source.

Figure 36:
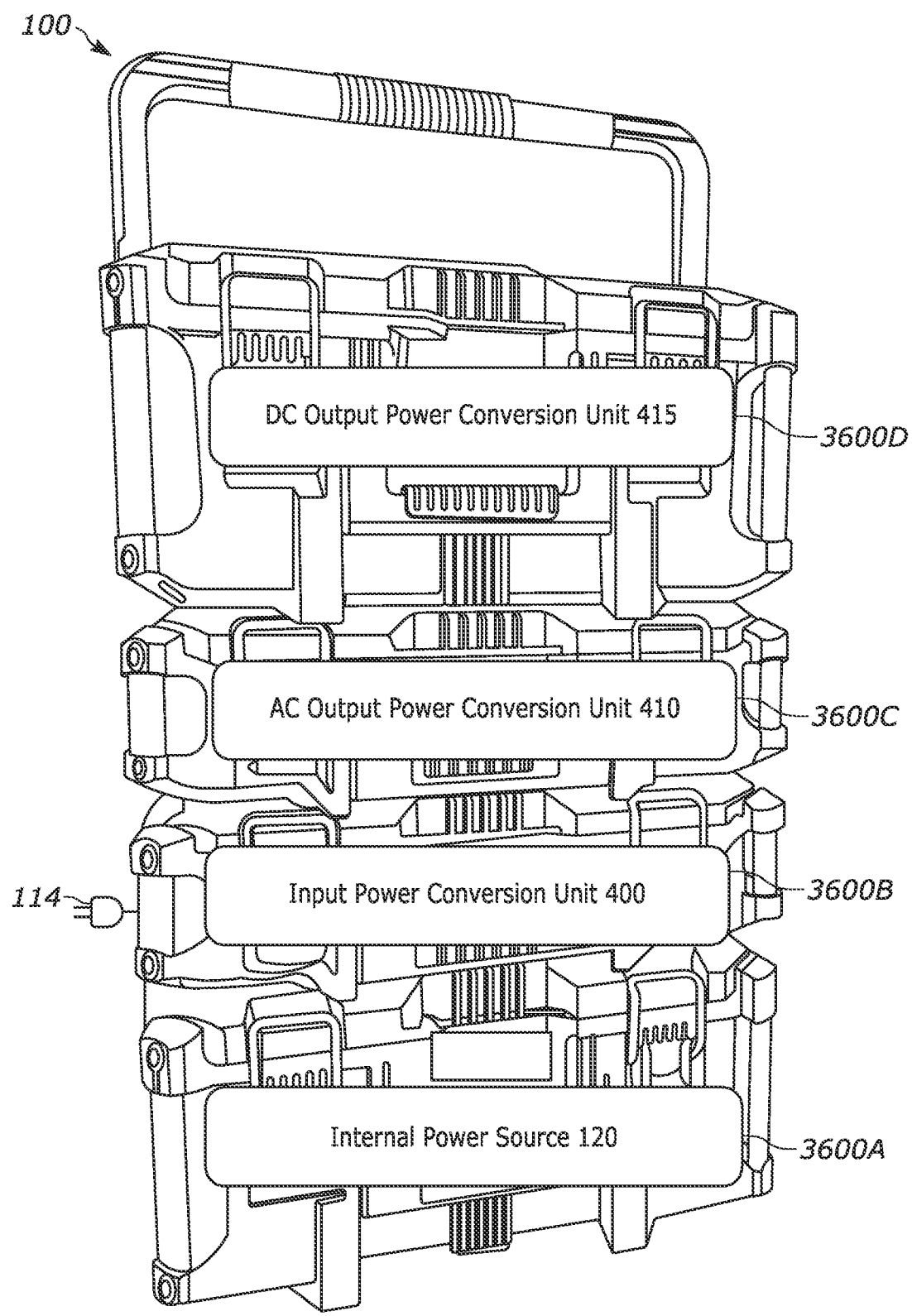
FIG. 36 illustrates an embodiment of a portable power supply device of FIG. 1.

FIG. 36 illustrates an embodiment in which components included in the power supply 100 are separately housed within one or more power modules 3600A-3600N that are configured to be physically and/or electrically connected with each other. The power supply 100 illustrated in FIG. 36 includes components that are the same as and/or similar to the components included in the various embodiments of power supply 100 described herein. Accordingly, it should be understood that components included in the power supply 100 illustrated in FIG. 36 are configured to operate in a manner that is the same as and/or similar to the manner in which the components are described as operating herein when implemented in other embodiments of the power supply 100. In addition, it should be understood that the power supply 100 illustrated in FIG. 36 may be modified to incorporate functionality of and/or be combined with other embodiments of the power supply 100 described above.

As shown in FIG. 36, the internal power source 120 is contained within a first power module or housing 3600A. The input power conversion unit 400 is contained within a second power module or housing 3600B. The AC output power conversion unit is contained within a third power module or housing 3600C. The DC output power conversion unit 415 is contained within a fourth power module or housing 3600D. Each of the modules 3600A-3600D are each physically and electrically connectable to one another such that electricity can pass between and among the modules 3600A-3600D. The AC power outlets 116A are connected to the third power module 3600C and the DC power outlets 116B (e.g., the battery pack receptacles) are connected to and/or contained within the DC output power conversion unit 415. Although not illustrated in FIG. 36, it should be understood that the controller 200 may be included in any of the power modules 3600A-3600D. For example, the controller 200 may be contained within the first power module 3600A. In some embodiments, each power module 3600A-3600D includes its own respective controller 200A-200D.

In some embodiments, the power supply 100 includes fewer power modules than the illustrated number of power modules. For example, in some embodiments, the AC power output conversion unit 410 and the DC power output conversion unit 415 are contained within a single power module or housing 3600. In some embodiments, the power supply 100 includes more power modules than the illustrated number of power modules.

Thus, the disclosure provides, among other things, a portable power supply. Various features and advantages of the disclosure are set forth in the following claims.

What is claimed is:

1. A portable power supply comprising:
   an internal power source, the internal power source enclosed within a housing of the portable power supply;
   an alternating current (AC) power output;
   a direct current (DC) power output;
   an input unit configured to receive power from a first external source;
   a first power conversion unit configured to convert the power received from the first external source to a first DC power used for charging the internal power source;
   an AC power conversion unit configured to convert power output by the internal power source to an AC power used for powering a first peripheral device connected to the AC power output;
   a DC power conversion unit configured to convert power output by the internal power source to a second DC power used for powering a second peripheral device connected to the DC power output;
   a wireless communication circuit configured to communicate with an external device; and
   a controller including an electronic processor configured to receive, via the wireless communication circuit, a value for setting at least one of a charge cutoff threshold and discharge cutoff threshold for the internal power source.

2. The portable power supply of claim 1, wherein the first power conversion unit includes a power factor correction (PFC) circuit and DC-DC converter; and
   wherein the internal power source is a large-capacity battery pack.

3. The portable power supply of claim 1, wherein the AC power conversion unit includes a DC-DC converter and an inverter.

4. The portable power supply of claim 3, wherein the AC power conversion unit further includes a rectifier configured to convert a second AC power input from a peripheral device connected to the AC power output to a third DC power for charging the internal power source.

5. The portable power supply of claim 1, wherein the DC power conversion unit includes a DC-DC converter.

6. The portable power supply of claim 1, further comprising a relay configured to selectively connect the input unit to the AC power output.

7. The portable power supply of claim 1, wherein the input unit is further configured to receive power from a second external source.

8. The portable power supply of claim 7, further comprising a second power conversion unit configured to convert the power received from the second external source to a third DC power used for charging the internal power source.

9. The portable power supply of claim 8, wherein:
   the first power conversion unit is configured to charge the internal power source with the first DC power at a first rate;
   the second power conversion unit is configured to charge the internal power source with the third DC power at a second rate; and
   wherein the first rate is greater than the second rate.

10. The portable power supply of claim 1, further comprising a load switch configured to connect the first power conversion unit to the DC power conversion unit.

11. The portable power supply of claim 1, further comprising a second AC power conversion unit; and
wherein the AC power conversion unit and the second AC power conversion unit are electrically connected in parallel between the internal power source and the AC output.

12. The portable power supply of claim 1, further comprising a second internal power source and a second power conversion unit configured to charge the second internal power source;
wherein the second internal power source is configured to provide power to the controller included in the portable power supply.

13. The portable power supply of claim 1, wherein the second peripheral device connected to the DC power output is a power tool battery pack;
wherein power provided by the power tool battery pack is used for charging the internal power source; and
wherein power provided by the power tool battery pack is used for powering the first peripheral device connected to the AC power output.

14. The portable power supply of claim 1, wherein the housing includes a first housing, a second housing, a third housing, and a fourth housing, and wherein the input unit is contained in the first housing, the internal power source is contained in the second housing, the AC power conversion unit is contained in the third housing, and the DC power conversion unit is contained in the fourth housing.

15. The portable power supply of claim 1, further comprising:
a second internal power source;
a second AC power output;
a second input unit configured to receive power from a second external source;
a second power conversion unit configured to convert the power received from the second external source to a third DC power used for charging the second internal power source; and
a second AC power conversion unit configured to convert power output by the second internal power source to a second AC power used for powering a second peripheral device connected to the second AC power output.

16. The portable power supply of claim 1, further comprising:
a sensor configured to measure a voltage of the internal power source; and
the controller including the electronic processor configured to:
monitor a voltage of the internal power source based on voltage measurements taken by the sensor,
disable the first power conversion unit when the voltage of the internal power source exceeds the charge cutoff threshold, the charge cutoff threshold having a value that is less than 90% of a nominal charge capacity of the internal power source; and
disable at least one of the AC power output and the DC power output when the voltage of the internal power source is less than the discharge cutoff threshold, the discharge cutoff threshold having a value that is greater than 10% of the nominal charge capacity of the internal power source;
wherein the controller receives, via the wireless communication circuit, the value of the charge cutoff threshold from the external device.

17. The portable power supply of claim 1, further comprising:
a sensor; and
the controller including the electronic processor configured to:
monitor, using the sensor, an amount of power that is output by the AC power output and the DC power output;
determine an amount of power that is output by the AC power output and the DC power output during a time interval; and
shut off the portable power supply when the amount of power output by the AC power output and the DC power output during the time interval is less than a power threshold.

* * * * *